(12) United States Patent
Pugh et al.

(10) Patent No.: US 12,434,260 B2
(45) Date of Patent: Oct. 7, 2025

(54) METHODS AND APPARATUS FOR SECURELY SUPPORTING TUMBLERS AND BOTTLES USING ADJUSTABLE TILT MECHANISMS

(71) Applicants: Zoey Pugh, Orange Park, FL (US); Randall Pugh, Jacksonville, FL (US)

(72) Inventors: Zoey Pugh, Orange Park, FL (US); Randall Pugh, Jacksonville, FL (US)

( * ) Notice: Subject to any disclaimer, the term of this patent is extended or adjusted under 35 U.S.C. 154(b) by 0 days.

(21) Appl. No.: 19/002,291

(22) Filed: Dec. 26, 2024

(65) Prior Publication Data

US 2025/0121403 A1   Apr. 17, 2025

Related U.S. Application Data

(63) Continuation-in-part of application No. 18/410,941, filed on Jan. 11, 2024, now Pat. No. 12,208,413, which is a continuation-in-part of application No. 18/081,187, filed on Dec. 14, 2022, now Pat. No. 11,911,788.

(60) Provisional application No. 63/289,190, filed on Dec. 14, 2021.

(51) Int. Cl.
*B05C 13/02*        (2006.01)
(52) U.S. Cl.
CPC .................................. *B05C 13/025* (2013.01)
(58) Field of Classification Search
CPC .............................. B05C 13/025; B05C 13/02
USPC ...................................................... 269/47–52
See application file for complete search history.

(56) References Cited

U.S. PATENT DOCUMENTS

| | | | |
|---|---|---|---|
| 1,235,957 A | 8/1917 | Bidwell |
| 1,245,361 A | 11/1917 | Lutz |
| 1,413,680 A | 4/1922 | Pfunder |
| 1,688,424 A | 10/1928 | Kiefer |
| 2,167,589 A | 7/1939 | Schutz |
| 2,198,565 A | 4/1940 | Schutz et al. |
| 2,215,981 A | 9/1940 | Schutz |
| 2,529,331 A | 11/1950 | Ellis et al. |
| 3,328,042 A | 6/1967 | Mallory |
| 4,267,771 A | 5/1981 | Stirbis |
| 4,380,964 A | 4/1983 | Abe et al. |
| 4,601,222 A | 7/1986 | Gill |
| 4,926,788 A | 5/1990 | Metcalf |
| 5,284,229 A | 2/1994 | Logan et al. |

*Primary Examiner* — Jason L Vaughan
(74) *Attorney, Agent, or Firm* — Joseph P. Kincart; Tracnik Law PLLC

(57) ABSTRACT

Improved methods and apparatus for supporting a tumbler, bottle, or similar items are disclosed. The apparatus includes a handle portion with a point of insertion for a control mechanism, and a stem portion extending from the handle. The stem portion comprises an upper stem portion with a tapered bottom surface and a lower stem portion featuring an off-set wedge that tilts to engage an interior surface of the tumbler. The control mechanism, which may include a threaded screw, spring-actuated lever, or cam system, interacts with one or more nuts positioned in the handle and off-set wedge to achieve precise tilting motion. Additional embodiments include flexible arms, expandable bladders, and butterfly-type mechanisms for gripping various drinkware items. The apparatus is suitable for applications such as engraving, painting, or aesthetic displays, providing secure engagement, adaptability, and protection of fragile surfaces during use.

20 Claims, 37 Drawing Sheets

1600

```
┌─────────────────────────────────────────────────────────────┐
│ PROVIDING A BLADDER BETWEEN AN UPPER COMPRESSION COLLAR     │
│ AND A LOWER COMPRESSION COLLAR OF A TUMBLER SUPPORT         │
│                        APPARATUS                            │
│                          1601                               │
└─────────────────────────────────────────────────────────────┘
                              │
                              ▼
┌─────────────────────────────────────────────────────────────┐
│ INSERTING THE BLADDER ALONG WITH THE LOWER COMPRESSION      │
│    COLLAR INTO AN INTERIOR CHAMBER OF THE TUMBLER CUP       │
│                          1602                               │
└─────────────────────────────────────────────────────────────┘
                              │
                              ▼
┌─────────────────────────────────────────────────────────────┐
│  MOVING THE UPPER COMPRESSION COLLAR AGAINST A GROMMET      │
│   AND TOWARDS THE LOWER COMPRESSION COLLAR IN A             │
│                  COMPRESSIVE DIRECTION                      │
│                          1603                               │
└─────────────────────────────────────────────────────────────┘
                              │
                              ▼
┌─────────────────────────────────────────────────────────────┐
│  EXPANDING THE BLADDER AS A RESULT OF MOVING THE UPPER      │
│      COMPRESSION COLLAR AGAINST THE GROMMET                 │
│                          1604                               │
└─────────────────────────────────────────────────────────────┘
                              │
                              ▼
┌─────────────────────────────────────────────────────────────┐
│ CAUSING THE BLADDER TO APPLY OUTWARD PRESSURE AGAINST       │
│ THE INTERIOR SURFACE OF THE TUMBLER CUP AND FIXEDLY         │
│ ATTACHING THE COMPRESSION ACTIVATED BLADDER TO THE          │
│                    TUMBLER CUP                              │
│                          1605                               │
└─────────────────────────────────────────────────────────────┘
                              │
                              ▼
┌─────────────────────────────────────────────────────────────┐
│   ROTATING A SPINDLE TURNER ARM ATTACHED TO THE TUMBLER     │
│                    SUPPORT APPARATUS                        │
│                          1606                               │
└─────────────────────────────────────────────────────────────┘
                              │
                              ▼
┌─────────────────────────────────────────────────────────────┐
│      TRANSFERRING ROTATIONAL FORCE TO THE TUMBLER CUP       │
│                          1607                               │
└─────────────────────────────────────────────────────────────┘
```

FIG. 16

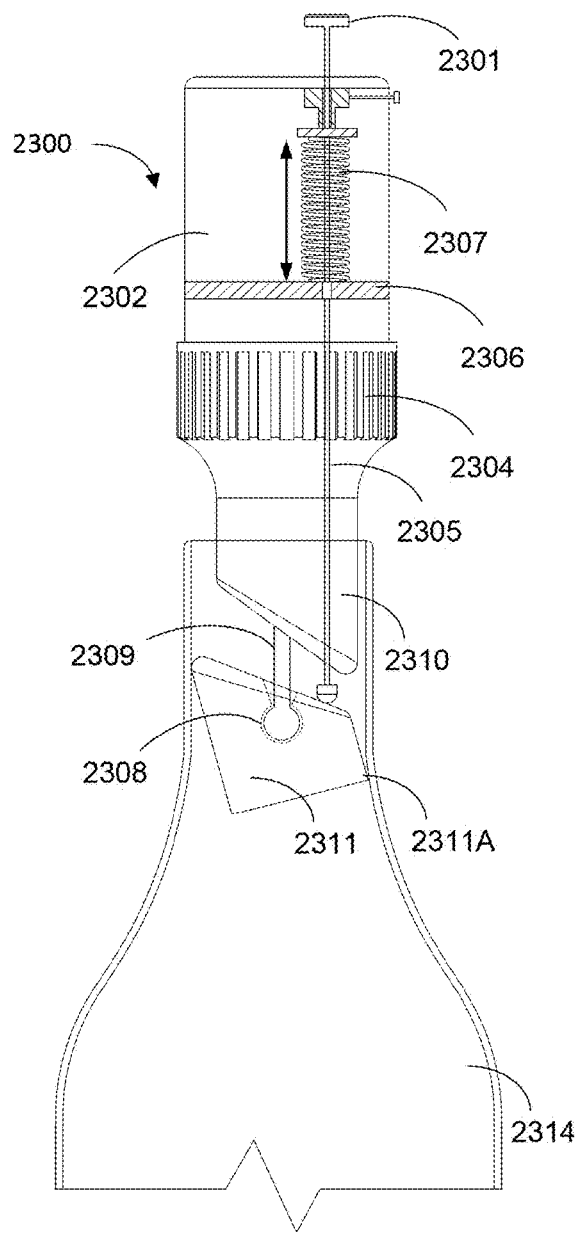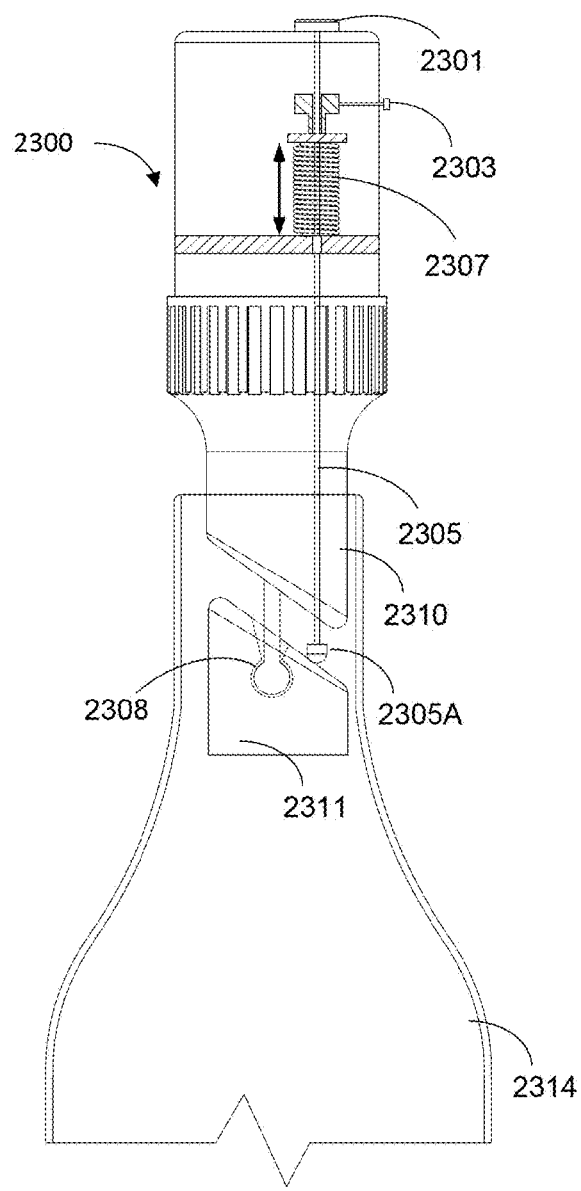
FIG. 23A
FIG. 23B

2700

```
┌─────────────────────────────────────────────────────────────┐
│  CONFIGURING A SUPPORT APPARATUS COMPRISING A STEM          │
│  PORTION THAT INCLUDES AN UPPER STEM PORTION AND A LOWER    │
│  OFF-SET WEDGE FOR SECURELY HOLDING A TUMBLER OR SIMILAR    │
│  ITEMS                                                       │
│                          2701                                │
└─────────────────────────────────────────────────────────────┘

┌─────────────────────────────────────────────────────────────┐
│  UTILIZING A THREADED SCREW PASSING THROUGH FIXED NUTS TO   │
│  CONTROL UPWARD MOVEMENT OF THE OFF-SET WEDGE,              │
│  FACILITATING SECURE ENGAGEMENT WITH THE TUMBLER'S          │
│  INTERNAL SURFACE                                            │
│                          2702                                │
└─────────────────────────────────────────────────────────────┘

┌─────────────────────────────────────────────────────────────┐
│  INTEGRATING A PLURALITY OF FLEXIBLE ARMS WITHIN THE STEM   │
│  PORTION, WHICH EXPAND OR COLLAPSE TO CONTACT THE INTERIOR  │
│  WALLS OF THE TUMBLER FOR SECURE SUPPORT                    │
│                          2703                                │
└─────────────────────────────────────────────────────────────┘

┌─────────────────────────────────────────────────────────────┐
│  ADDING A BLADDER SURROUNDING THE FLEXIBLE ARMS TO PROVIDE  │
│  A SOFT AND SECURE INTERFACE, PREVENTING DAMAGE TO THE      │
│  INTERIOR SURFACE OF FRAGILE TUMBLERS DURING ENGAGEMENT     │
│                          2704                                │
└─────────────────────────────────────────────────────────────┘

┌─────────────────────────────────────────────────────────────┐
│  PROVIDING A SPRING-ACTUATED MECHANISM WITHIN A CHAMBER TO  │
│  ENABLE UPWARD AND DOWNWARD ACTUATION OF STRINGS            │
│  ATTACHED TO THE FLEXIBLE ARMS, CONTROLLING THEIR EXPANSION │
│  AND COMPRESSION                                             │
│                          2705                                │
└─────────────────────────────────────────────────────────────┘

┌─────────────────────────────────────────────────────────────┐
│  INTRODUCING A BUTTERFLY-TYPE MECHANISM IN THE STEM         │
│  PORTION WITH EXPANDABLE WING PORTIONS THAT ENGAGE THE      │
│  INTERNAL SURFACE OF THE TUMBLER WHEN ACTUATED              │
│                          2706                                │
└─────────────────────────────────────────────────────────────┘

┌─────────────────────────────────────────────────────────────┐
│  EMPLOYING A SCREW MECHANISM TO APPLY FORCE THROUGH         │
│  FIXED NUTS, CAUSING THE WING PORTIONS OF THE BUTTERFLY-    │
│  TYPE MECHANISM TO EXPAND OUTWARD FOR SECURE CONTACT        │
│                          2707                                │
└─────────────────────────────────────────────────────────────┘
                              │
                              ▼
                        ( FIG. 27B )
```

| REPLACING THE SCREW-BASED CONTROL WITH A SPINDLE ARM MECHANISM THAT PRESSES THE BUTTERFLY CENTER POINT, ENABLING CONTROLLED EXPANSION AND RETRACTION OF THE WING PORTIONS |
|---|
| 2708 |
| CONFIGURING THE STEM PORTION TO INCLUDE A BLADDER THAT EXPANDS UPON COMPRESSION USING A LEVER-ACTUATED PISTON MECHANISM, FACILITATING SOFT AND UNIFORM CONTACT WITH THE TUMBLER'S WALLS |
| 2709 |
| INCORPORATING A CAM MECHANISM WITH A ROTATION PORTION AND EDGE, CONTROLLED BY A SPRING-LOADED LEVER AND TORSION SPRING, ENABLING AUTOMATED TILTING OF THE OFF-SET WEDGE FOR TUMBLER ENGAGEMENT |
| 2710 |
| ACTUATING THE CAM MECHANISM USING A SPRING-LOADED PISTON THAT APPLIES FORCE ON THE CAM EDGE, TILTING THE OFF-SET WEDGE TO HOLD THE TUMBLER SECURELY |
| 2711 |
| PROVIDING A SETUP WITH MULTIPLE TUMBLER SUPPORT ASSEMBLIES ARRANGED SIDE-BY-SIDE TO SIMULTANEOUSLY SUPPORT A PLURALITY OF TUMBLERS OR BOTTLES |
| 2712 |
| CONNECTING PIVOTING ARMS TO INDIVIDUAL TUMBLER SUPPORT ASSEMBLIES, CONTROLLED THROUGH A CENTRAL LEVER, ENABLING SYNCHRONIZED TILTING OF MULTIPLE OFF-SET WEDGES FOR HOLDING TUMBLERS |
| 2713 |
| USING A LOCKING MECHANISM TO SHIFT BETWEEN ALIGNED AND TILTED POSITIONS OF THE OFF-SET WEDGES, ENABLING EASY INSERTION, SECURE ENGAGEMENT, AND REMOVAL OF TUMBLERS |
| 2714 |
| OFFERING MULTIPLE CONTROL METHODS, INCLUDING SCREW-BASED ACTUATION, SPRING-LOADED LEVERS, SPINDLE ARMS, CAM MECHANISMS, AND BLADDER EXPANSION SYSTEMS, FOR PRECISE ENGAGEMENT OF TUMBLERS |
| 2715 |

FIG. 27B

METHODS AND APPARATUS FOR SECURELY SUPPORTING TUMBLERS AND BOTTLES USING ADJUSTABLE TILT MECHANISMS

CROSS REFERENCE TO RELATED APPLICATIONS

This application is a Continuation-in-Part of, and claims priority to U.S. Non-Provisional application Ser. No. 18/410,941, filed Jan. 11, 2024, entitled METHOD AND APPARATUS FOR IMPROVED TUMBLER SUPPORT; which is a Continuation-in-Part of, and claims priority to U.S. Non-Provisional application Ser. No. 18/081,187, filed Dec. 14, 2022, entitled METHOD AND APPARATUS FOR IMPROVED TUMBLER SUPPORT, which claims the benefit of Provisional Application No. 63/289,190 filed Dec. 14, 2021, entitled METHOD AND APPARATUS FOR IMPROVED TUMBLER SUPPORT, the entire disclosures of each of which are incorporated herein by reference.

FIELD OF THE DISCLOSURE

The present invention relates to methods and apparatus for improved support and handling of a drinkware, particularly tumblers and bottles. More particularly, the invention pertains to adjustable support mechanisms incorporating a tilting off-set wedge, flexible arms, bladder-based gripping systems, butterfly-type mechanisms, and other customizable configurations for engaging interior surfaces of various drinkware items. These apparatuses are suitable for applications in industrial, commercial, and personal contexts, including but not limited to engraving, painting, decorating, and display purposes.

BACKGROUND OF THE DISCLOSURE

The lidded tumbler market is expanding as users look for green options that do not result in the generation of waste that enters landfills or negatively impacts climate change variables. The U.S. market for tumblers is on track to reach a billion dollars annually by 2023. Younger people in particular seem inclined to use tumblers during various outdoor activities such as camping, hiking, fitness, and travel. The younger demographic is also eager to be expressive and therefore use customized tumblers that help them declare themselves. In another aspect, promotional tumblers are used to reach potential customers during non-blue light hours (hours during which the customer is not engaged in online activities). Accordingly, tumblers may have customized prints, logos, and messages.

Tumblers may have various shapes, including different interior volume shapes, and may include various materials, such as stainless steel, aluminum, plastic, glass, double-walled vacuum, coatings, and the like. Stainless steel tumblers are increasingly growing in popularity due to a variety of reasons. They are known for their durability and resistance to rust and corrosion, making them a long-lasting option compared to other materials. These tumblers often have excellent insulation properties, keeping beverages hot or cold for extended periods. Customization of the various shapes requires that the tumbler be securely supported and often rotated during the customization processes. Secure support ensures that the tumbler stays in place, allowing for precise application of designs, whether they are being engraved, printed, or painted. Securely holding the tumbler in place is important for safety, especially when using tools like engravers or lasers. Further, certain tumbler designs, such as those with irregular or tapered interiors, create additional challenges for achieving a stable and uniform grip. These shapes may require adaptive mechanisms for proper alignment and consistent rotation during customization.

Currently, the apparatus used for support of the tumbler during customization work is not precise in its ability to align and/or rotate the tumbler with a support shaft during customization processes. Typical support mechanisms are simply a piece of foam stuck onto a piece of pipe which provides inconsistent support and sometimes results in the tumbler becoming dislodged such that the artwork on the tumbler is compromised. In other scenarios, it is difficult to replicate a design due to inconsistencies in the support. Additionally, existing solutions often fail to account for tumblers of varying materials, such as plastic or glass, which may require softer contact surfaces to prevent damage or scratches during support. These limitations reduce the effectiveness of current customization workflows, particularly in scenarios requiring high precision and durability.

Thus, there is a need for an improved tumbler support apparatus that can offer enhanced stability, precise alignment, and adaptability to various tumbler designs, ultimately contributing to the efficiency and safety of the customization process. Such an apparatus should accommodate tumblers with unique geometries and delicate materials while facilitating reliable and repeatable performance across multiple customization techniques. Incorporating mechanisms for adjustable gripping force, modularity, and material compatibility would greatly benefit users seeking to optimize customization processes. Such an apparatus would represent a significant advancement in the field of tumbler customization, meeting both the artistic needs of designers and the practical demands of manufacturers and consumers alike.

SUMMARY OF THE DISCLOSURE

Accordingly, the present invention provides methods and apparatus to quickly and securely fasten a tumbler cup to a spindle turner arm in a consistent and accurate, and repeatable manner for various applications, such as customization or display.

Embodiments may include a handle that fixedly attaches to a spindle turner arm and a tumbler cup. In some embodiments, the handle may attach to a rim of the tumbler cup, such as via a threaded portion abutting the rim. The threaded portion may be an interior thread or an exterior thread depending upon the design of the tumbler cup and the spindle turner may be inserted into a concentric opening through the handle. The spindle turner may be secured with a set screw or other fastening device.

In some embodiments, the handle portion may be placed into an interior chamber of a tumbler cup while the handle is in an inactive state. The spindle turner arm can be inserted into the handle. As the turner arm is inserted into the handle, plungers contained within plunger channels in the handle are transitioned to an active state and moved outward towards an interior chamber surface of the tumbler. The plunger mechanism may include a spring-actuated system that facilitates a smooth transition from the inactive to the active state, ensuring minimal user effort.

In some preferred embodiments, seals, such as for example, silicon beads, are pushed by the plungers outwards against the interior chamber surface thereby fixedly attaching the handle to the interior chamber surface. The spindle turner arm is attached to the handle, and the handle is fixedly attached to the tumbler while the handle is within the interior chamber and in an active state, the spindle is also fixedly attached to the tumbler while the handle is within the interior chamber and in an active state.

By removing the spindle turner arm, the handle may be placed back into an inactive state and disengaged from the tumbler and removed from the interior chamber. In this state, the components that previously expanded to secure the tumbler, such as plungers, retract thereby releasing their grip on the tumbler's interior surface.

In general, the present invention provides for a tumbler cup support apparatus that includes a tumbler support body having a cylindrical hollow into which a spindle turner arm may be inserted. The plunger may be supported by the tumble support body. The plunger may include a first plunger end directed towards the cylindrical hollow and a second plunger end directed towards a perimeter of the tumbler support body. A cam may be integrated into the first plunger end, the cam being placed in contact with the spindle turner arm when the spindle turner arm is inserted into the cylindrical hollow.

A formable interface may be in contact with the second plunger surface and movable against a surface of an interior chamber of a tumbler cup. The formable interface may include layered materials or embedded microstructures to provide enhanced grip and durability.

Implementations may include one or more of the following features: a tumbler cup support apparatus additionally having a set screw through the tumbler support body, the set screw adjustable to secure the spindle turner arm to the tumbler support body; the formable interface may include a silicon sphere; a gasket between tumbler support body and the tumbler cup; the tumbler support body may include an upper portion and a lower portion, the lower portion encompassing the plunger and the silicon sphere. The lower portion of the tumbler support body may be fixedly attached to the upper portion of the tumbler support body, such as for example with one or more threaded connectors.

The cam integrated into the first plunger end and the formable interface in contact with the second plunger surface may be replaced with a bladder. This bladder, possibly made of a flexible and durable material such as silicone or rubber, is designed to expand and contract within the tumbler support apparatus. When the spindle turner arm is inserted into the apparatus, it interacts with the bladder system. As the arm is pushed in, the bladder expands outward, exerting a uniform pressure against the interior surface of the tumbler.

Methods of the present invention may include supporting a tumbler cup in a tumbler support body and plunger into an interior chamber of the tumbler cup. Supporting may include positioning a seal between the plunger and a surface of the interior chamber. Supporting may furthermore include inserting the spindle turner arm through a cylindrical hollow in the tumbler support body. The cam may contact the spindle turner arm.

Supporting may moreover include pushing the spindle turner arm past the cam causing the plunger to move outward towards a surface of the interior chamber. The plunger may be extended outward, deploying the plunger into an active state, and placing the seal into contact with the surface of the interior chamber. Supporting may furthermore include rotating the spindle turner arm, and as a result of the rotating the spindle turner arm, transferring rotational force to the tumbler cup.

In some embodiments, a minimal amount of outward force may be exerted with the plunger such that the seal is placed in contact with the surface of the interior chamber.

The plungers may be removed from an active state by removing the spindle turner arm from the tumbler support body; and reducing the amount of outward force by the seals in contact with the surface of the interior chamber. In some embodiments, each plunger and a respective cam are integrated to each other creating a unified component within the tumbler support apparatus. This integration streamlines the internal mechanism, reducing the number of separate moving parts and thus the potential for mechanical failure. With the plunger and cam functioning as a single unit, the force applied to the plunger is more direct and controlled, enhancing the precision with which the plunger extends and retracts. This consolidated design may allow for a smoother transition as the spindle turner arm engages with the cam, causing the integrated plunger to deploy outward towards the tumbler's interior surface.

A cam may include a slope surface, and the method may include contacting the slope surface with the spindle turner arm and moving the cam outward towards the surface of the interior chamber as a result of the contact of the slope with the spindle turner arm. The tumbler support body may be connected to a handle and the method may additionally include the step of securing the spindle turner arm to the handle and the tumbler support body with a fastener.

In some embodiments, a tumbler cup support apparatus may be designed to optimize the stabilization and handling of tumbler cups for customization. The tumbler cup support apparatus may comprise a tumbler support body featuring a cylindrical hollow extending from a top portion to a bottom portion of the support body. A spindle turner arm can be inserted into the cylindrical hollow, aligning with the central axis of the support body.

Additionally, a stem may extend from the bottom portion of the tumbler support body, designed to be in the same plane as the cylindrical hollow, enhancing the stability and alignment of the tumbler cup support apparatus. The tumbler support body may comprise at least one plunger mechanism. Each of these plunger mechanisms supports one or more plungers, where each plunger has a first end directed towards the cylindrical hollow and a second end directed towards the perimeter of the support body.

Furthermore, each plunger mechanism may house one or more formable interfaces (or seals) where one of the formable interfaces is in contact with one of the plungers within each such plunger mechanism. Integrated into one of the plungers in each plunger mechanism is a cam, which facilitates the activation and deactivation of the plungers. When the spindle turner arm is rotated or moved through the cylindrical hollow, it interacts with the cam, causing the plungers to extend outwards, thereby causing the formable interfaces (or seals) to grip on the tumbler cup.

In some embodiments, the tumbler cup support apparatus may comprise at least one cam designed with a sloped surface. The method of supporting the tumbler cup may include the step of contacting this slope surface with a spindle turner arm, which also comprises a second slope surface. When the spindle turner arm is inserted into a cylindrical hollow of the tumbler support body, its slope surface comes into contact with the slope surface of the at least one cam.

As a result of this contact between the two slope surfaces, the cam is driven outward towards the interior surface of the tumbler cup's interior chamber. The slope-to-slope contact between the slope surfaces on the cam and the spindle turner arm facilitates a smooth and controlled outward movement and deployment of the plunger-mechanism.

In some embodiments, the method may include the step of reproducing a tumbler cup support experience via aligning the tumbler support body to the handle with reference to alignment marks on the handle. Additionally, the methods may include placing a gasket between the tumbler support body and the tumbler cup.

A tumbler support body may include an upper portion and a lower portion, the lower portion encompassing the plunger and the cam, and the method may further include securing the lower portion to the upper portion with one or more screws.

In some embodiments of the present invention, an apparatus for supporting a tumbler, bottle, or similar items is disclosed. The apparatus includes a handle portion, a stem portion, and a control mechanism, each designed to function cohesively to securely hold the item during various operations. The handle portion serves as the user interface and includes a point of insertion for a control element, such as a threaded screw. Fixedly positioned within the handle portion is a plate with an attached first nut, which works in conjunction with other components to enable controlled actuation of the stem portion. To enhance user comfort, the handle may also include a rubberized grip or ergonomic enhancements, facilitating case of use over extended periods.

The stem portion extends from the handle and comprises an upper stem portion and a lower stem portion. The upper stem portion features a tapered bottom surface, which interacts with the tapered top surface of the lower stem portion, also known as the off-set wedge. This interaction allows for a tilting motion, which facilitates engagement of the interior surface of the tumbler or bottle. The off-set wedge is equipped with a second nut positioned at its base, which assists in controlling its linear and angular displacement relative to the upper stem portion. This configuration allows the apparatus to adapt to various shapes and sizes of items, providing a secure grip without causing damage.

The control mechanism is central to the operation of the apparatus and varies depending on the embodiment. In one configuration, a threaded screw extends through the handle portion, engaging with the first nut and the second nut. Rotational movement of the screw generates linear displacement, which in turn causes the off-set wedge to tilt. The precision of this mechanism is enhanced by the placement of predefined threaded portions along the screw's shank, facilitating smooth and controlled actuation. In alternative embodiments, a spring-actuated mechanism replaces the threaded screw. This mechanism includes a spring-loaded piston or lever that applies force to tilt the off-set wedge. This configuration offers quick and efficient operation, particularly in scenarios requiring frequent adjustments.

In another embodiment, the control mechanism employs a cam system comprising a cam rotation portion and a cam edge. As the cam rotates, it induces a tilting motion in the off-set wedge, providing a robust alternative to screw-based mechanisms. For items requiring delicate handling, the apparatus may feature a bladder surrounding a plurality of flexible arms. Actuation of the control mechanism compresses the bladder, causing it to expand outward and gently engage the interior surface of the item. This setup is particularly beneficial for fragile or irregularly shaped items, where traditional gripping mechanisms might cause damage.

The apparatus is highly versatile, with the stem portion being adaptable to various configurations. In one embodiment, the stem portion comprises a plurality of flexible arms connected to flexible strings anchored within a chamber in the handle portion. A spindle mechanism adjusts the tension of these strings, controlling the expansion and contraction of the arms. This configuration allows the apparatus to securely hold items of different sizes and shapes. Additionally, the flexible arms may be equipped with soft-tip extensions made of silicone or rubber, further preventing damage to the item during handling.

For applications requiring a more specialized grip, the stem portion may incorporate a butterfly-type mechanism. This mechanism features wing portions that expand or contract to conform to the interior surface of the item. A spindle arm presses the center of the mechanism to control the movement of the wings, providing a secure and uniform grip. This configuration is particularly useful for items with irregular or asymmetrical shapes.

The apparatus can be employed in a wide range of applications, including industrial processes like engraving and painting, as well as aesthetic uses such as displaying items in restaurants or exhibitions. For example, the bladder mechanism provides a soft grip that prevents surface damage during painting or engraving. In setups requiring the support of multiple items, the apparatus can be integrated into assemblies with multiple support mechanisms, each tailored to hold a specific item securely. This modular approach allows for efficient handling of multiple items simultaneously, making it ideal for professional and commercial use.

Additional features may include alignment guides or markings on the handle and stem portions, enabling repeatable positioning for consistent results. The materials used in the construction of the apparatus, such as silicone, rubber, or lightweight metals, are chosen to balance durability with user comfort. Padding on the off-set wedge or flexible arms adds an extra layer of protection for the item, further enhancing the apparatus's versatility and functionality.

In some embodiments of the present invention, a method for supporting a tumbler, bottle, or similar items is provided using an apparatus comprising a handle portion, a stem portion, and a control mechanism. The process begins with positioning the stem portion of the apparatus within the interior of the tumbler. The stem portion includes an upper stem portion having a tapered bottom surface and a lower stem portion in the form of an off-set wedge that is configured to tilt. The actuation of the control mechanism applies a force to the off-set wedge, inducing a tilting motion. This tilting motion is facilitated by the interaction between the tapered bottom surface of the upper stem portion and the tapered top surface of the off-set wedge. As the off-set wedge tilts, it engages with the interior surface of the tumbler, thereby securing the tumbler firmly.

To achieve this, the control mechanism may include a threaded screw that extends through a point of insertion in the handle portion. The threaded screw interacts with two nuts: a first nut fixedly positioned within the handle portion and a second nut located at the base of the off-set wedge. By rotating the threaded screw, a force is applied that adjusts the position of the off-set wedge relative to the upper stem portion. As the screw rotates, the predefined threads on the shank of the screw interact sequentially with the first nut and the second nut. This rotational movement causes a precise linear displacement of the off-set wedge, which, through its tapered surface, initiates the tilting motion.

Once the off-set wedge is tilted and securely engages the interior surface of the tumbler, a locking mechanism associated with the handle portion may be utilized. The locking mechanism holds the threaded screw in a fixed position, preventing further movement and maintaining the off-set wedge in its tilted configuration. This facilitates that the tumbler remains securely supported without any risk of dislodgment during handling or rotation.

In some embodiments, the threaded screw may include a knurled head or an attached spindle to facilitate manual or automated rotation. This configuration allows for precise control over the screw's movement, so that the off-set wedge tilts to an optimal angle for secure engagement. The use of high-precision threads on the screw and nuts provides smooth operation and durability, even under repeated use.

The method may further involve ergonomic features to enhance usability. For example, the handle portion may include a rubberized grip to provide comfort during operation, particularly when supporting heavier tumblers or bottles. Additionally, the off-set wedge may be coated with a soft padding material, such as silicone or rubber, to protect the interior surface of the tumbler from scratches or damage during engagement.

In another embodiment, the method involves variations in the control mechanism. Instead of the threaded screw, a cam mechanism may be utilized. The cam mechanism includes a cam rotation portion and a cam edge, where the rotation of the cam induces a tilting motion of the off-set wedge. This variation may offer faster actuation, suitable for scenarios requiring quick setup and removal of the apparatus.

The method also allows for different configurations of the stem portion. For example, the stem portion may comprise a butterfly-type mechanism with expandable and compressible wing portions. Actuation of the control mechanism, such as a spindle arm, presses the center point of the butterfly-type mechanism, causing the wing portions to expand outward and securely engage the interior surface of the tumbler.

For applications involving delicate items, the method may utilize a stem portion with a plurality of flexible arms instead of the off-set wedge. These flexible arms can expand outward or collapse inward to contact the tumbler's interior surface. To enhance protection, a bladder may surround the flexible arms. When the control mechanism is actuated, the bladder expands to provide a soft contact surface, facilitating secure engagement without damaging the tumbler.

The method's adaptability allows it to be implemented across various scenarios, including supporting tumblers for painting, engraving, or display purposes. The modular nature of the apparatus facilitates that components can be interchanged or adapted for specific applications, making the method versatile and user-friendly. These features make the method suitable for both industrial and personal use, providing a reliable solution for securely supporting a wide range of items.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

FIG. 16 illustrates method steps for supporting a tumbler cup on a tumbler support apparatus in some embodiments of the present invention.

FIGS. 23A-23B illustrate an exemplary tumbler support apparatus, wherein tilting of an off-set wedge is facilitated through a spring-actuated lever mechanism, enabling secure engagement with the interior surface of a supported item.

FIGS. 27A-27B illustrate method steps that may be implemented in some embodiments of the present invention.

Figure 1:
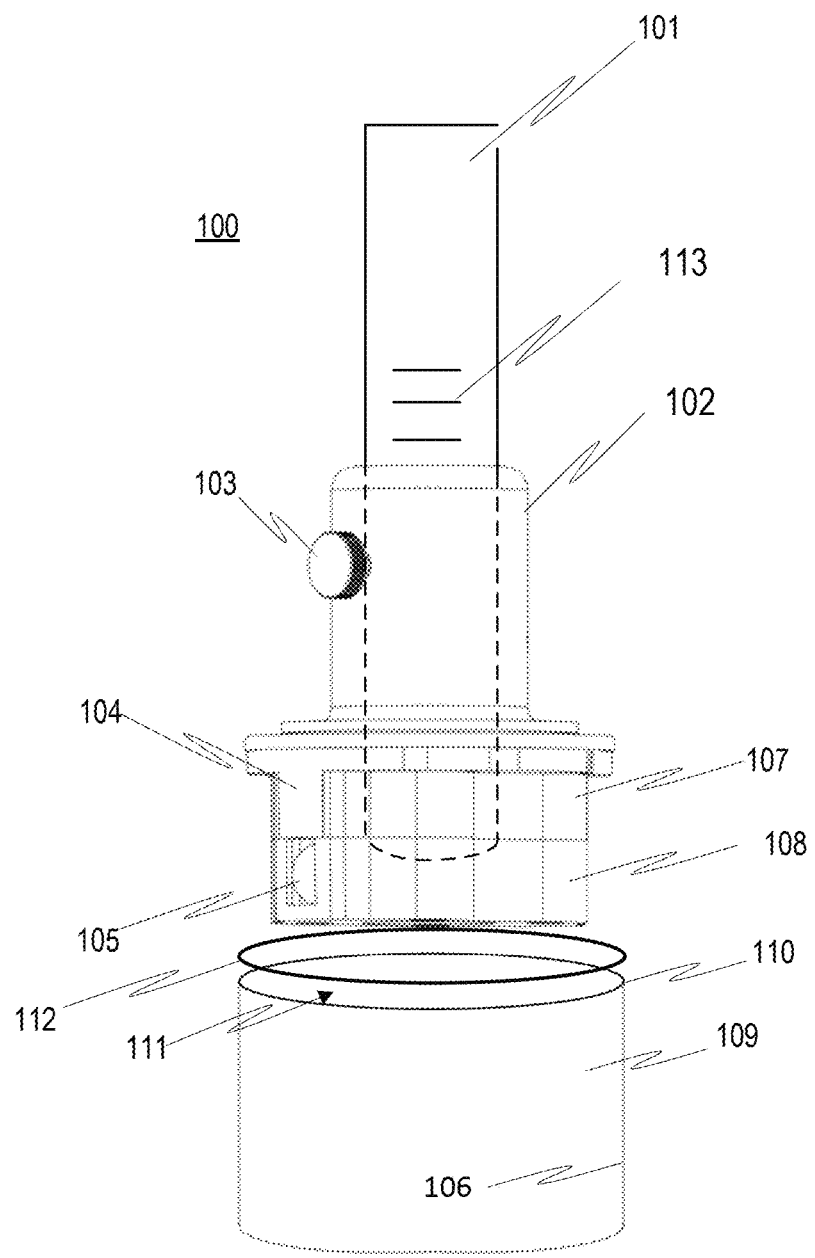
FIG. 1 illustrates an exploded view of an apparatus in accordance with some embodiments of the present invention.

The drawings are not necessarily drawn to scale unless clearly indicated otherwise. Dimensions, where shown, are typical dimensions in units of inches.

DETAILED DESCRIPTION

The present invention provides for apparatus and methods to hold a tumbler cup securely and consistently in a manner that permits rotation of the tumbler and repeatable handling of similar tumbler cups.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood, the examples do not limit the broadness of the aspects of the underlying disclosure.

Embodiments in accordance with the present disclosure provide methods and apparatus for consistent and secure attachment of a spindle turner arm to a tumbler cup via a handle that is securable to the tumbler cup via a mechanism appropriate to a particular cup design.

Preferably the handle includes a receiving via or other void to receive in a spindle turner arm and secures the spindle turner arm to the handle with a set screw or other quick-release fastening mechanism.

In some preferred embodiments, the present invention includes a handle that is secured to the tumbler cup by threading the handle onto a threaded portion of the tumbler cup. Typically, the threaded portion of the tumbler cup is suitable for securing a cap onto the tumbler cup. The threaded portion may include internal or external threads.

In other preferred embodiments, a handle is inserted into an interior chamber of the tumbler cup and extends plungers outward from the handle to contact the surface of the interior chamber. In some embodiments, ends of the plungers that extend outwards may include seals, such as silicon spheres that are compressed against the interior surface thereby creating a secure bond between the handle and the tumbler cup.

Still further, in some embodiments, the plungers may be user-replaceable. A user may select an appropriate size plunger to exert a desired amount of pressure by the plunger against the surface of the interior chamber. A "size" of a plunger may include one or both of a length of the plunger and a surface area of the end of the plunger that extends into contact with the surface of the interior chamber, either with or without a seal.

In another aspect, in some embodiments, the plungers may be associated with a cam that is acted upon by the spindle turner arm. As the turner arm is inserted into the concentric via for receiving the turner arm, the turner arm will come into contact with the cam and as the turner arm continues into the handle, the cam will rotate and force the plunger outward towards the interior chamber surface. Preferably the outward-facing end of the plunger will support a seal, such as a volume of silicone that will be compressed between the plunger and the surface of the interior chamber and thereby prevent the plunger from moving along the surface of the interior chamber as the handle is turned by the spindle turner arm.

A speed of rotation of a spindle turner arm may vary according to a procedure being performed upon the tumbler cup. Typically, the speed will be between 1 and 5 rotations per minute, with 3 rotations per minute being preferred for many procedures.

A number of plungers used to secure the handle may vary according to a design of a plunger body. Preferred embodiments may include between 2 and 6 plungers, although 1 plunger is within the scope of the present invention and more than 6 plungers is also within the scope of the present invention (such as a radial spoke design).

In some embodiments of the present invention, the apparatus for supporting a tumbler, bottle, or similar items comprises a handle portion, a stem portion, and a control mechanism, all intricately designed to provide secure engagement with the interior surface of a tumbler or similar item. The handle portion includes a point of insertion for receiving a threaded screw, with the screw passing through a first nut attached to a plate that is fixedly positioned within the handle. This construction provides a stable base for controlling the movement of the stem portion, providing precise interaction with the item being supported.

The stem portion extends downward from the handle and includes an upper stem portion with a tapered bottom surface and a lower stem portion in the form of an off-set wedge. The off-set wedge features a tapered top surface that aligns with the tapered bottom surface of the upper stem portion, creating a dynamic interaction that facilitates tilting. At the base of the off-set wedge, a second nut is positioned to guide the movement of the threaded screw, enabling controlled tilting of the wedge. The interaction between the tapered surfaces not only allows for precise tilting but also enhances the engagement force, making the apparatus suitable for securely holding items with varying internal dimensions.

The control mechanism is designed to actuate and regulate the movement of the off-set wedge. In one configuration, the control mechanism includes a threaded screw that extends through the handle, interacting with both the first and second nuts. The screw's shank comprises predefined threaded portions that allow controlled linear displacement of the off-set wedge. Rotational movement of the screw causes the off-set wedge to tilt relative to the upper stem portion. This tilting motion is induced by the alignment of the tapered surfaces, which directs force towards the interior surface of the tumbler, securely holding it in place. The threaded screw may include a knurled head for manual operation, facilitating easy adjustments without the need for additional tools.

In alternative embodiments, the control mechanism may utilize a spring-actuated system in place of the threaded screw. The spring-actuated mechanism includes a spring-loaded piston or lever that applies force to the off-set wedge, causing it to tilt. This configuration offers rapid actuation and is particularly suitable for applications requiring frequent adjustments. A tension spring may be positioned between the upper stem portion and the off-set wedge to bias the wedge into a default tilted position, which can be adjusted using the spring-loaded piston or lever. A user-actuated knob may be included to compress the tension spring, transitioning the off-set wedge from its default tilted position to a straight configuration for insertion into the tumbler.

In yet another variation, the control mechanism incorporates a cam system, including a cam rotation portion and a cam edge. The cam mechanism interacts with the off-set wedge to induce tilting when actuated, offering precise control over the engagement angle. This design is particularly beneficial for items with irregular internal surfaces, as the cam mechanism can adapt to varying geometries.

For additional versatility, the stem portion may be replaced by a butterfly-type mechanism. In this configuration, the stem comprises expandable and retractable wing portions connected to a central pivot point. A spindle arm mechanism presses against the central point to control the expansion and contraction of the wing portions, enabling secure engagement with the interior surface of the tumbler.

In other embodiments, the stem portion includes a plurality of flexible arms instead of the upper stem portion and off-set wedge. These flexible arms are configured to expand outward or collapse inward, depending on the dimensions of the tumbler. The arms may be actuated by a spring mechanism positioned within the stem portion. Each flexible arm may include a soft-tip extension made of silicone or rubber to prevent damage to the interior surface of the tumbler during engagement. A surrounding bladder may be incorporated to provide additional soft contact, so that the tumbler is securely held without risk of scratches or dents.

The flexible arms may also be connected to a set of flexible strings anchored within a chamber in the handle portion. A spindle within the chamber adjusts the tension of the flexible strings, thereby controlling the movement of the flexible arms. This configuration allows for precise control over the expansion and contraction of the arms, making the apparatus adaptable to a wide range of tumbler sizes and shapes. The chamber may include guide slots to direct the movement of the strings, facilitating smooth and consistent operation.

The handle portion may be designed with user comfort in mind, incorporating a rubberized grip for improved ergonomics. A locking mechanism may also be included to secure the control mechanism in a fixed position, maintaining the tilt of the off-set wedge or the expansion of the flexible arms as required. Additionally, the off-set wedge may feature a soft padding material on its exterior surface, such as silicone, rubber, or a polymer coating, to further protect the tumbler during use.

The tapered surfaces of the upper stem portion and off-set wedge are designed with angles ranging from 10 to 45 degrees, optimizing the tilting motion and engagement force. These surfaces work in tandem with the control mechanism to provide secure and reliable support for various items. The apparatus may also include modular components, such as replaceable spindles, to accommodate different use cases and enhance the versatility of the design.

FIG. 1 shows an assembled schematic view of a tumbler support apparatus 100 illustrating some embodiments of the present invention. A spindle turner arm 101 is shown inserted into a handle 102 and fixedly attached to and secured in place with a handle securing device 103. The handle 102 is removably attachable to a tumbler cup 109. The tumbler cup 109 will include an end with a tumbler cup opening 110. The handle 102 is insertable into the tumbler cup opening 110 and removably attached to a surface of an interior chamber 111.

One modality of removably attaching the handle 102 to the tumbler cup 109 includes exerting outward pressure on the interior chamber 111 with a formable interface 105, such as, for example, a silicon sphere. In some embodiments, the formable interface 105 may include other compliant materials, such as elastomers or thermoplastics, which provide a firm but non-damaging grip on the tumbler's interior. This flexibility allows the tumbler support apparatus 100 to accommodate tumblers (109) made from delicate materials such as glass or thin plastic.

As illustrated, the handle securing device 103 includes a set screw, such as a thumb screw. Other securing devices are within the scope of the present invention such as, for example, a friction seal, a spring-loaded mechanism, a pawl and detent, a magnet, or other mechanical or electromechanical mechanism that may be operated by a user to fixedly attach the spindle turner arm 101 to the handle 102 types, and preferably also detach the spindle turner arm 101 from the handle 102 in response to a subsequent action by the user.

In some preferred embodiments, a gasket 112 may be used to prevent the handle 102 from being adhered to the tumbler cup 109 with one or more of the coatings applied to the tumbler cup 109 during processing while the tumbler cup 109 is on the spindle turner arm 101. Embodiments may also include a lubricant in place of, or in addition to the gasket 112. Lubricants may include, for example, a grease, silicon, or other "wet" substance, or a dry lubricant, such as a graphite or powder type lubricant that cases separation of the handle 102 from the tumbler cup 109.

A plunger body may include an upper portion 107 and a lower portion 108 which may be fastened together with a fastener (not illustrated in FIG. 1), such as a snap, threaded bolt, rivet, magnet, or other known fastener 103. The fastener 103 may be received by a threaded knurl or other receptacle. The plunger body may also include modular slots or adjustable components to facilitate rapid customization of the tumbler support apparatus 100 for tumblers with different interior geometries or dimensions. The handle 102 will be secured against an interior surface 106 of the tumbler cup 109.

With the handle 102 secured against the interior surface 106 of the tumbler cup 109, the spindle turner arm 101 is preferably fixedly secured to the tumbler cup 109, in a position concentric to a center of a diameter of the tumbler cup 109, such that any movement of the handle 102 and spindle turner arm 101 causes a corresponding movement of the tumbler cup 109. Movement may include, for example, rotational movement of the spindle turner arm 101 resulting in rotation of the tumbler cup 109, arcuate movement of the spindle turner arm 101 resulting in arcuate movement of the tumbler cup 109, linear movement of the spindle turner arm 101 resulting in linear movement of the tumbler cup 109, or any combination of movement types wherein a movement of the tumbler cup 109 results in a corresponding movement of the tumbler cup.

In preferred embodiments of the present invention, a position of the spindle turner arm 101 in relation to a tumbler cup 109 is repeatable between the spindle turner arm 101 (or a similar spindle arm 101) and the tumbler cup 109 (or a similar tumbler cup 109). In some embodiments, positioning of the spindle turner arm 101 in relation to a tumbler cup 109 may be aided with alignment marks 113 on one or more of the spindle turner arm 101, the handle 102, the tumbler support body 104, and the tumbler cup 109.

Figure 2:
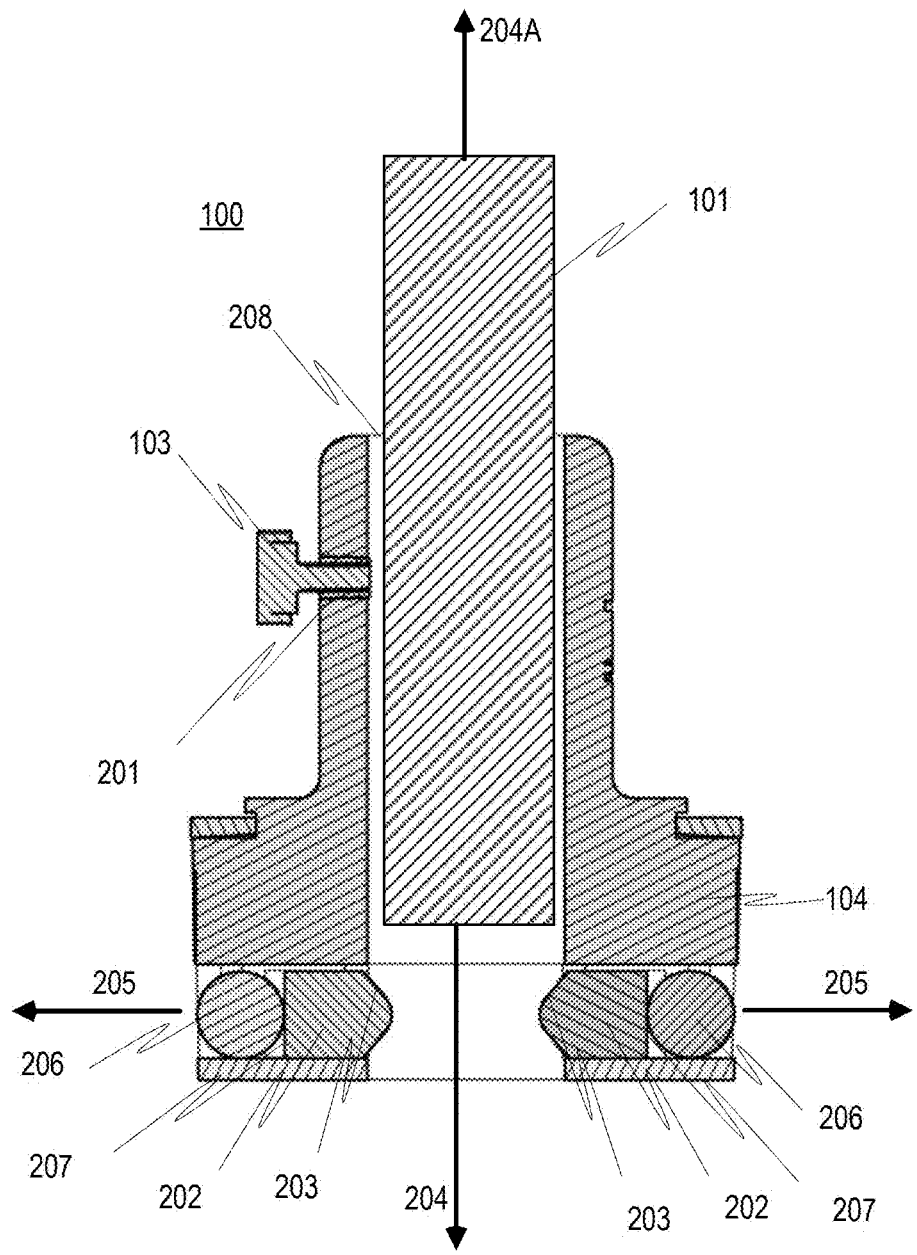
FIG. 2 illustrates a cutaway view of aspects included in the apparatus of the present invention.

Referring now to FIG. 2 illustrates a cut-away view of a tumbler support apparatus 100 illustrates a spindle turner arm 101 inserted into a tumbler support body 104. A cylindrical hollow 208 is formed through the tumbler support body 104. Preferably the cylindrical hollow 208 is concentric with the tumbler support body 104. As the spindle turner arm 101 is sufficiently moved in an inward direction 204 through the cylindrical hollow 208, the spindle turner arm 101 will contact one or more plungers 202. The plungers 202 may include a cam surface 203, such as a sloped or arcuate surface. Movement of the spindle turner arm 101 against the cam surface 203 will move the plunger 202 in an outward direction 205. Movement of the spindle turner arm 101 in an outward direction 204A, will release pressure against the cam 203 and relax pressure against the plunger 202 (as illustrated, release outward force 205).

One or both of: a degree of sloped area on the cam surface 203; and a length of sloped area on the cam surface 203 may be used to determine and/or adjust an amount of movement of the plunger 202 in an outward direction 205 as the spindle turner arm 101 moves past the cam surface 203.

In preferred embodiments, movement of plunger 202 in an outward direction 205 as the spindle turner arm 101 moves past the cam surface 203 causes a plunger surface 207 or a formable interface 206 to contact a surface of an interior chamber (see FIG. 1 item 111). The formable surface may include, by way of non-limiting example, a silicon sphere or other composition that will move against the surface of the interior chamber and lock the plunger body in place relative to the tumbler cup. The presence of the spindle turner arm 101 against the cam surface 203 provides sufficient outward 205 force to maintain the relative positions of the tumbler cup 109, the tumbler support body 104 and the spindle turner arm 101 so that the tumbler cup 109, the tumbler support body 104 and the spindle turner arm 101 may be moved and manipulated as if they were a single contiguous item.

A set screw 103 may extend through a set screw aperture 201 such that the set screw (illustrated as a knurled screw) may be rotated until it contacts the spindle turner arm and fixedly secures the spindle turner arm to the tumbler support body 104.

In some embodiments of the invention, the tumbler support apparatus 100 may be equipped with a modular plunger mechanism that features adjustable extensions. This design element allows for significant customization to accommodate a diverse array of tumbler sizes and shapes. Each plunger 202 within the mechanism can be extended or retracted to precisely conform to the specific contours and dimensions of the tumbler being secured. This adjustability of the plunger 202 can be achieved through various means such as telescopic segments, screw-based adjustment systems, spring-based adjustment systems, or sliding mechanisms integrated within each plunger. This adaptability may facilitate that tumblers, regardless of their unique profiles-whether they have a tapered shape, straight sides, or any other distinctive design—can be securely and snugly fitted into the tumbler support apparatus 100.

Telescopic segments of the plunger refer to a design where the plunger consists of multiple segments that slide into each other, similar to the sections of a telescope. This allows the plunger length to be easily adjusted by extending or retracting these segments. In the context of the tumbler support apparatus, this may enable the user to modify the length of each plunger to fit the size of the tumbler.

Screw-cased adjustment systems may use threaded screws to adjust the length or position of the plungers. By turning a screw, the plunger can be extended or retracted to the desired length. This precise adjustment mechanism is particularly useful for fine-tuning the fit of the plunger against the tumbler's surface. In some embodiments of the invention, one or more screws attached to such plungers can be tightened or loosened from the exterior of the tumbler support apparatus to adjust the plunger length to fit the size of the tumbler. Similarly, in spring-based adjustment systems, springs may be used to provide or regulate the tension and position of the plungers against the interior surface of the tumbler.

In some embodiments of the invention, the modularity aspect of the plunger mechanism further enhances its versatility. Components of the plunger mechanism can be swapped out or reconfigured depending on the specific requirements of the tumbler. For example, plungers 202 with different lengths, diameters, or end fittings can be utilized to provide optimal support for a wide range of tumbler designs. This adaptability allows users to customize the number of plungers engaged, providing optimal support for tumblers of varying sizes and shapes. For larger or uniquely shaped tumblers that require additional stability, extra plungers 202 can be easily added to the mechanism, thereby distributing the support more evenly around the tumbler's circumference. Conversely, for smaller or more standard-sized tumblers, fewer plungers may be necessary. This multi-plunger configuration not only enhances the versatility of the apparatus but also facilitates that each tumbler, regardless of its dimensions, receives precisely the right amount of support and grip necessary for effective and secure customization.

To provide enhanced stability during the customization process, such as when applying decorative coatings or engravings, the plungers exert an even and controlled pressure against the tumbler's surface. This stable grip prevents any unwanted movement or slippage, thereby facilitating a high-quality and precise customization outcome. The pressure applied by each plunger can be manually adjusted or, in more advanced embodiments, automatically calibrated by the apparatus based on the detected tumbler dimensions.

Moreover, the design of such a modular plunger mechanism prioritizes case of use and rapid adjustment, allowing for quick changes between different tumblers, which is particularly beneficial in settings where multiple tumblers are being customized in succession. This feature may significantly enhance the efficiency of the customization process, making the apparatus ideal for both high-volume commercial environments and individual artisanal use.

Figure 3:
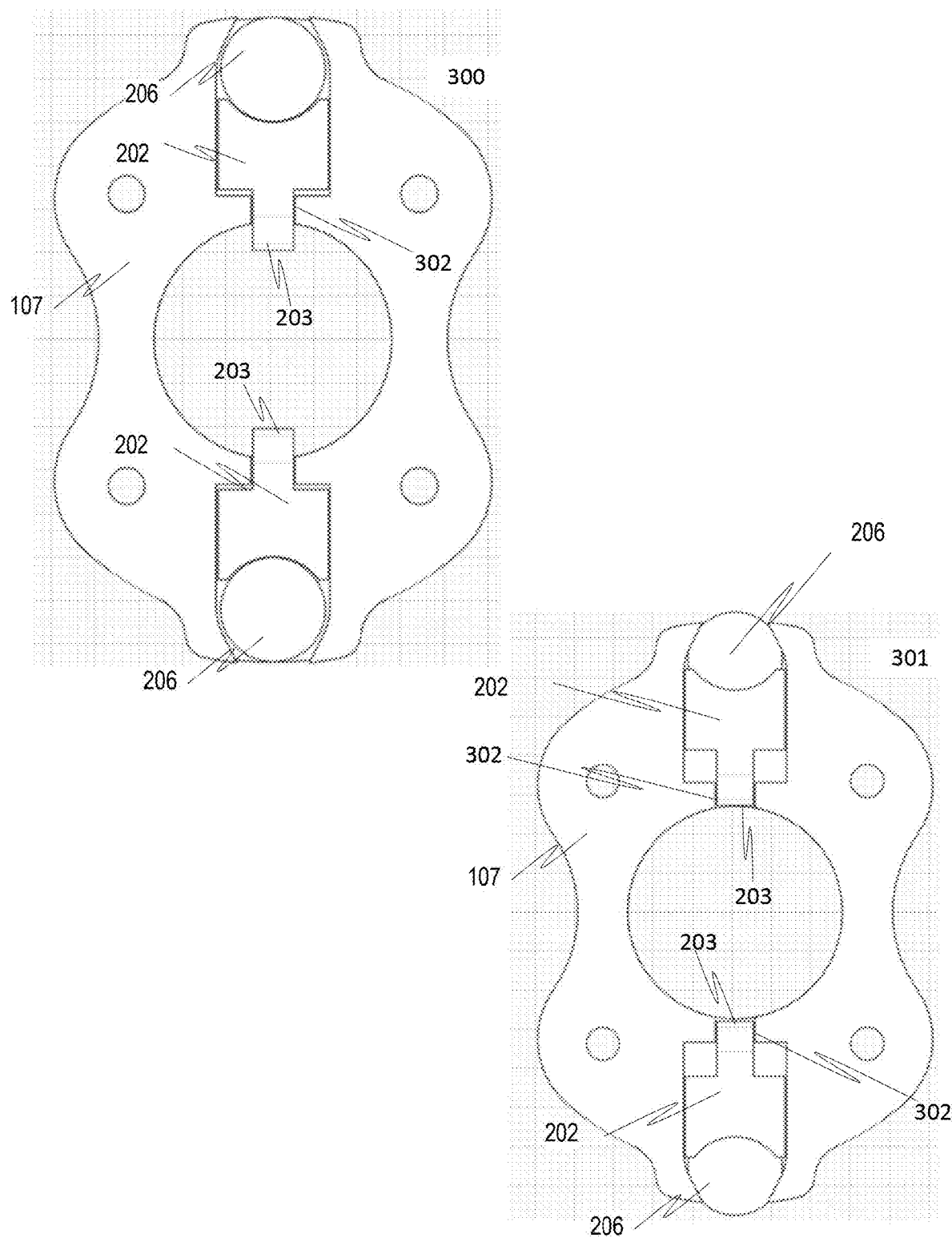
FIG. 3 illustrates a top-down view of a lower portion of the handle with plungers and seals in active and inactive states.

FIG. 3 illustrates a top-down view of a lower portion of the tumbler support body 104. The plungers 202 and corresponding formable interfaces 206 may be in an inactive state 300 or in an active state 301. The inactive state 300 allows the tumbler cup 109, the tumbler support body 104 and the spindle turner arm 101 to move independently of each other. The inactive state 300 refers to the formable interface 206 being retracted within the perimeter of the lower portion of the tumbler support body 104.

The active state 301 fixedly attaches the tumbler cup 109, the tumbler support body 104 and the spindle turner arm 101 to each other and allows the tumbler cup 109, the tumbler support body 104 and the spindle turner arm 101 to be manipulated as a single unit. The active state 301 is indicative of the formable interface 206 being extended outward from the perimeter of the lower portion of the tumbler support body 104.

In some embodiments, the sloped cam surface 203 may be guided by a cam guide 302 to maintain a correct position of the plunger 202 during movement initiated by contact between the plunger and the sloped cam surface 203.

In some embodiments of the invention, the spindle turner arm 101 may be designed with an innovative feature to enhance its interaction with the sloped cam surfaces 203 within the tumbler support apparatus. At the bottom end of the spindle turner arm 101 where it makes contact with the sloped cam surfaces 203, a sloped or beveled surface may be incorporated. This sloped design for the bottom end of the spindle turner arm 101 is intended to facilitate smoother engagement with the sloped cam surfaces 203, leading to a more efficient and controlled movement of the cams 203.

For example, when the spindle turner arm 101 is inserted into the support apparatus, its sloped end seamlessly slides along the sloped cam surfaces 203. This interaction allows for a gradual and precise application of force by the cams 203 onto the plungers 202. As a result of this smooth sliding motion, the plungers 202 are pushed outward with an optimal level of control and consistency. This outward movement of the plungers 202 facilitates that they exert the right amount of pressure against the interior surface 106 of the tumbler cup 109, securing it firmly in place. The sloped surface on the spindle turner arm 101 not only enhances the mechanical efficiency of the apparatus but also contributes to reducing wear and tear on the components, particularly the cams 203 and plungers 202. Additionally, the smoother interaction between the spindle turner arm 101 and the cams 203 minimizes the risk of sudden movements or jarring, which may potentially disrupt the precision of the customization process being applied to the tumbler.

Figure 4:
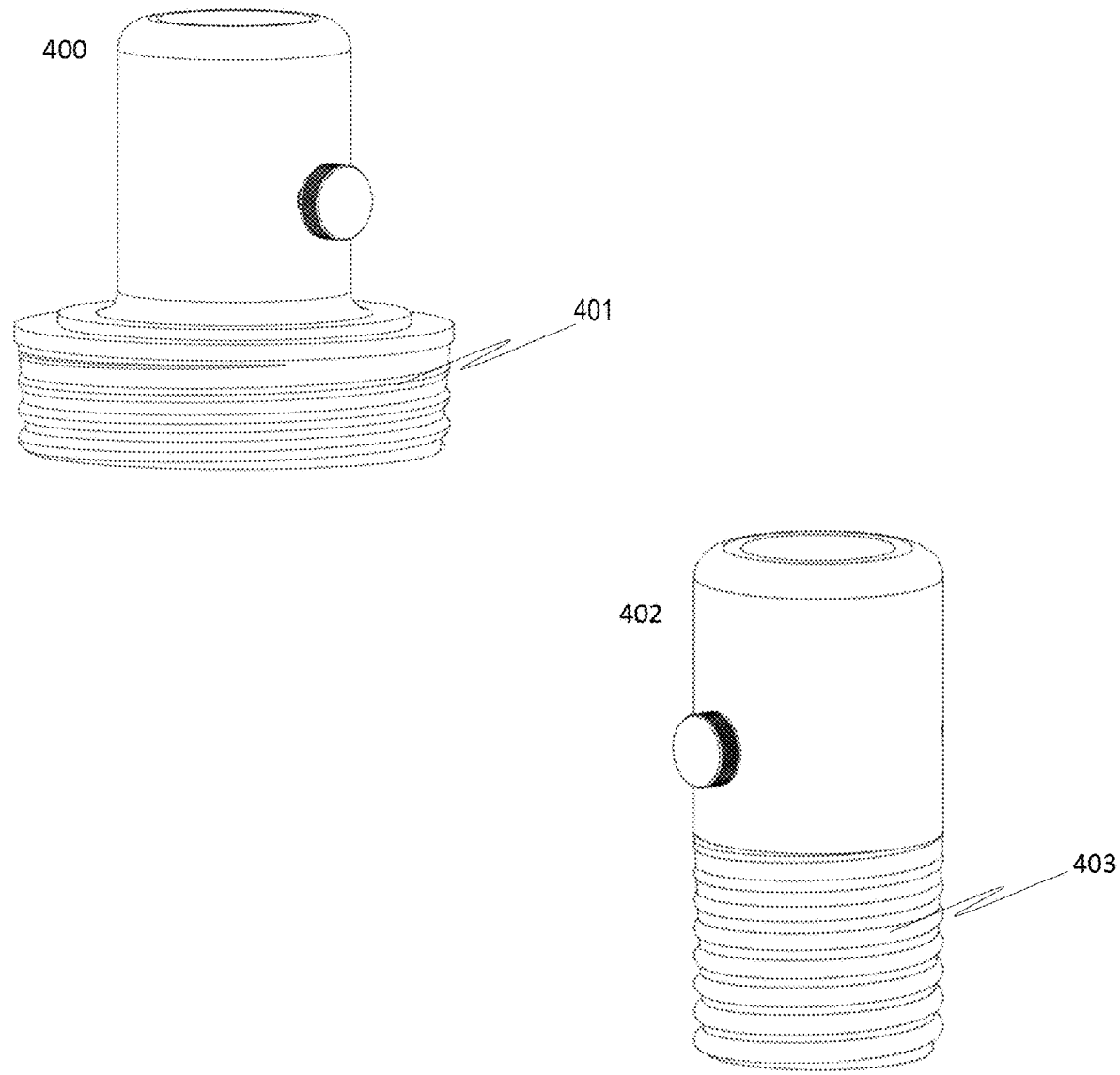
FIG. 4 illustrates a perspective view of wide-mouth tumbler support with an exterior wide mouth handle thread and a bullet tumbler support with an exterior handle thread.

FIG. 4 illustrates a perspective view of wide mouth tumbler support 400 with an exterior wide mouth handle thread 401 and a bullet tumbler support 402 with an exterior handle thread 403. The exterior wide mouth handle thread 401 may be used to removably connect the wide mouth tumbler support 400 to a wide mouth tumbler cup (not shown in FIG. 4). The bullet handle thread 403 may be used to removably connect the bullet tumbler support 402 to a bullet mouth tumbler cup (not shown in FIG. 4). In different embodiments, the exterior wide mouth handle thread 401 or the bullet mouth handle thread 403 may be used individually or in combination with a plunger apparatus described in FIG. 1 through FIG. 3 to fixedly connect a spindle turner arm 101 (not shown in FIG. 4) with a tumbler cup. When utilized in combination with the plunger apparatus (described in FIG. 1 through FIG. 3), these threaded supports offer an additional layer of stability and security. The threads provide the initial anchoring mechanism, attaching the support body to the tumbler. Subsequently, the plunger mechanism, once activated, further secures the tumbler from the inside. This dual action (external threading coupled with internal plunger support) facilitates that the tumbler is held firmly in place, minimizing any risk of slippage or misalignment, especially important during precision customization processes such as engraving or detailed printing.

In scenarios where a tumbler cup possesses interior threading, the exterior threaded portion 401 (or 403) may thread or engage into an interior threaded portion of the tumbler cup (not illustrated in FIG. 4) to secure the wide (or bullet) mouth tumbler support to the interior threaded tumbler cup. This engagement provides a strong, screw-in connection that ensures that the tumbler is securely attached to the support apparatus.

Figure 5:
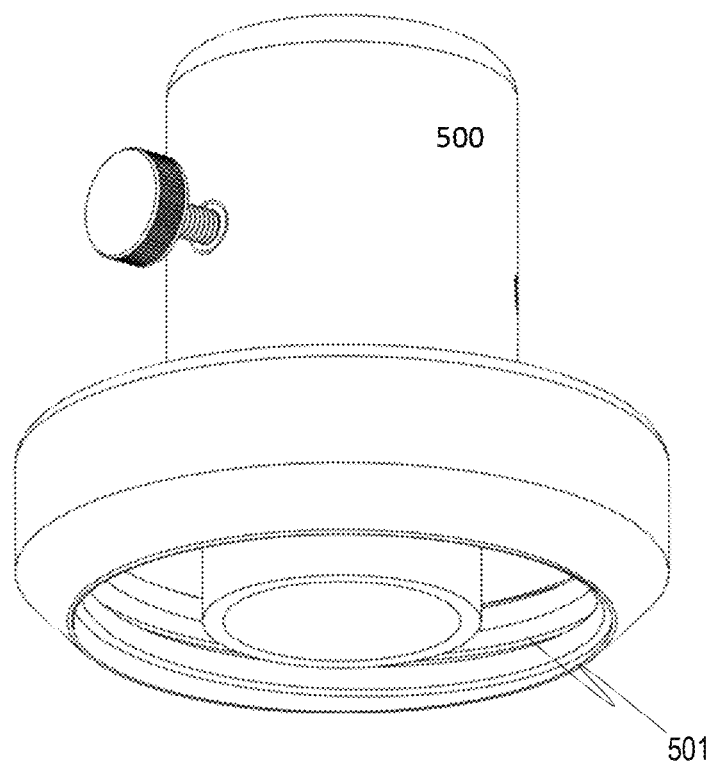
FIG. 5 illustrates a perspective view wide-mouth tumbler support with an interior wide-mouth handle thread according to some embodiments of the present invention.

FIG. 5 illustrates a perspective view of wide mouth tumbler support 500 with an interior wide mouth handle thread 501. The interior wide mouth handle thread 501 may be used to removably connect the wide mouth tumbler support 500 to a wide mouth tumbler cup (not shown in FIG. 5). In various embodiments, an interior wide mouth handle thread 501 may be used individually or in combination with a plunger apparatus described in FIG. 1 through FIG. 3 to fixedly connect a spindle turner arm 101 (not shown in FIG. 5) with a tumbler cup. An interior wide mouth threaded handle thread 501 may thread into an exterior threaded portion of a tumbler cup (not illustrated in FIG. 5) to secure the handle 400 to the tumbler cup.

In some embodiments of the invention, the wide mouth tumbler support 500 is designed not only for wide-mouthed tumblers but also for narrower tumbler cups that feature exterior threading. The interior wide mouth handle thread 501 of the support 500 may be strategically crafted to engage with the exterior threads of such narrower tumbler cups. For example, when a narrower tumbler cup with exterior threading is introduced into the wide mouth tumbler support 500, the interior wide mouth handle threads 501 align and interlock with the tumbler's exterior threads. This engagement creates a secure connection, effectively holding the tumbler inside the support 500. Such a design illustrates the versatility of the tumbler support apparatus, highlighting its capability to securely accommodate tumblers of various sizes and thread designs. By allowing for both wide and narrow tumblers to be securely held, the apparatus extends its utility across a diverse range of tumbler styles.

Figure 5A:
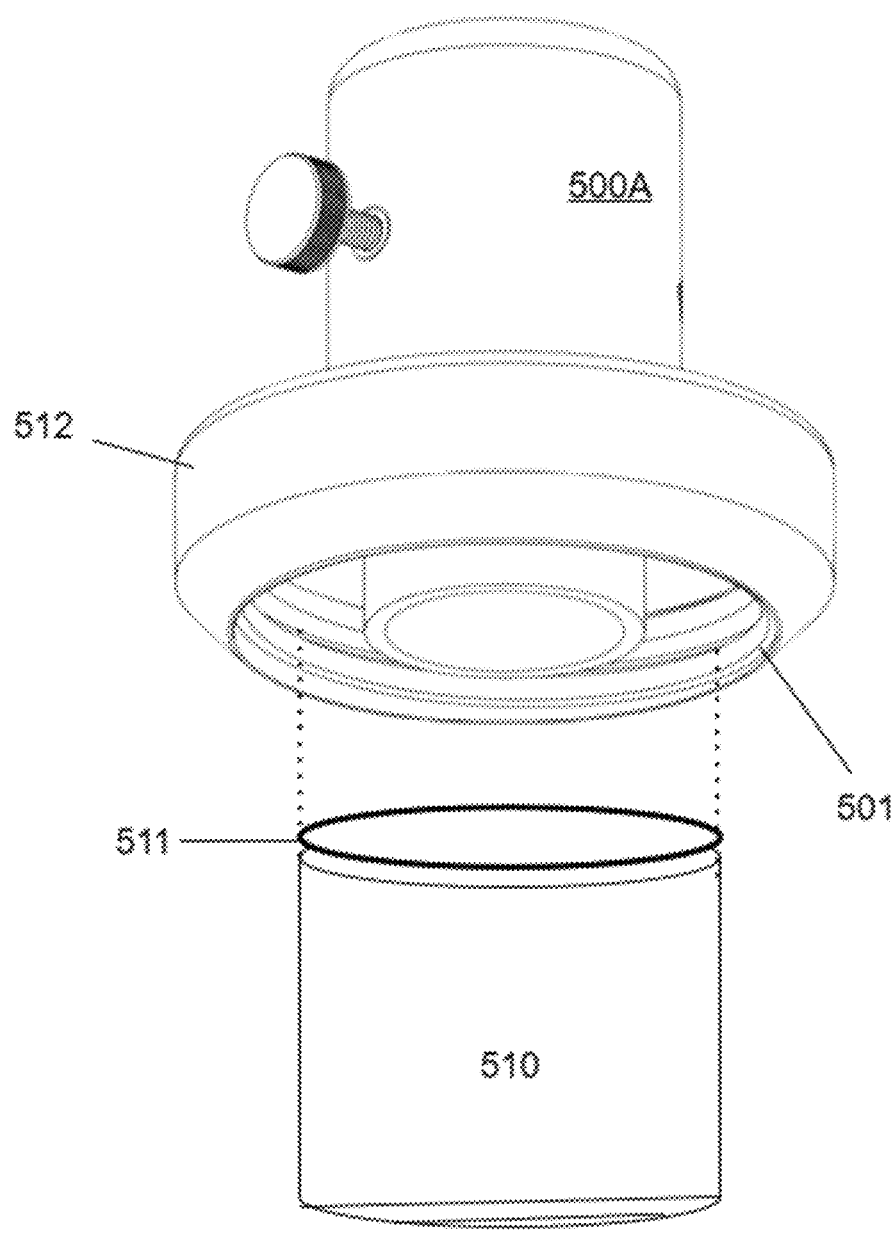
FIG. 5A illustrates a perspective view of the wide mouth tumbler support with the interior wide mouth handle thread for holding an exterior surface of a tumbler cup.

FIG. 5A illustrates one such example of a wide mouth tumbler support 500A with an interior wide mouth handle thread 501 designed to engage with an exterior surface of a tumbler cup 510, allowing for a secure and stable connection to the exterior surface of the tumbler cup 510 from outside. The exterior surface of the tumbler cup 510 may have exterior threading (not shown in FIG. 5A) to hold the tumbler cup 510 firmly from the outside.

A gasket 511, situated between the tumbler support 500A and the tumbler cup 510, serves a dual purpose. It may act as a cushioning agent to prevent any direct metal-to-metal contact, which may potentially cause scratches or other damage to the exterior of the tumbler cup 510. Additionally, the gasket 511 may also provide a seal to prevent the intrusion of any decorative materials or contaminants during the customization process.

The support body covering 512 of the tumbler support 500A, which may visually represent the outward appearance of the tumbler support body 104, internally houses the functional components such as one or more plungers 202 and cams 203. When the wide mouth tumbler support 500A is threaded or placed onto the exterior surface of the tumbler cup 510, the plungers 202 inside the support body covering 512 can be actuated, likely by the insertion of spindle turner arm 101 as shown in FIG. 1, which causes the cams 203 to exert an outward force. This force drives the plungers 202 to exert pressure on the exterior surface of the tumbler cup 510, so that the cup is held firmly and securely.

The inclusion of plungers 202 within the tumbler support body 104 inside the covering of the tumbler support 500A allows for a customizable fit and adds an extra layer of stability, accommodating a range of tumbler sizes within the wide mouth category. The cams 203 may translate the rotational movement of a spindle turner arm into linear force, effectively utilizing mechanical advantage to secure the tumbler cup 510 without the need for excessive manual effort.

By way of non-limiting example, an interior wide mouth thread, an exterior bullet thread, or an exterior wide mouth thread design may be used to connect a tumbler cup with a tumbler support with or without a plunger device (as described above for FIG. 1 through FIG. 3). This flexibility in design underscores the invention's capability to provide secure and stable support for an extensive variety of tumblers, thereby maximizing its utility in various customization contexts.

Figure 6:
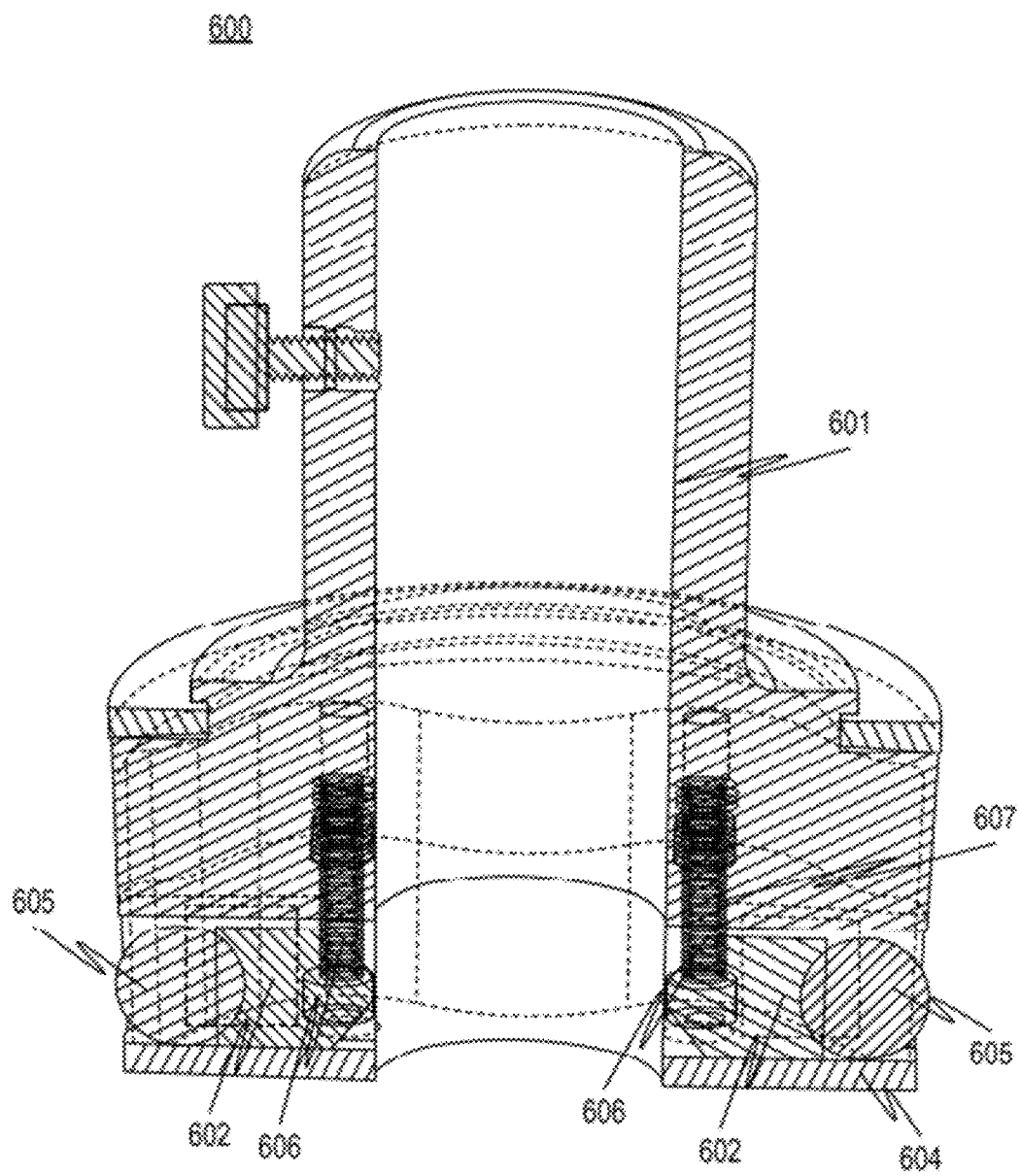
FIG. 6 illustrates a cutaway view of a handle, with a body, housing plungers, and silicon seals according to some embodiments of the present invention.

FIG. 6 illustrates a cutaway view of a support apparatus handle 601 with a tumbler support body 600 housing plungers 602 and silicon seals 605 (or formable surfaces similar to 206); and springs 606-607 enabling spring-loaded plungers 602. The springs 606-607 are important for the spring-loaded action that enables the plungers 602 to extend and retract with the appropriate force to push the silicon seals 605 against an interior surface of a tumbler cup to provide support. The springs 606-607 are designed to exert a calculated pressure that is strong enough to hold the tumbler cup firmly during customization tasks yet gentle enough to allow for easy placement and removal of the tumbler cup without the risk of deformation or damage. They also facilitate a responsive and smooth operation of the plungers 602 by tightening or loosening the screws 606-607, so that the apparatus can adapt to tumblers of various sizes and provide consistent performance throughout its use. The plungers 602 and silicon seals 605 may be secured in the body 601 with a lower plate 604 that is held in place with fasteners (such as a threaded bolt or screws) secured into a receiver (such as a threaded knurl). A gasket may also be included to prevent bonding of the support apparatus handle 601 to a tumbler cup (not shown in FIG. 6).

Figure 7:
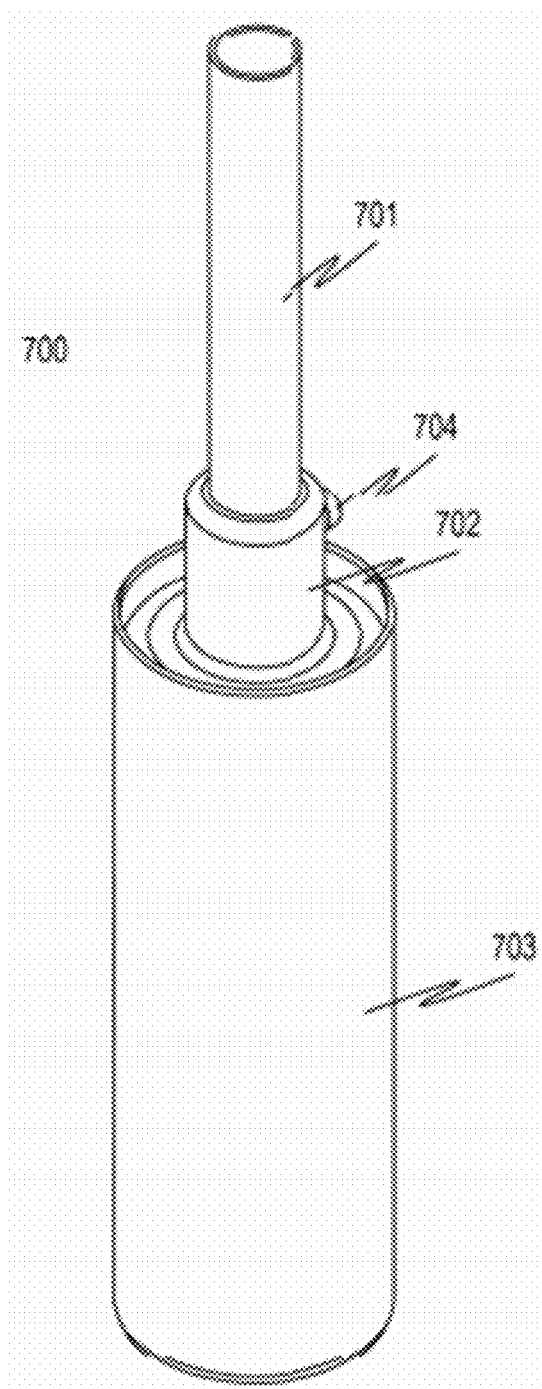
FIG. 7 illustrates an assembled tumbler support system according to some embodiments of the present invention.

Referring now to FIG. 7, a tumbler support system 700 in an assembled state with a spindle turner arm 701 inserted into an engaged handle 702 and fixedly attached to the engaged handle 702 via a set screw that includes a set screw 704. The engaged handle 702 is fixedly attached to a supported tumbler cup 703 through one or more of the fastening mechanisms described herein, which may include one or both of: an activated plunger mechanism and a handle thread.

Figure 8:
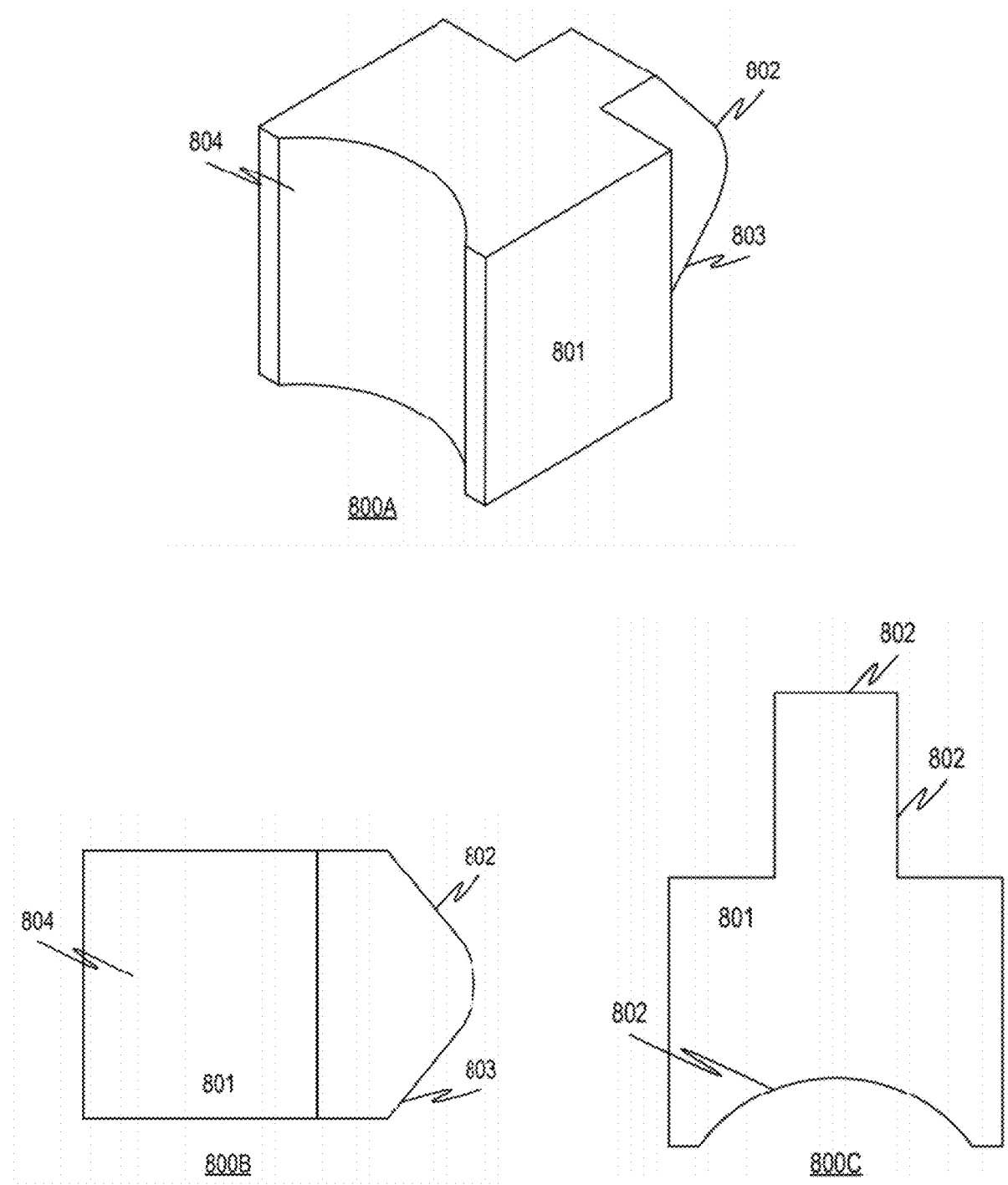
FIG. 8 illustrates multiple views of exemplary plungers.

Referring now to FIG. 8, multiple views 800A-800C of a plunger 801 illustrate aspects of the plunger 801, including: a plunger 801, a cam apex 802, a cam nadir (low point) 803, and a cam recess 804. The cam recess 804 may be used to position a formable interface (e.g., 206), such as a silicon seal (605), textured surface, or other suitable device for engaging an interior surface of a tumbler cup.

Figure 9:
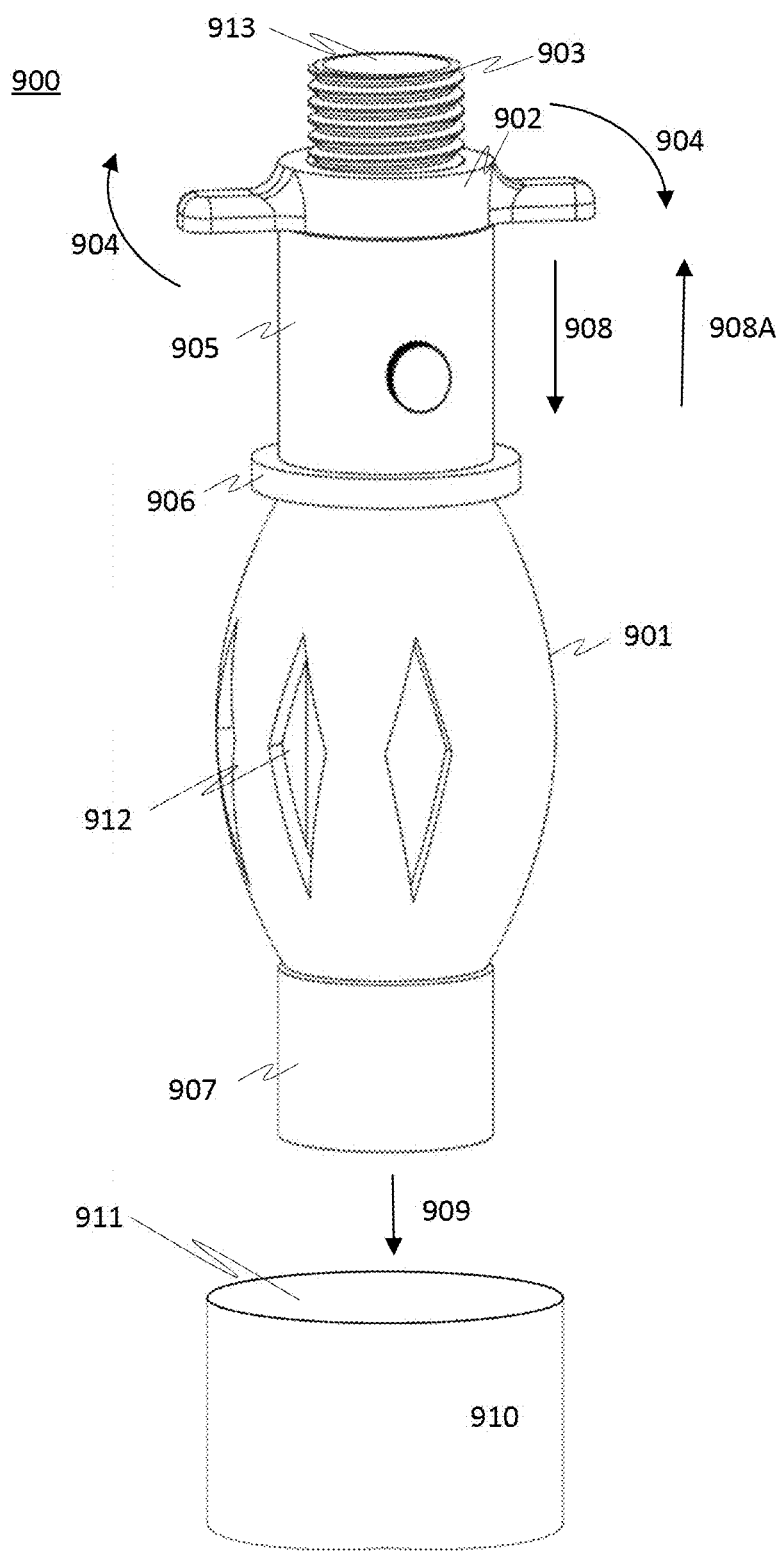
FIG. 9 illustrates a schematic diagram of a tumbler support system with a bladder according to some embodiments of the present invention.

Referring now to FIG. 9, a schematic diagram of a first compression activated tumbler support system 900 is illustrated. A compression activated bladder 901 may be sized to fit into an interior of a tumbler cup 910 when the compression activated bladder 901 is moved in a direction inward 909 into the interior of a tumbler cup 910. The compression activated bladder 901 may be solid or include stress relief cutouts 912 that facilitate expansion and compression of the compression activated bladder 901 that follows a desired shape pattern.

Compression and decompression of the compression activated bladder 901 may be accomplished by rotating a compression yoke 902 (such as in clockwise rotation 904) around a threaded portion 903 of a spindle turner arm 913 to move the compression yoke 902 in a compressive direction 908. In some embodiments, the compression yoke 902 will move an upper compression collar 905 against a grommet 906. In some preferred embodiments, a diameter of the grommet 906 will just slightly be less than a diameter of an interior surface 911 of a tumbler cup 910. With a diameter matching the interior surface 911 of the tumbler cup 910, the upper grommet 906 may be inserted with the compression activated tumbler support 900 into the tumbler cup 910 and be positioned concentrically with the tumbler cup 910.

A lower compression collar 907 may be a same diameter or smaller diameter than the upper compression collar 905. A smaller diameter facilitates case of insertion of the compression activated tumbler support 900 into the tumbler cup 910. The lower compression collar 907 may be brought closer to the upper compression collar 905 when the compression yoke 902 is rotated and moves the upper compression collar 905 in a compressive direction 908.

Expansion of the compression activated bladder 901 while the compression activated bladder 901 is inserted into the tumbler cup 910, causes the compression activated bladder 901 to apply outward pressure against the tumbler cup interior surface 911 and fixedly attaches the compression activated tumbler support 900 to the tumbler cup 910 in a repeatable fashion.

It is noted that rotating the compression yoke 902 in a rotational direction opposite to at direction for compression (such as, for example, in a counterclockwise direction), will allow the upper compression collar 905 to move in a decompression direction 908A and release the outward pressure of the compression activated bladder 901 against the tumbler cup interior surface 911 so that the compression activated tumbler support 900 is detached from the tumbler cup 910.

Figure 10:
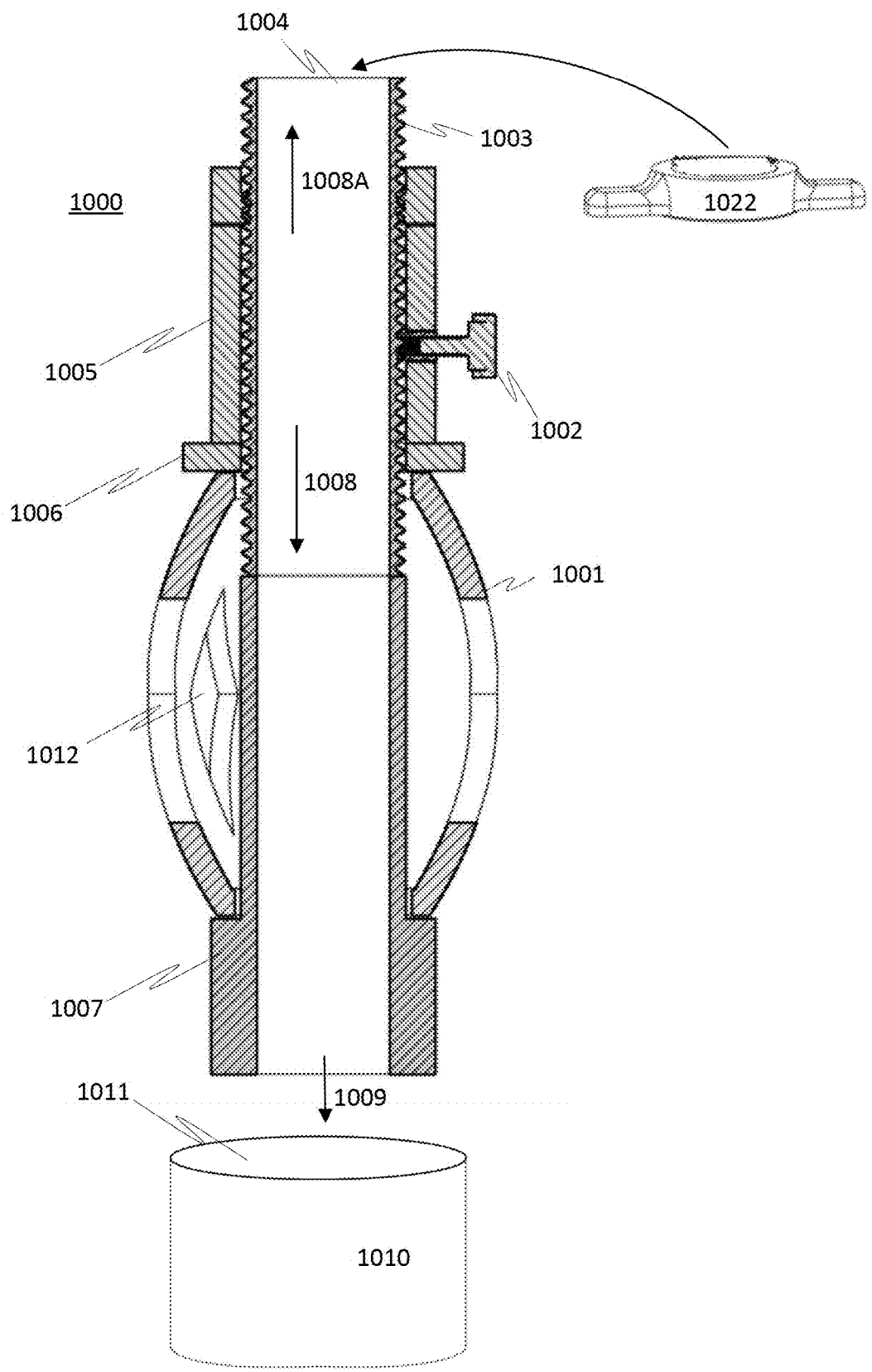
FIG. 10 illustrates a schematic diagram of an alternate tumbler support system with a bladder according to some embodiments of the present invention.

Referring now to FIG. 10, a schematic diagram of a second compression activated tumbler support system 1000 is illustrated. A compression activated bladder 1001 may be sized to fit into an interior 1011 of a tumbler cup 1010 when moved in the direction 1009 inside the tumbler cup 1010. The compression activated bladder 1001 may be solid or include stress relief cutouts 1012 that facilitate expansion and compression of the compression activated bladder 1001 that follows a desired shape pattern.

Compression and decompression of the compression activated bladder 1001 may be accomplished by disengaging a detent engagement device 1002 from interacting with a detent 1003 and sliding the spindle turner arm 1004 in a direction of compression 1008. With the spindle turner arm 1004 in a position with a desired amount of compression achieved, the detent engagement device 1002, may be placed in a position to engage with the detent 1003.

If the second compression activated tumbler support system 1000 is to be placed in a state of decompression, the detent engagement device 1002 may be disengaged from interacting with the detent 1003 and sliding the spindle turner arm 1004 in a direction of decompression 1008A. Moving the upper compression collar 1005 in a decompression direction 1008A will release the outward pressure of the compression activated bladder 1001 against the tumbler cup 1010 interior surface 1011 so that the compression activated tumbler support 1000 is detached from the interior surface 1011 of the tumbler cup 1010.

In some embodiments, the second compression activated tumbler support system 1000 may also comprise a compression yoke 1022 similar to the compression yoke 902 shown in FIG. 9. The compression yoke 1022 can be rotated around the detent 1003 in clockwise direction (1008) or anticlockwise direction (1008A) to place the second compression activated tumbler support system 1000 in a state of compression or decompression, respectively. The compression yoke 1022 will move an upper compression collar 1005 against a grommet 1006 in similar manner as discussed for the first compression activated tumbler support system 900 in FIG. 9. In some preferred embodiments, a diameter of the grommet 1006 will just slightly be less than a diameter of an interior surface 1011 of a tumbler cup 1010. With a diameter matching the interior surface 1011 of the tumbler cup 1010, the upper grommet 1006 may be inserted with the compression activated tumbler support 1000 into the tumbler cup 1010 and be positioned concentrically with the tumbler cup 1010.

A lower compression collar 1007 may be a same diameter or smaller diameter than the upper compression collar 1005. A smaller diameter facilitates case of insertion of the compression activated tumbler support 1000 into the tumbler cup 1010. The lower compression collar 1007 may be brought closer to the upper compression collar 1005 when the compression yoke 1022 is rotated and moves the upper compression collar 1005 in a direction of compression 1008.

Expansion of the compression activated bladder 1001 while the compression activated bladder 1001 is inserted into the tumbler cup 1010, causes the expansion bladder to apply outward pressure against the tumbler cup interior surface 1011 and fixedly attaches the compression activated tumbler support 1000 to the tumbler cup in a repeatable fashion.

Similarly, rotating the compression yoke 1022 in a rotational direction opposite to at direction for compression (such as, for example, in a counterclockwise direction), will move the upper compression collar 1005 in a decompression direction 1008A and release the outward pressure of the compression activated bladder 1001 against the tumbler cup interior surface 1011 so that the compression activated tumbler support 1000 is detached from the tumbler cup 1010.

Figure 11:
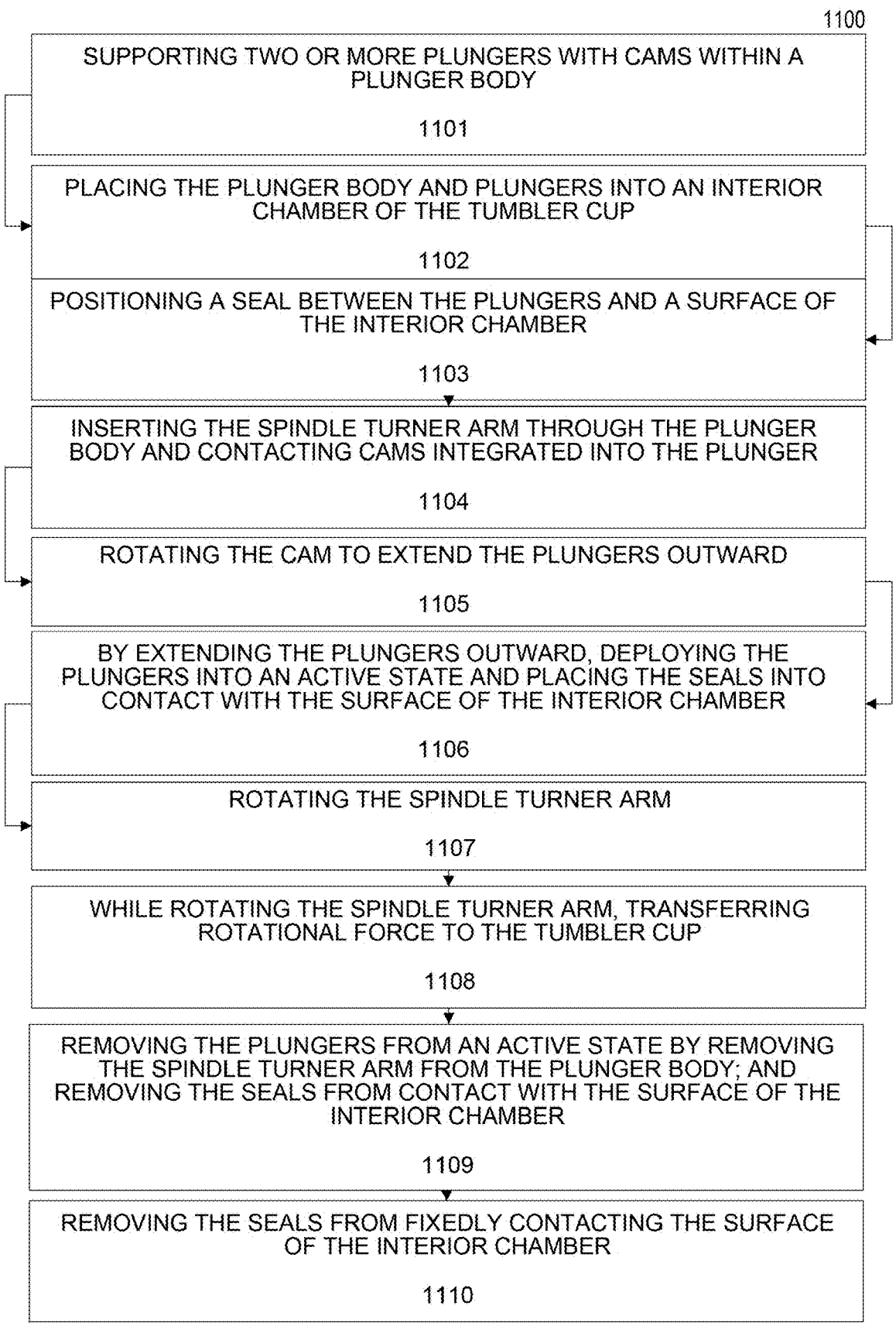
FIG. 11 illustrates method steps that may be completed in some embodiments of the present invention.

Referring now to FIG. 11, exemplary method steps 1100 that may be executed in some embodiments of the present invention. In one general aspect, the methods of the present invention may include, at step 1101, supporting two or more plungers within a plunger body. At step 1102, the method may also include placing the plunger body and plungers into an interior chamber of a tumbler cup.

At step 1103, the method may include positioning a seal between the plungers and a surface of the interior chamber of the tumbler cup.

At step 1104, the spindle turner arm may be inserted through the plunger body thereby contacting cams integrated into the plungers.

At step 1105 the method may include rotating or pushing the cams to extend the plungers outward towards the surface of the interior chamber of the tumbler cup.

At step 1106 the plungers may be extended outward, deploying the plungers into an active state, and placing the seals into contact with the surface of the interior chamber of the tumbler cup.

At step 1107 the method may furthermore include rotating the spindle turner arm such that at step 1108 while rotating the spindle turner arm, rotational force may be transferred to the tumbler cup.

At step 1109, the plungers may be removed from an active state by removing the spindle turner arm from the plunger body.

At step 1110 the seals are removed from fixedly contacting the surface of the interior chamber of the tumbler cup.

Figure 12A:
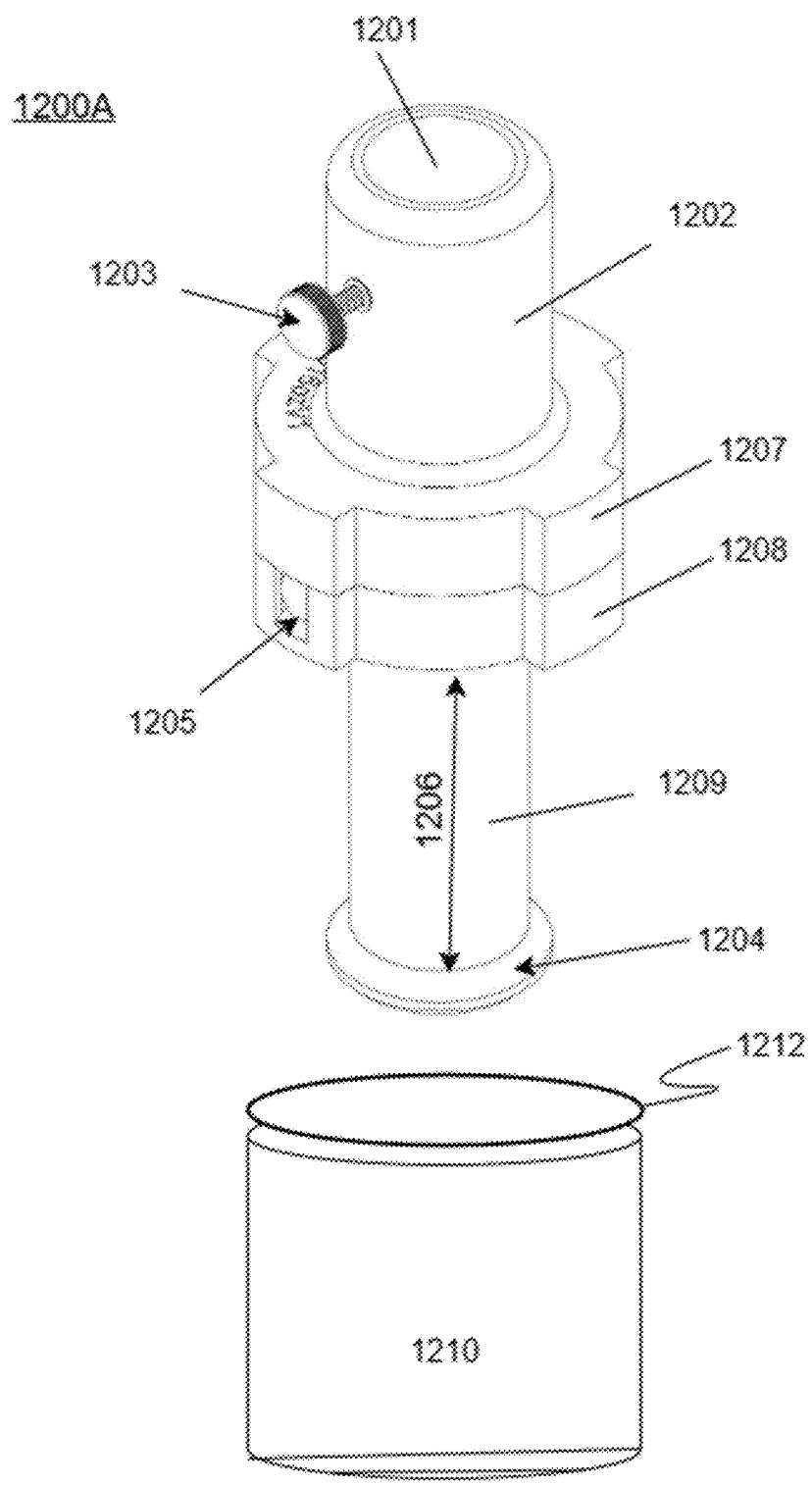
FIG. 12A illustrates an exemplary tumbler support with an extended stem according to some embodiments of the present invention.

Referring now to FIG. 12A, an exemplary embodiment of the invention representing a tumbler support apparatus 1200A featuring an extended stem 1209, which serves as an important spacer tube located at the base of the tumbler support apparatus 1200A. This extended stem 1209 may specifically be useful when interacting with tumbler cups that have straight, parallel sides lacking an internal taper angle. The length 1206 of the extended stem 1209 may be designed in a way so as to accommodate the extended stem 1209 inside the tumbler cup 1210, but ensuring that the lower end of the extended stem 1209 does not damage the tumbler cup 1210 when the tumbler support apparatus 1200A is engaged with the tumbler cup 1210. The extended stem 1209 serves an important role in maintaining the tumbler support apparatus 1200A at a consistent, fixed, and balanced position relative to both the top and bottom of the tumbler cups, providing precise alignment and stability during the customization process.

In some embodiments, the length 1206 of the extended stem 1209 may be designed to be adaptable, allowing for customization to accommodate the varying heights of tumbler cups. This feature may particularly be beneficial for users who work with a wide range of tumbler sizes, as it enables the tumbler support apparatus 1200A to maintain its optimal position and functionality across different tumbler dimensions. By allowing the length 1206 of the extended stem 1209 to be increased or decreased, the tumbler support apparatus 1200A can provide a secure fit for both taller and shorter tumblers, so that each cup, regardless of its height, is held steadily in place during the customization process.

Such an adaptability of the length 1206 of the extended stem 1209 within the tumbler support apparatus 1200A can be achieved through a customizable design, possibly incorporating features such as a telescoping mechanism in the extended stem 1209, threaded segments, or adjustable collars that can be easily modified to suit the height of the tumbler cups. This allows the users to precisely control the extension or retraction of the extended stem 1209 to match the tumbler's dimensions, so that the tumbler support apparatus 1200A maintains a secure and centered grip on the tumbler regardless of its size. The design may also include measurement indicators or a locking feature to securely hold the extended stem 1209 at a desired length, providing a consistent and reliable support structure that can be tailored to the specific requirements of each tumbler cup encountered in the customization process.

The handle 1202 is affixed with a handle securing device 1203, such as a set screw, which provides the means to securely fasten a spindle turner arm which can be inserted through (1201) the handle 1202. This provides the stability and precision required during the rotation of the tumbler.

A support body of the tumbler support apparatus 1200A comprises an upper portion 1207 and a lower portion 1208, designed to accommodate the plunger-cam mechanism 1205 of the tumbler support apparatus 1200A. The plungers within this mechanism 1205 can be activated to exert outward pressure against the interior surface of a tumbler as discussed throughout the invention disclosure. The extended stem 1209 comprises a formable portion 1204 at the lower end of the extended stem 1209. The formable portion 1204 may be in contact with the base of the tumbler cup 1210 during use. The formable portion 1204 may also be in contact with internal side surface of the tumbler cup 1210. The formable portion 1204 can be crafted from a material that is both flexible and non-marring, so that the interior of the tumbler cup 1210 is not damaged or scratched during the support process.

A gasket 1212 may also be positioned to provide a protective barrier between the tumbler cup 1210 and the tumbler support apparatus 1200A. It not only prevents direct contact that may lead to cosmetic damage but also assists in absorbing any vibrations or movements, thereby preventing potential slippage or rotation misalignment.

Figure 12B:
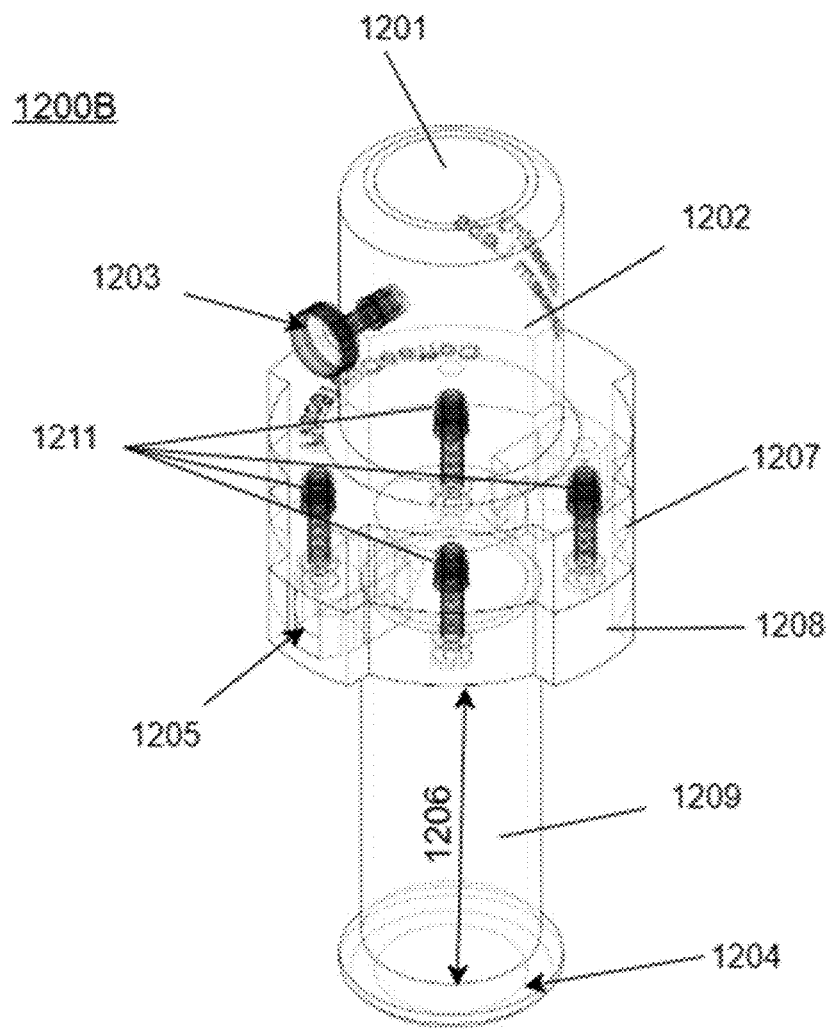
FIG. 12B illustrates an exploded view of the tumbler support with the extended stem according to some embodiments of the present invention.

Referring now to FIG. 12B, an exploded view of the tumbler support apparatus 1200A with the extended stem 1209 as discussed above for FIG. 12A. FIG. 12B shows a tumbler support apparatus 1200B with an extended stem feature 1209. The extended stem 1209 is a distinctive feature of the tumbler support apparatus 1200B that provides a spacer between a tumbler cup and the tumbler support apparatus 1200B, so that the tumbler support apparatus 1200B can cater to a range of tumbler sizes without intruding too deeply and risking interior damage to the tumbler cups.

The handle 1202 is affixed atop the tumbler support apparatus 1200B and provides a point of interface 1201 for the insertion of a spindle turner arm. A handle securing device 1203 functions as a locking mechanism, securing the spindle turner arm to the handle 1202 and providing stability during the tumbler's rotation.

A plunger-cam mechanism 1205 can be housed between an upper portion 1207 and a lower portion 1208 of the support body of the tumbler support apparatus 1200B. This mechanism 1205 is important for exerting an outward force against the interior chamber of a tumbler cup to affix it securely in place. The plungers within this mechanism 1205 are actuated by cams, which are in turn engaged by the insertion and/or rotation of the spindle turner arm through the point of insertion 1201.

One or more fastening devices 1211 can be utilized to securely attach the upper portion 1207 and lower portion 1208 of the support body. These fasteners are integral to maintaining the structural integrity of the plunger-cam mechanism within the tumbler support apparatus 1200B. The formable portion 1204 at the lower end of the extended stem 1209 further highlights the apparatus's innovative design by providing a conformable and non-damaging contact point with the interior of the tumbler cup, thus ensuring the protection of the tumbler's integrity throughout the customization procedure.

Figure 13:
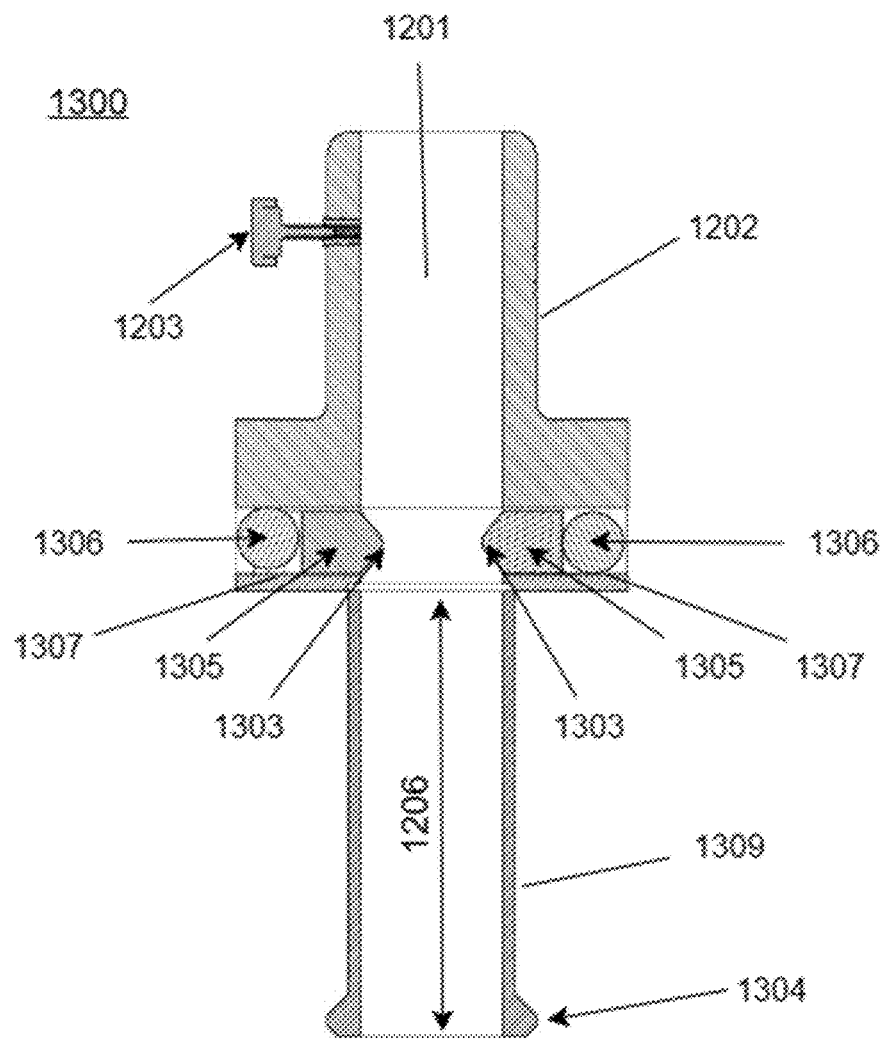
FIG. 13 illustrates a cutaway view of aspects included in the tumbler support with the extended stem according to some embodiments of the present invention.

Referring now to FIG. 13, a cutaway view of a tumbler support system 1300 incorporating an extended stem 1309. The handle 1202 is affixed atop the tumbler support system 1300 and integrates a handle securing device 1203, such as a set screw. The handle securing device 1203 provides the means to securely fasten a spindle turner arm, which can be inserted through the point of insertion 1201 of the tumbler support system 1300.

The extended stem 1309 is a significant component of this system, characterized by its length 1206, which is strategically designed to accommodate tumbler cups of various sizes and shapes. The extended stem 1309 extends into the tumbler cup and is terminated with a formable portion 1304 end. The formable portion 1304 is crafted from a material that can conform to the interior part of the tumbler cup, so that the tumbler cup is held securely without risk of internal damage or slippage during the application of customizations.

Within the support body of the system 1300, plungers 1305 are incorporated, each supported on a plunger surface 1307. These plungers 1305 are operated by the interaction with cam surfaces 1303. When a spindle turner arm is inserted and/or rotated through the point of insertion 1201 of the tumbler support system 1300, these cam surfaces 1303 actuate the plungers 1305, causing them to move outward toward the tumbler cup's interior chamber. In some embodiments of the invention, the cam surfaces can actuate the plungers, causing exertion of pressure on the tumbler cup's exterior surface (as discussed for FIG. 5A) to grip the tumbler cups from its exterior surface.

A formable interface 1306, which is likely made of a compliant material such as silicone, contacts the interior (or exterior in some cases) surface of the tumbler cup when the plungers 1305 are extended by a spindle turner arm. The choice of material for the formable interface allows for a gentle yet firm grip on the tumbler, accommodating minor variances in the interior chamber's surface without compromising the cup's structural integrity.

Figure 14:
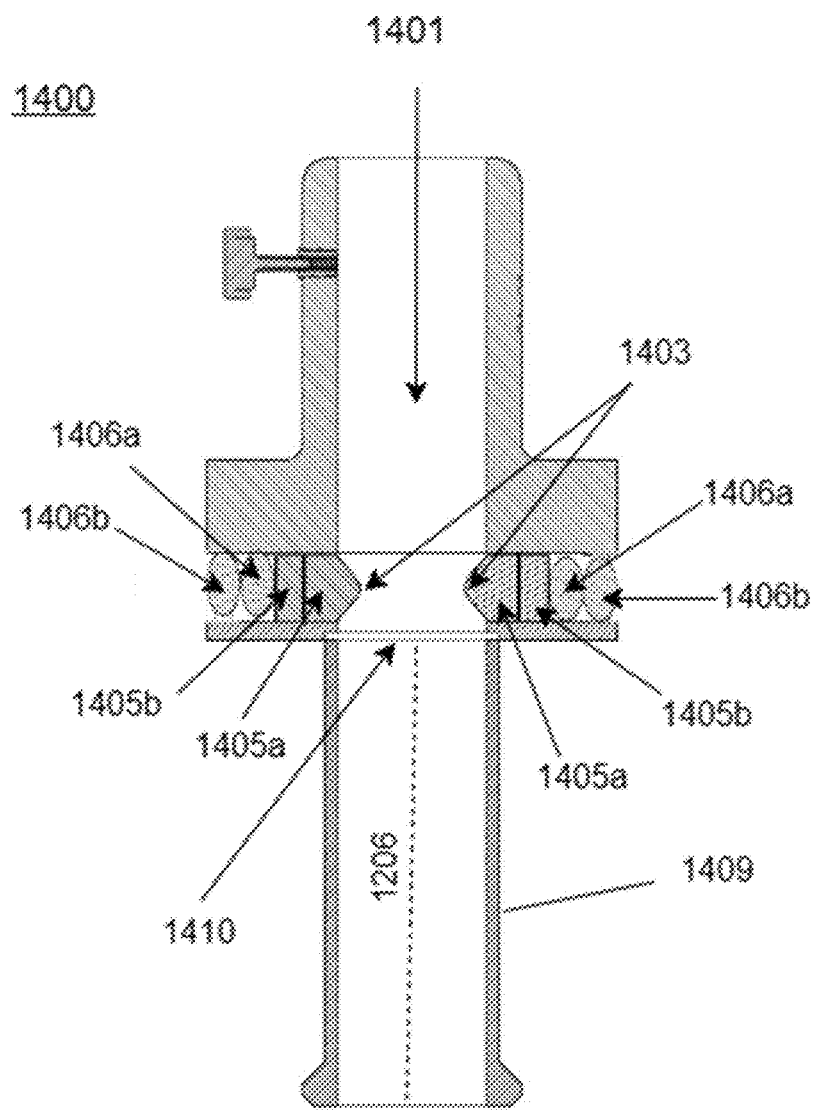
FIG. 14 illustrates a cutaway view of the tumbler support having the extended stem with the modularity aspect of the plunger mechanism according to some embodiments of the present invention.

Referring now to FIG. 14, a cutaway view of an exemplary tumbler support system 1400, which includes an extended stem 1409. The tumbler support system 1400 may comprise modularity feature for the plunger-mechanism in which more than one plunger (1405a, 1405b) and more than one formable interfaces or seals (1406a & 1406b) can be inserted into the tumbler support system 1400 as and when need exists. The innermost plungers (1405a) in each of such plunger-mechanism comprise cam surfaces 1403. The plungers are actuated by cam surfaces 1403 that engage with a spindle turner arm inserted into the tumbler support system 1400 through the direction indicated by 1401. The mechanism allows for displacement of the cam surfaces 1403, which in turn apply pressure to the corresponding plungers (1405b). This pressure is then transferred to the formable interfaces 1406a and 1406b, which are made of a compliant material and designed to conform to the interior or exterior surfaces of a tumbler cup, thereby securing the tumbler cup in place.

A unique aspect of this modular design is the potential for its customization in the number and arrangement of plungers and cams. Depending on the specific requirements of a tumbler cup or the customization process, the tumbler support system 1400 can be configured with various combinations of plungers and cams to accommodate different sizes, shapes, and design needs of the tumbler cups.

Additionally, a stopper 1410 may also be integrated into the design to prevent the spindle turner arm from over-penetrating into the extended stem 1409. This stopper 1410 serves as an important safety and operational feature, so that the spindle turner arm maintains the correct insertion depth for effective engagement with the cams and plungers. The inclusion of a stopper 1410 not only enhances the functional reliability of the tumbler support system 1400 but also contributes to the longevity of the system by preventing mechanical over-extension or damage.

The tumbler support system 1400 may further incorporate advanced materials for the formable interfaces (1406a and 1406b), such as smart polymers that change their firmness in response to temperature or applied pressure, providing an even more secure grip on the tumbler cup during the customization process. This may offer an additional layer of control and precision to the user, catering to the increasingly sophisticated needs of tumbler customization.

In some embodiments, the tumbler cup support apparatus may further be enhanced by integrating at least one cam and at least one plunger as a single piece within at least one of the said plunger mechanisms. This integrated design streamlines the internal structure of the plunger mechanism, reducing the complexity and potential for mechanical failure. The integration of the cam and plunger into a single component not only simplifies the assembly process but also facilitates more precise and reliable movement. This is particularly advantageous in maintaining consistent pressure and alignment when securing the tumbler cup, as the integrated piece can uniformly transfer the motion from the spindle turner arm to the formable interface.

Figure 15:
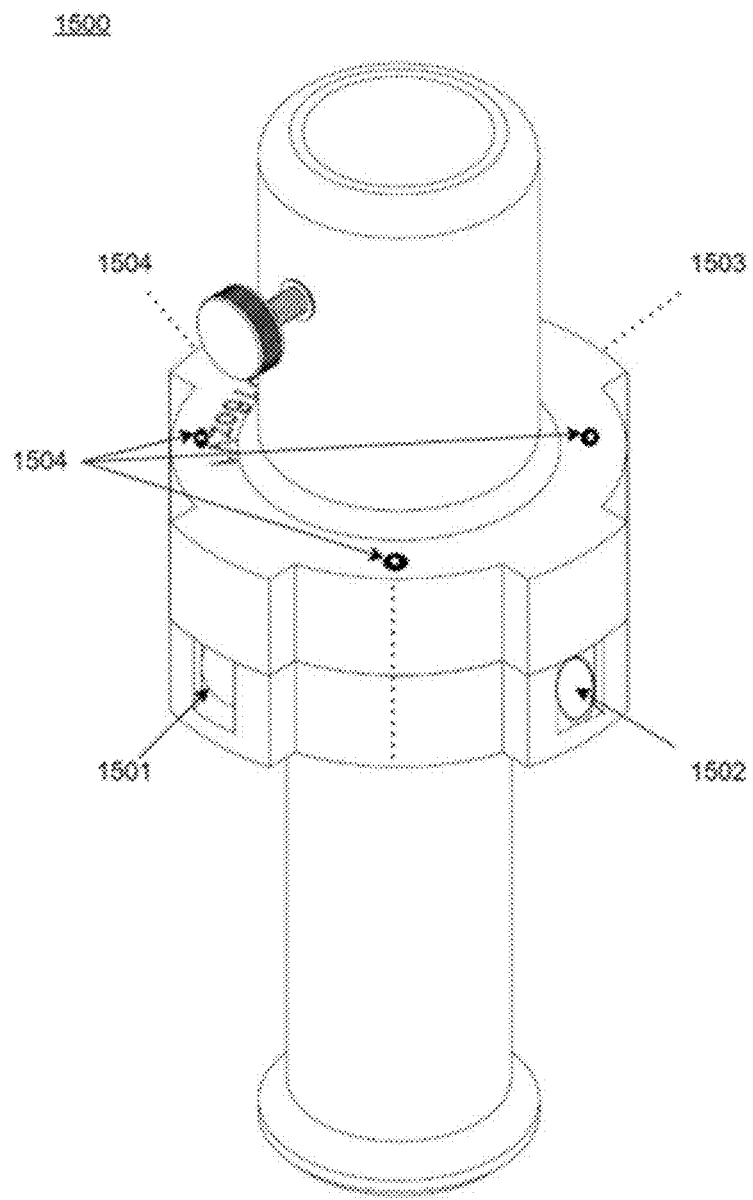
FIG. 15 illustrates an exemplary view of a tumbler support apparatus having a multi-directional plunger-mechanism according to some embodiments of the present invention.

Referring now to FIG. 15, an exemplary view of a tumbler support apparatus 1500 which may be equipped with a multi-directional plunger mechanism. The tumbler support apparatus 1500 may feature a series of plungers located in multiple directions 1501-1504. These plungers are strategically positioned to apply pressure from different directions (and maybe angles), so that a tumbler cup can be firmly supported in a balanced manner. The multi-directional application of pressure is especially beneficial for tumblers of irregular shapes or those requiring precise positioning for detailed customization work.

Each such plunger-mechanism, within its respective orientation, operates based on the pressure or force exertion mechanism discussed in previous embodiments of the invention. They are likely actuated by an internal cam system, which when engaged by a spindle turner arm, causes the plungers to deploy outward and exert pressure on interior or exterior surface of the tumbler cup.

In such a modular assembly of the tumbler support apparatus 1500, an upper portion and a lower portion of the tumbler support body are combined and joined together by fastening devices, such as screws 1504, which provide a secure and durable connection. This modular design allows for easy disassembly for maintenance or parts replacement, enhancing the longevity and functionality of the tumbler support apparatus 1500.

In some embodiments of the invention, the tumbler support apparatus may comprise a plurality of plunger mechanisms that may include a first and second plunger mechanism, as well as a third and fourth plunger mechanism. Each of these plunger mechanisms comprises at least one plunger and at least one seal in contact with the plunger. The first and second plunger mechanisms are strategically positioned in opposing directions, providing balanced and even pressure application from or on two sides of the tumbler cup. Similarly, the third and fourth plunger mechanisms may be provided in two additional opposing directions. This configuration allows the support apparatus to exert uniform pressure from multiple directions and possibly angles, thereby providing a secure and stable grip on the tumbler cup, regardless of its shape or size.

Referring now to FIG. 16, exemplary method steps 1600 for supporting a tumbler cup on a tumbler support apparatus in accordance with some embodiments of the present invention. At step 1601, a compression activated bladder is provided between an upper compression collar and a lower compression collar within the tumbler support apparatus. The bladder is designed to expand and conform to the interior of the tumbler cup.

At step 1602, the compression activated bladder, along with the lower compression collar, is inserted into the interior chamber of the tumbler cup, initiating the stabilization process.

At step 1603, the upper compression collar is moved against a grommet and towards the lower compression collar in a compressive direction. This action begins the expansion of the bladder within the tumbler cup.

At step 1604, the expansion of the bladder is performed as a result of the upper compression collar pressing against the grommet. The expansion enables the bladder to exert an outward force against the interior surface of the tumbler cup.

At step 1605, the bladder applies outward pressure against the interior surface of the tumbler cup and becomes fixedly attached to it, effectively securing the cup in place.

Subsequently, at step 1606, a spindle turner arm attached to the tumbler support apparatus is rotated. This rotation is a helpful part of the customization process, allowing for the application of various finishes or decorations to the tumbler cup.

At step 1607, rotational force is transferred to the tumbler cup as a result of rotating the spindle turner arm, which completes the process of supporting the tumbler cup on the support apparatus.

In some embodiments of the invention, the method further includes use of a compression yoke that engages with a threaded portion of the spindle turner arm to control the bladder's expansion and contraction. In some other embodiments of the invention, a detent engagement device secures the upper compression collar's position to maintain a desired bladder compression. These features may ensure that the tumbler is held securely and can be rotated smoothly, facilitating an even and consistent application of customization features to the tumbler.

Figure 17A:
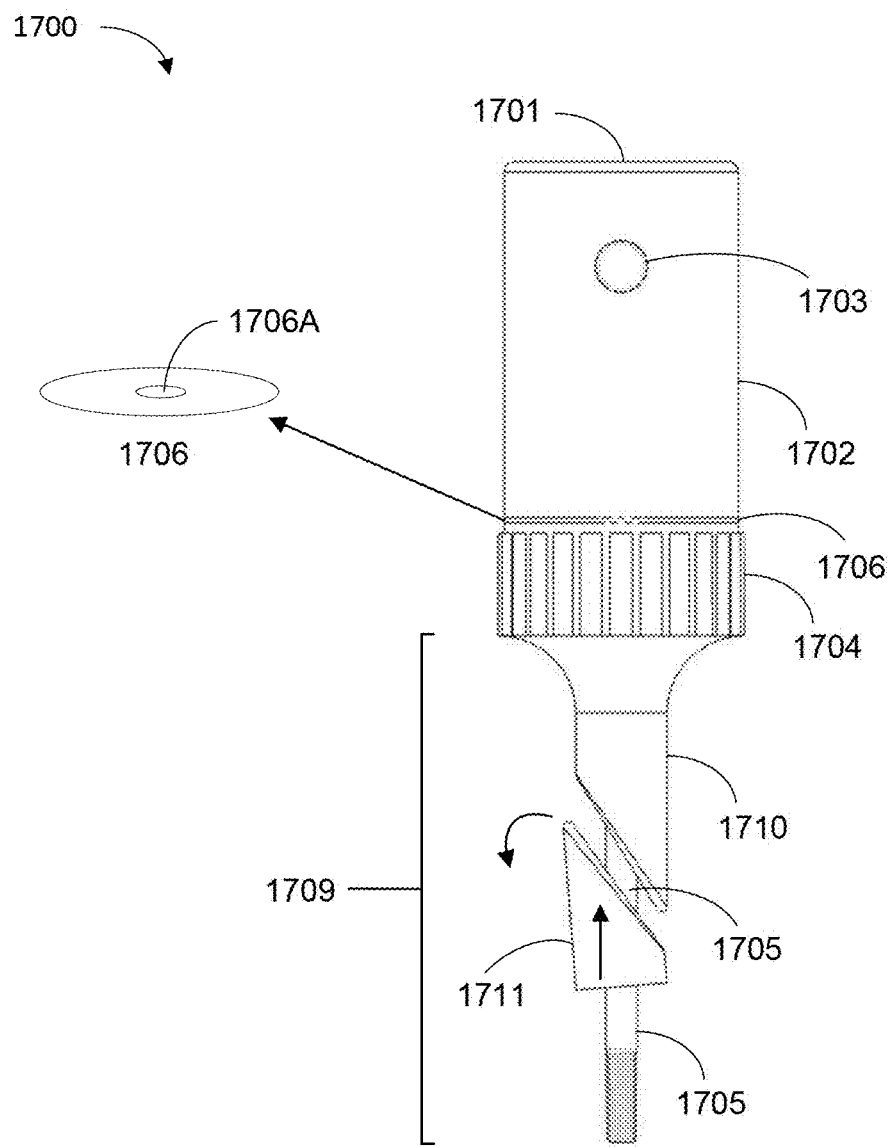
FIGS. 17A-17B illustrate an exemplary tumbler support with an extended stem comprising an off-set wedge according to some embodiments of the present invention.

Referring now to FIG. 17A, the figure illustrates an exemplary embodiment of a tumbler support apparatus 1700 configured for supporting a tumbler or other similar containers during customization or holding processes. The tumbler support apparatus 1700 comprises multiple distinct structural components, including a point of insertion 1701, a handle 1702, a locking mechanism 1703, a stem support portion 1704 (which may be a rubberized grip), and an extended stem 1709, which further comprises an upper stem portion 1710 and a lower stem portion in the form of an off-set wedge 1711. The assembly is designed for efficient engagement and secure attachment of the tumbler support apparatus 1700 to an interior surface of a tumbler or similar object.

At the upper portion of the tumbler support apparatus 1700, the point of insertion 1701 provides an entry point for a long-length threaded screw 1705. The point of insertion 1701 may serve as a guiding or receiving mechanism to align the long-length threaded screw 1705 within the apparatus structure. The handle 1702 may be cylindrical or substantially tubular in shape, providing a secure grip for manual or automated handling of the tumbler support apparatus 1700. A locking mechanism 1703, such as a threaded fastener or set screw, may be integrated into the handle 1702. This locking mechanism 1703 enables the operator (user) to affix the tumbler support apparatus 1700 onto a spindle turner arm or other external driving components, maintaining positional stability during operation.

Beneath the handle 1702, the stem support portion 1704 structurally connects the handle 1702 to the extended stem 1709. The stem support portion 1704 is depicted as a robust section designed to accommodate mechanical stresses during rotation, tilting, or other forces imparted through the apparatus. Positioned directly above the stem support portion 1704 is a fixed plate 1706, which includes a central hole 1706A. The central hole 1706A may serve as a passageway for the long-length threaded screw 1705 to traverse through the tumbler support apparatus 1700.

The extended stem 1709 comprises two functional portions: the upper stem portion 1710 and the lower stem portion, referred to as the off-set wedge 1711. The upper stem portion 1710 features a tapered bottom 1710A (FIG. 17B), which is configured to mate with the corresponding tapered top 1711A of the off-set wedge 1711. The tapered surfaces 1710A and 1711A may be designed to interface with one another at a collision or contact point 1712, as shown in further detail in FIG. 17C. This tapered interface creates a wedge effect when actuated, enabling the off-set wedge 1711 to tilt or shift.

The long-length threaded screw 1705 is an important actuating component of the tumbler support apparatus 1700. It comprises threaded portions or sections at various positions, including threads 1705A, 1705B, and 1705C, as depicted in FIG. 17C. The threaded design facilitates controlled movement of the long-length threaded screw 1705 when rotated in a downward direction. The long-length threaded screw 1705 extends through the point of insertion 1701, the handle 1702, the central hole 1706A in the fixed plate 1706, and into a nut 1707A, 1708A (FIG. 17B-17C) positioned at the lower portion of the off-set wedge 1711. Tightening the long-length threaded screw 1705 applies an upward force on the off-set wedge 1711, causing the tapered surfaces 1710A and 1711A to contact and shift the off-set wedge 1711 in a tilting motion.

In some embodiments, the tilting motion of the off-set wedge 1711 results in its outward expansion, thereby contacting and pressing against an interior surface of a tumbler or other similar container. This engagement secures the apparatus 1700 within the tumbler, providing stability during rotational or customization processes, such as painting, engraving, or coating applications. For example, during a rotational painting process, the tilting action of the off-set wedge 1711 can provide an even and secure grip within the tumbler, preventing slippage or dislodgment.

The configuration of the tapered surfaces 1710A and 1711A offers advantages in facilitating a controlled and gradual tilting motion. By incorporating an angled design in the tapered surfaces 1710A and 1711A, the apparatus 1700 enables uniform distribution of force across the off-set wedge 1711, reducing the likelihood of mechanical failure or uneven pressure application. In some embodiments, the tapered surfaces 1710A and 1711A may include surface treatments, such as coatings or lubricants, to minimize friction and improve mechanical efficiency.

Additionally, the off-set wedge 1711 may be constructed from durable materials, such as stainless steel, aluminum, or reinforced polymers, to accommodate repeated mechanical stress. For enhanced adaptability, the off-set wedge 1711 may be designed with modular components, allowing operators to replace or adjust the wedge according to the dimensions or specifications of the tumbler being supported. For example, a larger off-set wedge 1711 may be used to accommodate tumblers with wider internal diameters.

In some embodiments, the tumbler support apparatus 1700 may incorporate alignment indicators or visual markers on the handle 1702 and the upper stem portion 1710 to assist with proper alignment during insertion into a tumbler. These alignment indicators can include grooves, arrows, or contrasting color markings that provide visual guidance for the operator.

The long-length threaded screw 1705 can be actuated manually using a standard screwdriver, wrench, or similar tool, or it may be driven automatically through motorized means. For example, in an automated manufacturing setup, a powered driver can be used to tighten the long-length threaded screw 1705, enabling consistent and repeatable tilting of the off-set wedge 1711.

Furthermore, the design of the tumbler support apparatus 1700 may be adapted for use with a variety of tumbler materials, such as stainless steel, glass, ceramic, or plastic. The off-set wedge 1711 may include a compressible layer or a soft coating, such as silicone or rubber, to prevent damage to delicate surfaces. For example, when supporting a glass tumbler, the compressible coating on the off-set wedge 1711 reduces the risk of scratching or chipping the interior surface.

Alternative embodiments of the tumbler support apparatus 1700 may incorporate additional securing features, such as locking pins, clamps, or magnets, to enhance the stability of the tumbler support apparatus 1700 within the tumbler. For example, a magnetic locking system can be used in conjunction with the off-set wedge 1711 to provide a dual securing mechanism, particularly useful for heavy or large tumblers.

Figure 17B:
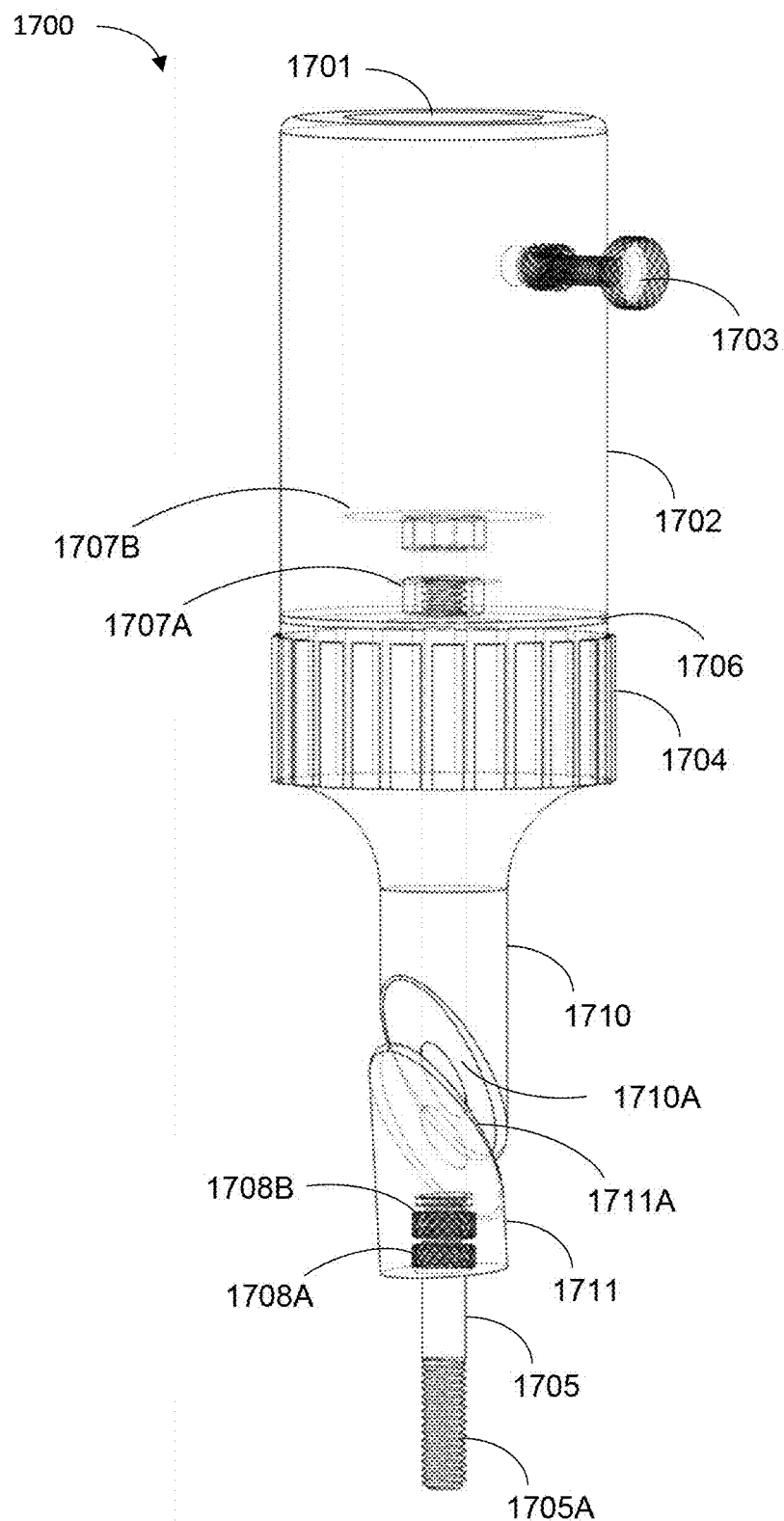
Figure 17C:
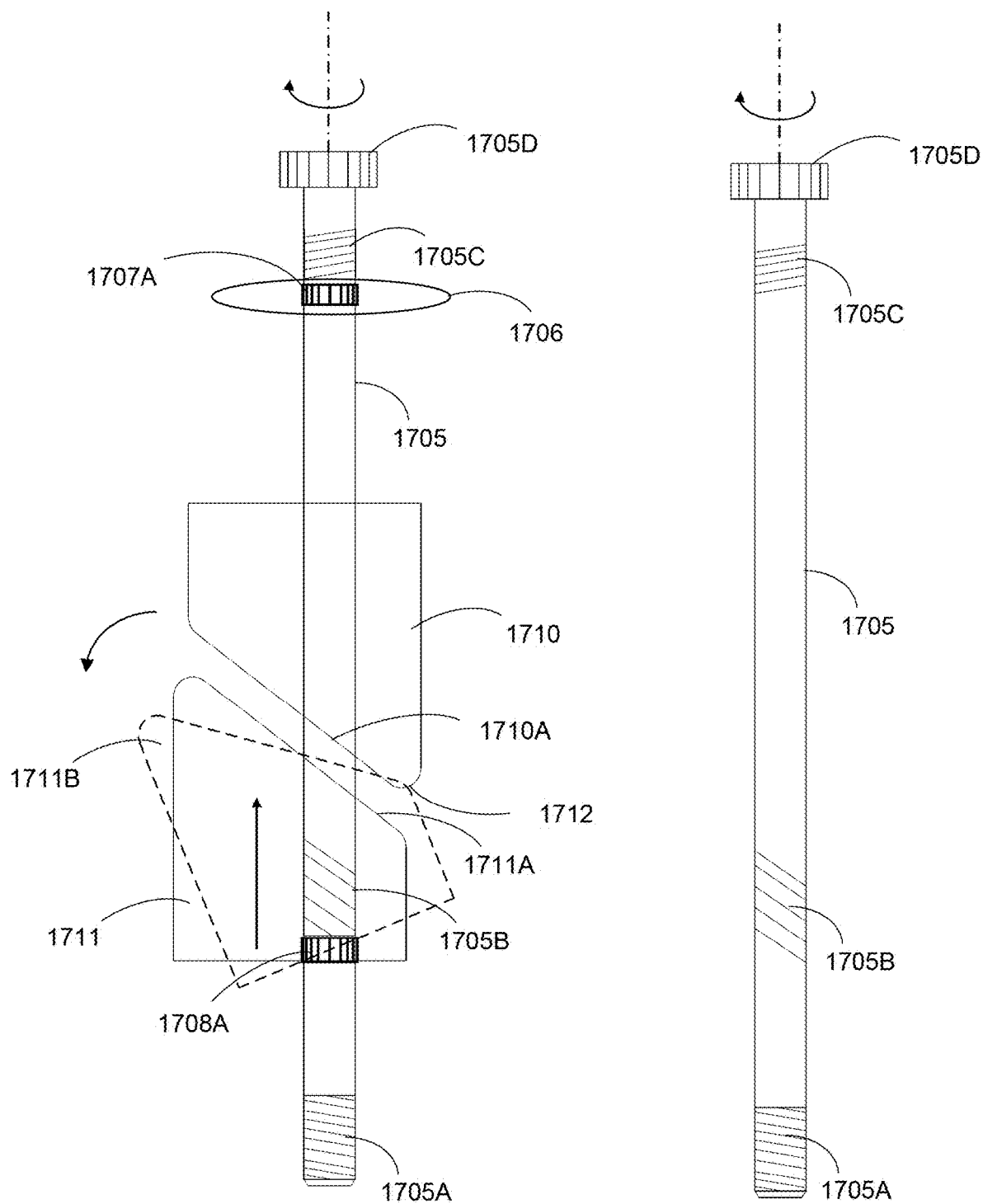
FIG. 17C illustrates an internal working mechanism of the off-set wedge within a tumbler support apparatus, depicting the interaction between a screw shank and the off-set wedge to achieve secure engagement.

Referring now to FIGS. 17B-17C, the figures illustrate additional details of the tumbler support apparatus 1700, focusing on the assembly and operational features of the off-set wedge 1711, long-length threaded screw 1705, one or more nuts 1708A-1708B, and handle components.

FIG. 17B shows the position of the nuts 1708A-1708B embedded or secured within the off-set wedge 1711. The nuts 1708A-1708B may either be fixedly attached to the lower base of the off-set wedge 1711 or designed to move freely within the off-set wedge 1711 during actuation. If fixed, the nuts 1708A-1708B serve as stationary anchors for receiving the long-length threaded screw 1705. Alternatively, in configurations where the nuts 1708A-1708B are movable, they allow additional control over the tilting action (1711B) of the off-set wedge 1711. The long-length threaded screw 1705 engages with these nuts 1708A-1708B through threaded portion 1705B defined at specific position along the length of the screw shank. The threaded portions 1705C and 1705B corresponds to their respective nut positions—for example, the first set of nuts 1707A-1707B in the handle assembly 1702 and the second set of nuts 1708A-1708B in the off-set wedge 1711 (as shown in FIG. 17B).

The handle 1702 includes the fixed plate 1706, positioned above the stem support portion 1704. The fixed plate 1706 features a central hole 1706A to accommodate the long-length threaded screw 1705, allowing it to pass through the fixed plate 1706 and thread into second set of nuts 1707A-1707B. The nuts 1707A-1707B may be fixedly secured to the underside or topside of the fixed plate 1706. As the long-length threaded screw 1705 rotates and advances downward through the aligned nuts 1707A-1707B and 1708A-1708B, the off-set wedge 1711 is actuated, causing the tapered surface 1711A of the wedge 1711 to move upward against the complementary tapered surface 1710A of the upper stem portion 1710. This interaction results in a collision point 1712 (as depicted in FIG. 17C) where the combined motion induces the tilting action (1711B) of the off-set wedge 1711.

The threaded regions 1705A, 1705B, and 1705C on the long-length threaded screw 1705 may be strategically positioned to control the sequential engagement with the nuts 1707A-1707B and 1708A-1708B. For example, the long-length threaded screw 1705 may first thread into the handle nuts 1707A-1707B to provide initial stability before engaging with the lower nuts 1708A-1708B in the off-set wedge 1711. This dual-threaded engagement facilitates controlled motion of the off-set wedge 1711 while preventing excessive force or misalignment.

In one embodiment, the tilting (1711B) of the off-set wedge 1711 caused by the tightening of the long-length threaded screw 1705 enables the tumbler support apparatus 1700 to hold the interior surface of a tumbler or bottle. For example, the stem assembly 1709 (stem portion), comprising the upper stem portion 1710 and off-set wedge 1711, may be inserted into the open neck of a bottle or tumbler. Upon tightening the long-length threaded screw 1705, the off-set wedge 1711 tilts (1711B) outward, pressing against the internal surface of the container. This creates a secure engagement through mechanical expansion of the wedge structure, so that the tumbler or bottle remains fixed in position relative to the tumbler support apparatus 1700.

In addition, FIG. 17B demonstrates a locking mechanism 1703 integrated with the handle 1702. The locking mechanism 1703 may be actuated manually or automatically. For manual operation, the locking mechanism 1703 may comprise a thumb screw or similar user-operated device that locks the spindle turner arm (not shown in this view) in place once the off-set wedge 1711 engages the container. In an alternative embodiment, the locking mechanism 1703 may incorporate an automatic engagement feature. For example, the locking mechanism may include a spring-biased detent (e.g., 103 in FIG. 2, 1002 in FIG. 10) that triggers automatically when the long-length threaded screw 1705 is tightened, securing the tumbler support apparatus 1700 without additional manual input.

The automatic locking mechanism may also utilize a sensor-based system where the long-length threaded screw 1705 interacts with a micro-switch or sensor embedded in the handle 1702. When the long-length threaded screw 1705 reaches a predetermined position, the sensor sends a signal to actuate a locking mechanism 1703, such as a friction brake or magnetically actuated latch, to hold the off-set wedge 1711 in place. Such an embodiment enhances ease of use, particularly in repetitive applications such as manufacturing or customization processes where multiple tumblers or bottles must be securely held and released quickly.

The tilting motion (1711B) of the off-set wedge 1711 may be guided and controlled by the interaction of the tapered surfaces 1710A and 1711A. The tapered surface 1710A of the upper stem portion 1710 facilitates that the upward motion of the off-set wedge 1711 results in a lateral expansion force, effectively locking the tumbler support apparatus 1700 into the container. The precision of this motion depends on the angle and geometry of the tapered surfaces, which can be optimized for specific applications. For example, a steeper taper angle may provide a stronger engagement force for heavy tumblers or bottles, while a shallower angle may allow for quicker release and minimal force application.

In some embodiments, the screw 1705 may be equipped with a rotation limiter or torque-based control mechanism to prevent over-tightening. This may include a torque limiter integrated into the screw head 1705D, which disengages once a predefined torque level is reached. Such a feature facilitates that the off-set wedge 1711 tilts sufficiently to engage the container without damaging its internal surface or compromising the structural integrity of the tumbler support apparatus 1700.

The tumbler support apparatus 1700 described herein provides significant flexibility for securely holding tumblers, bottles, or similar containers. For example, the off-set wedge design 1711 allows the tumbler support apparatus 1700 to adapt to containers of various diameters by tilting and expanding to match the internal surface dimensions. This versatility makes the tumbler support apparatus 1700 particularly useful for customization processes, such as engraving, painting, or printing, where precise and stable support of the container is required.

Additionally, the modular design of the handle 1702, stem 1709, and off-set wedge 1711 enables the tumbler support apparatus 1700 to be disassembled and reconfigured for different use cases. For example, the off-set wedge 1711 may be replaced with alternative gripping mechanisms, such as expandable bladders or spring-loaded clamps, depending on the specific requirements of the container being supported.

In some embodiments, the long-length threaded screw 1705 may comprise a knurled screw head 1705D designed to facilitate easy rotation, particularly when attached to a spindle arm or a PVC pipe. The screw head 1705D can be configured with a slot, hex head, or similar interface for rotational engagement with tools or manual devices. For example, a spindle arm or PVC pipe (e.g., 1713 shown in FIG. 17D) may be secured to the screw head 1705D to provide additional leverage for rotating the long-length threaded screw 1705. This setup simplifies the process of tightening or loosening the long-length threaded screw 1705, especially during repetitive operations or for users seeking ease of use. The rotational force applied through the spindle or pipe allows the long-length threaded screw 1705 to advance smoothly through the first nut 1707A (on the fixed plate 1706) and the second nut 1708A (on the off-set wedge 1711) to control the tilting (1711B) motion of the off-set wedge 1711. In some embodiments, the screw head 1705D may be adapted for compatibility with motorized tools, such as electric screwdrivers or torque-controlled motors, further improving efficiency in operations requiring precision tightening.

In some embodiments, the tumbler support apparatus 1700 may comprise single nuts—specifically, a first single nut 1707A on the fixed plate 1706 and a second single nut 1708A at the base of the off-set wedge 1711—to facilitate streamlined assembly and actuation. These single nuts may be fixedly attached to their respective components. For example, the first single nut 1707A can be welded, press-fitted, or adhered to the fixed plate 1706 to facilitate that it remains stationary as the long-length threaded screw 1705 rotates through it. Similarly, the second single nut 1708A may be embedded within or fixedly secured to the off-set wedge 1711. This configuration simplifies the structural design while providing reliable actuation. The use of single nuts reduces the complexity of the assembly, minimizes frictional losses, and improves mechanical efficiency during the tilting operation.

In some embodiments, the long-length threaded screw 1705 may further comprise threads 1705A positioned at its lower tip, which extends into the tumbler or bottle interior when the tumbler support apparatus 1700 is inserted. These lower threads 1705A serve as a point of contact for additional components, such as a soft cap made of rubber, silicone, or other cushioning material. The soft cap, when secured over the lower threaded portion 1705A, prevents direct contact between the screw tip and the interior surface of the tumbler or bottle. This arrangement protects delicate materials, such as glass or polished metals, from scratches, dents, or other forms of damage during operation. For example, when supporting a glass tumbler, the soft cap may provide a protective barrier while also serving to dampen vibrations that may occur during rotational processes.

The choice of materials for various components of the tumbler support apparatus 1700 is important to balance strength, durability, and protective qualities. The fixed plate 1706 may be constructed from metals such as stainless steel or aluminum alloys to provide a rigid and stable platform for securing the long-length threaded screw 1705. Stainless steel offers high resistance to corrosion and wear, making it suitable for prolonged use in environments exposed to moisture, coatings, or other substances during tumbler customization processes. Aluminum alloys, on the other hand, provide a lightweight alternative with sufficient strength for most applications.

The long-length threaded screw 1705 may be made from hardened steel, carbon steel, or stainless steel, depending on the mechanical requirements. Hardened steel provides superior tensile strength, so that the screw can withstand repeated tightening without deformation. Stainless steel offers excellent corrosion resistance, making it ideal for applications involving exposure to liquids or humid conditions. In some cases, the screw may include a coated finish, such as zinc plating, to enhance durability and reduce friction during operation.

The upper stem portion 1710 and the off-set wedge 1711 may be made of soft yet strong materials to provide a combination of surface protection and structural support. Materials such as high-density rubber, polyurethane, or reinforced silicone composites may be employed for these components. For example, polyurethane offers excellent durability, flexibility, and impact resistance while maintaining a degree of softness. It can deform slightly upon contact with the interior surface of a tumbler, distributing pressure evenly to avoid damage.

Reinforced silicone composites combine the elasticity of silicone with embedded fibers or reinforcements to enhance structural integrity. This material provides a soft surface contact to prevent scratching or cracking of delicate glass tumblers, while the reinforcement facilitates that the off-set wedge 1711 can maintain a tight grip under compression forces. High-density rubber may also be utilized for its ability to absorb shocks and provide a firm grip without damaging the contact surface.

The combination of these materials allows the tumbler support apparatus 1700 to effectively hold a glass tumbler or bottle. For example, when the long-length threaded screw 1705 is tightened, the tapered interaction between the upper stem portion 1710 and the off-set wedge 1711 causes the off-set wedge to tilt outward. As the off-set wedge 1711 tilts, the material deforms slightly upon contact with the glass surface, creating a secure but non-abrasive engagement. This balance between softness and strength is particularly advantageous for holding fragile items, such as wine bottles or thin-walled tumblers, during operations like engraving, etching, or painting.

In another embodiment, the off-set wedge 1711 may include a protective coating or layer applied to its surface. For example, a layer of PTFE (Teflon), soft silicone, or elastomeric paint can further reduce friction and enhance the protective qualities of the off-set wedge. The coating may be applied through spraying, dipping, or molding, depending on the manufacturing requirements. The protective layer facilitates that even under high compression forces, the off-set wedge maintains gentle contact with the tumbler surface while preventing wear over prolonged use.

Additionally, the material selection for the upper stem portion 1710 and off-set wedge 1711 may vary based on the intended application. For example, if the tumbler support apparatus 1700 is designed for holding lightweight plastic tumblers, softer materials such as low-density polyethylene or rubber composites may suffice. For heavier glass bottles or metal tumblers, stronger materials like polycarbonate-reinforced composites or fiber-reinforced polymers may be preferred to provide the necessary support without compromising the protective characteristics.

Figure 17D:
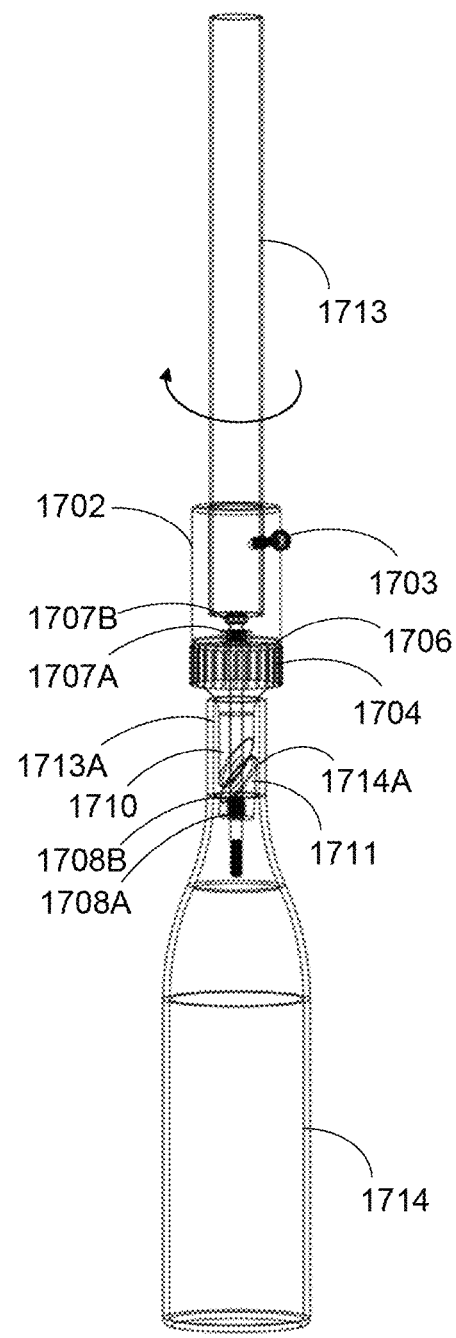
FIG. 17D illustrates an exemplary application of the tumbler support apparatus for supporting a wine bottle in some implementations of the present invention.

Referring now to FIG. 17D, the figure illustrates an exemplary application of the tumbler support apparatus 1700 for securely holding a tumbler or wine bottle 1714. The spindle arm or PVC pipe 1713 is connected to the handle portion 1702 of the tumbler support apparatus 1700, enabling rotational movement or controlled operation. The tumbler 1714 includes an interior surface 1714A, which is engaged by the lower stem portion or off-set wedge 1711 of the tumbler support apparatus 1700 for secure holding.

The tumbler support apparatus 1700 includes a handle portion 1702 that houses a control mechanism, such as a threaded adjustment system or actuation interface, which interacts with components of the stem portion (1709). Specifically, the upper stem portion 1710 and the off-set wedge 1713A are positioned to engage the interior surface 1714A of the tumbler (1714). The interaction between these components allows the off-set wedge 1711 to tilt or expand, creating a secure engagement within the tumbler (1714). Additionally, alignment and stabilization may be achieved through guiding nuts 1707A and 1707B, which align the upper stem portion 1710 with the lower stem portion 1711 and the internal mechanism.

Figure 18A:
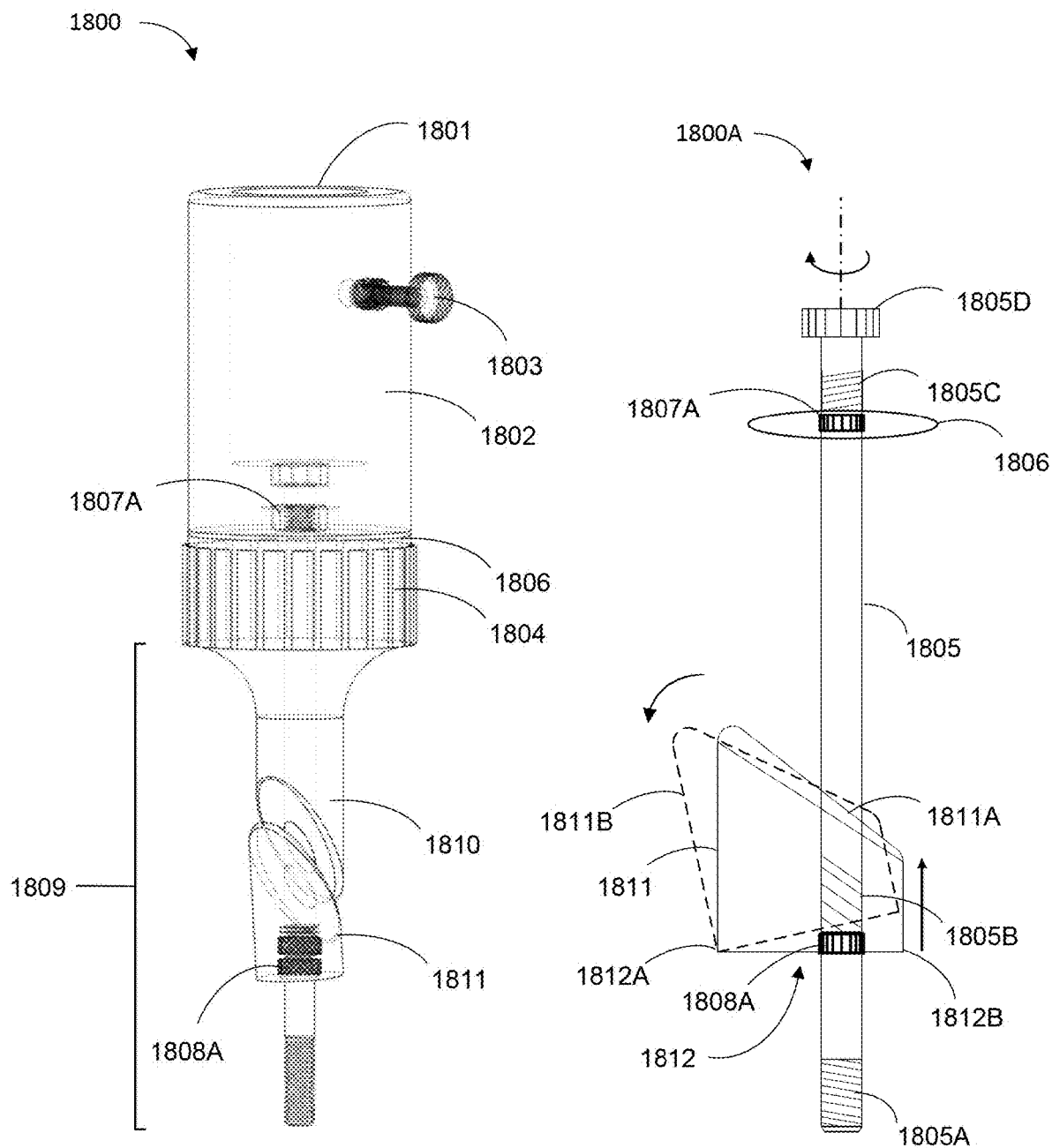
FIG. 18A illustrates a tumbler support apparatus where the off-set wedge includes a fixed nut at its bottom portion to facilitate tilting of the off-set wedge for secure engagement, according to some embodiments of the present invention.

Referring now to FIG. 18A, the illustration depicts an exemplary tumbler support apparatus 1800 incorporating an off-set wedge 1811 with a fixed nut 1808A at its base on the plate 1806. The off-set wedge 1811 is configured to facilitate tilting when actuated by tightening a screw 1805, thereby providing a secure and reliable engagement for holding an interior surface of a tumbler or bottle. The tumbler support apparatus 1800 includes multiple components such as a point of insertion 1801, a handle 1802, a locking mechanism 1803, a stem support portion or grip 1804, a fixed plate 1806, a stem portion 1809 comprising an upper stem portion 1810, and the off-set wedge 1811. The tumbler support apparatus 1800 is further enhanced by the screw 1805 that passes through various elements, including the fixed plate 1806, the upper stem portion 1810, and the off-set wedge 1811, ultimately interacting with the fixed nut 1808A.

In the depicted configuration, the screw 1805 comprises multiple threaded sections, specifically 1805A, 1805B, and 1805C, which are strategically located along the shank of the screw 1805. These threaded sections interface with corresponding nuts, such as 1807A located on the fixed plate 1806 and secured at the base of the off-set wedge 1811. The screw head 1805D located at the top of the screw 1805 facilitates rotational engagement, allowing a user to tighten or loosen the screw 1805 using a tool, manual hand grip, or an attached spindle arm. By rotating the screw 1805, downward pressure is exerted through the fixed nut 1808A, causing a specific tilting action of the off-set wedge 1811.

The off-set wedge 1811 comprises two distinct surfaces: a tapered top surface 1811A and a flat bottom portion 1812. The fixed nut 1808A, which may be fixedly attached near one side (e.g., 1812B) of the flat bottom portion 1812, serves as an anchor or pivot point during the tightening operation. As the screw 1805 is rotated and advances downward through the fixed nut 1808A, the force exerted by the screw 1805 causes controlled displacement of the off-set wedge 1811.

Specifically, during the tightening process, the downward movement of the screw 1805 applies force at the contact point with the fixed nut 1808A, generating an upward force on the side (e.g., 1812B) near the fixed nut 1808A. At the same time, the opposite side (e.g., 1812A) of the off-set wedge 1811 either tilts downward or remains stationary relative to its original position. This asymmetrical force distribution enables the tapered top surface 1811A of the off-set wedge 1811 to interact with the tapered lower surface of the upper stem portion 1810. As a result of this interaction, a tilting motion 1811B occurs, which causes the off-set wedge 1811 to expand laterally into engagement with the internal surface of a tumbler or bottle.

The fixed nut 1808A plays a pivotal role in this operation by acting as a fulcrum, restricting movement on one side (e.g., 1812B) while enabling force to propagate to the other side of the off-set wedge 1811. This controlled tilting motion may be influenced by the shape and dimensions of the tapered top surface 1811A, which interacts with the upper stem portion 1810 in such a way that even minimal screw advancement results in a predictable lateral displacement.

For example, in one embodiment, the tapered angle of the top surface 1811A may be between 10-45 degrees, allowing for gradual and precise tilting. A smaller angle may create a slower, more gradual tilt, suitable for holding delicate glass tumblers, whereas a larger angle provides quicker engagement for sturdier containers like stainless steel bottles.

The flat bottom portion 1812 of the off-set wedge 1811 provides stability and consistency of motion. The fixed nut 1808A, positioned near side 1812B, minimizes unwanted lateral shifting of the off-set wedge 1811 during operation, while side 1812A either rotates slightly downward or stabilizes depending on the amount of force exerted. In scenarios where the screw 1805 is loosened, the reverse action occurs: the upward force at 1812B diminishes, and the off-set wedge 1811 retracts, disengaging from the container.

The interaction between the screw 1805, fixed nut 1808A, and the tapered surfaces allows for controlled, repeatable operation of the tumbler support apparatus 1800. For example, the screw 1805 may include pre-measured threads 1805A, 1805B, and 1805C, providing incremental adjustments for fine-tuning the degree of tilt in the off-set wedge 1811. This functionality may particularly be beneficial in applications requiring precise alignment and firm holding of various container types.

In some embodiments, the flat bottom portion 1812 of the off-set wedge 1811 may be coated with a non-slip material, such as rubber or silicone, to prevent any internal slipping when engaging smooth surfaces like glass. Additionally, the fixed nut 1808A can be fabricated from materials such as hardened steel, brass, or durable composites to withstand repeated tightening and loosening operations without deformation or wear.

The described tilting mechanism, facilitated by the interaction between the screw 1805, fixed nut 1808A, and tapered surfaces, provides a robust and reliable solution for securely holding tumblers, bottles, or similar containers. The combination of mechanical simplicity and precision enables the tumbler support apparatus 1800 to accommodate a wide range of container diameters and material types, further enhancing its versatility and usability across different applications.

The tilting action of the off-set wedge 1811 enables the tumbler support apparatus 1800 to establish secure contact with the internal surface of a tumbler or bottle. For example, when inserted into a wine bottle neck or tumbler opening, the off-set wedge 1811 tilts relative to the upper stem portion 1810 as the screw 1805 is tightened, creating lateral pressure against the internal walls of the container. This engagement provides a strong and stable grip, preventing any displacement of the tumbler support apparatus 1800 during operations such as custom printing, engraving, or painting. The fixed nut 1808A facilitates that the tilting motion occurs in a controlled and predictable manner, maintaining consistency across multiple uses.

The fixed plate 1806 positioned above the stem support portion 1804 includes a central hole (e.g., 1706A) through which the screw 1805 is inserted. The fixed plate 1806 may be made of materials such as stainless steel, aluminum, or high-strength composites to provide stability and rigidity. In certain embodiments, the fixed plate 1806 may incorporate features such as alignment grooves or markings to aid in positioning the screw 1805 and providing concentric alignment with the off-set wedge 1811. For example, a concentric alignment of the screw 1805 with the upper stem portion 1810 and off-set wedge 1811 provides uniform tilting and secure engagement.

The upper stem portion 1810 is designed to interface seamlessly with the tapered top surface 1811A of the off-set wedge 1811. The tapered surfaces of both components may be configured to interact in a way that facilitates smooth and consistent tilting when actuated by the screw 1805. The upper stem portion 1810 may be constructed from materials such as reinforced polyurethane, polycarbonate, or soft metals like aluminum. These materials provide the necessary strength for repeated use while being soft enough to avoid damaging fragile containers, such as glass tumblers or bottles.

In some embodiments, the off-set wedge 1811 may further include a protective coating or surface treatment to enhance its interaction with the internal surface of the tumbler. For example, the off-set wedge 1811 may be coated with rubberized paint, silicone, or polyurethane foam to provide a soft yet firm contact point. Such coatings facilitate that the tumbler support apparatus 1800 can hold delicate items securely without causing scratches or surface damage. For applications involving metallic tumblers, the off-set wedge 1811 may include a non-slip surface texture to enhance grip and prevent slippage.

The screw head 1805D at the top of the screw 1805 may be configured to accommodate various forms of rotational engagement. For example, it may include a hexagonal slot, cross-slot, or torx interface to allow engagement with tools such as wrenches, electric screwdrivers, or spindle arms. In automated embodiments, the screw head 1805D may be connected to a motorized spindle that facilitates precise tightening and loosening of the screw 1805. This feature is particularly useful in production environments where multiple tumblers or bottles are being supported and rotated simultaneously.

In some embodiments, the off-set wedge 1811 may be equipped with additional features, such as cushioned inserts or spring-loaded components, to further enhance its adaptability to various container types. For example, a spring-loaded cushion may be incorporated beneath the off-set wedge 1811, allowing it to absorb minor shocks or vibrations during operations such as engraving or printing. The addition of spring-loaded components facilitates that the off-set wedge 1811 maintains consistent contact with the internal surface of the container, even if slight irregularities or variations exist.

The fixed nut 1808A located at the base of the off-set wedge 1811 can be fabricated using materials such as brass, stainless steel, or hardened composites to provide durability and resistance to wear. For example, brass nuts are known for their smooth threading and resistance to corrosion, making them ideal for use in environments where humidity or moisture is present. The fixed nature of the nut 1808A facilitates that it remains stationary relative to the off-set wedge 1811, allowing the tilting motion to occur predictably as the screw 1805 is tightened.

In operation, the tumbler support apparatus 1800 can be inserted into a variety of container openings, such as wine bottles, glass tumblers, or stainless-steel mugs. For example, when used in conjunction with a wine bottle, the off-set wedge 1811 tilts outward as the screw 1805 is rotated downward, causing the upper stem portion 1810 to push against the tapered top surface 1811A. This outward tilting motion establishes a secure contact with the bottle's internal surface, preventing any movement during processes such as labeling, painting, or etching.

The tumbler support apparatus 1800 may also include a locking mechanism 1803 positioned on the handle 1802. The locking mechanism 1803 can be configured to secure the screw 1805 in place after tightening, preventing any unintentional loosening during operation. In some embodiments, the locking mechanism 1803 may be manual, such as a thumb screw or friction-based lock, or automatic, such as a spring-loaded pin that engages when the screw 1805 reaches a predefined position. This feature adds reliability to the tumbler support apparatus 1800, particularly in applications requiring extended use.

Figure 18B:
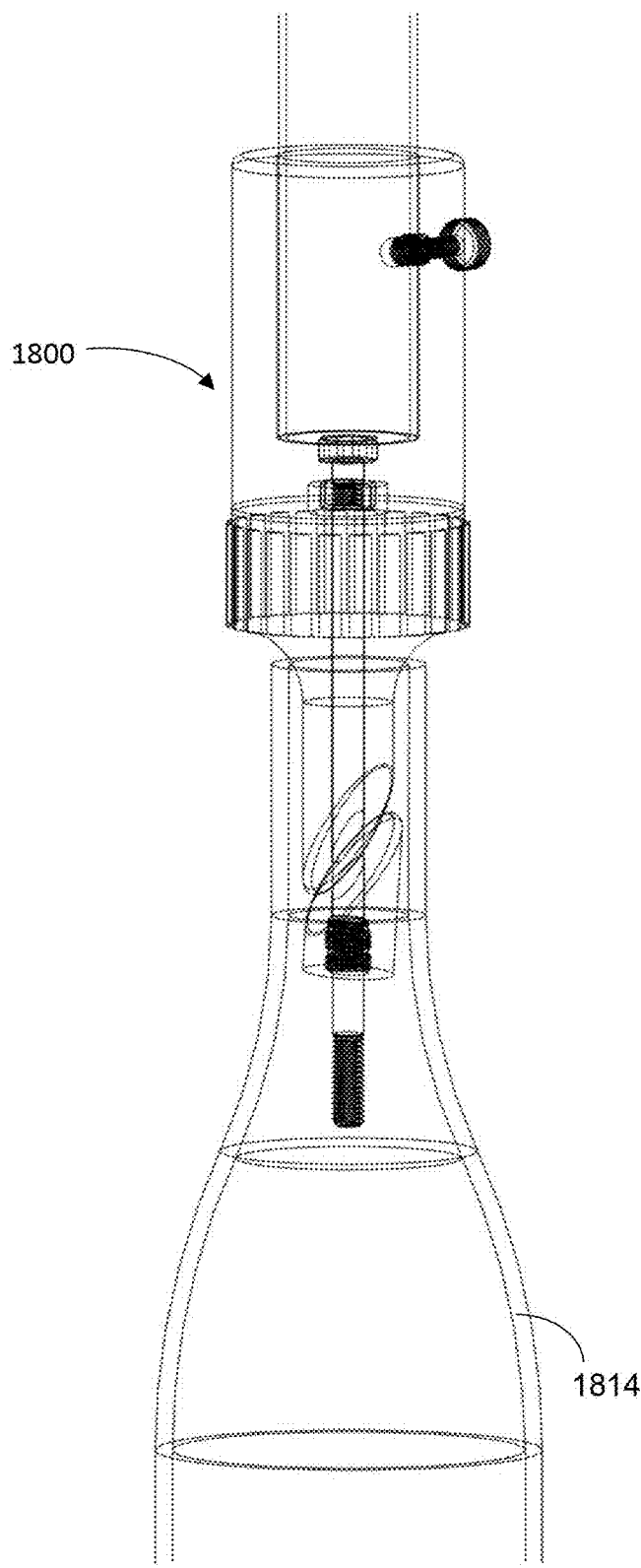
FIGS. 18B-18C illustrate exemplary applications of the tumbler support apparatus, wherein the apparatus includes an off-set wedge with a fixed nut to facilitate secure engagement through tilting.
Figure 18C:
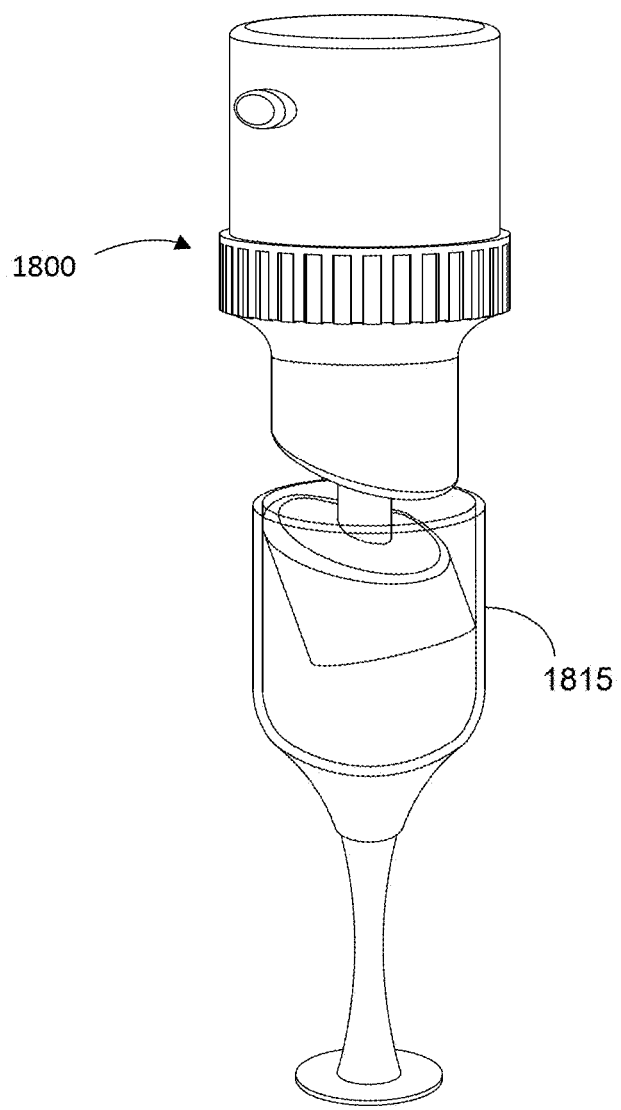

Referring now to FIGS. 18B-18C, the figures illustrate exemplary applications of the tumbler support apparatus 1800 in practical use, particularly for securely holding items such as a bottle 1814 (FIG. 18B) and a wine glass 1815 (FIG. 18C). The tumbler support apparatus 1800 functions by utilizing its off-set wedge 1811, as previously discussed in FIG. 18A, wherein the tilting motion caused by a fixed nut 1808A allows the tumbler support apparatus 1800 to engage with the interior surface of the items, providing stability and firm grip for various applications.

In FIG. 18B, the tumbler support apparatus 1800 is shown securely engaging the neck region of a bottle 1814. This application demonstrates how the tumbler support apparatus 1800 may be utilized in scenarios where a firm and reliable hold is required for processing or decorative purposes. For example, during painting, printing, or engraving operations, bottles often require consistent and stable rotational movement for precise design application. The tumbler support apparatus 1800 may be connected to a rotational spindle or a motorized unit (not shown in the figure) via the screw head 1805D. As the screw 1805 is actuated, the off-set wedge 1811 tilts into place, pressing firmly against the interior surface of the bottle 1814 to hold it in a stable position. This prevents undesired shifting or wobbling during operations such as screen printing, laser engraving, or even hand-painting decorative elements on the bottle.

The locking mechanism 1803, located on the handle 1802, may further assist in maintaining the stability of the tumbler support apparatus 1800 by preventing unintentional movement of the screw 1805 during rotation or handling. In some embodiments, the locking mechanism 1803 may be activated manually by turning a screw knob or automatically by integrating it with a spring-loaded detent system. This adds versatility to the apparatus, making it suitable for automated assembly lines, where bottles need to be painted or engraved in a sequential manner.

In another application, as illustrated in FIG. 18C, the tumbler support apparatus 1800 is shown engaging with the interior surface of a wine glass 1815. This embodiment highlights the ability of the apparatus to accommodate items with varying shapes and dimensions, such as the narrower neck and widened body of the wine glass. Such support systems are particularly valuable in settings where delicate handling of glassware is required. For example, wine glasses are often customized with etchings, coatings, or painted designs, especially for use in restaurants, wineries, or as personalized gifts. The tumbler support apparatus 1800 provides a reliable means to hold the wine glass 1815 in place without causing damage to its fragile interior surface.

To accommodate the fragile nature of glassware, the upper stem portion 1810 and the off-set wedge 1811 may be constructed from materials that are both soft and strong. For example, materials such as silicone-coated plastics, soft polymer composites, or rubberized alloys may be used. These materials provide sufficient flexibility to conform to the curvature of the interior surface while also offering the structural integrity needed to hold the item securely. Furthermore, the threads 1805A located at the lower portion of the screw 1805 may include a soft cap or sleeve to prevent direct contact with the bottom of the glass or bottle, thus avoiding scratches or cracks.

In some embodiments, the tumbler support apparatus 1800 may be used in decorative displays, such as in restaurants, wineries, or retail spaces. Wine glasses or bottles 1815, 1814, or similar items may be mounted using the tumbler support apparatus 1800 to create elegant hanging displays. For example, bottles may be hung upside down in a chandelier-like arrangement, while wine glasses can be mounted in a staggered manner for aesthetic appeal. The stability provided by the off-set wedge 1811 facilitates that such items remain securely in place without the risk of falling.

Additionally, the tumbler support apparatus 1800 may be applied in automated cleaning systems for glassware or bottles. In such systems, the screw head 1805D of the screw 1805 may be connected to a rotational mechanism that enables the wine glass 1815 or bottle 1814 to rotate while being subjected to cleaning sprays, brushes, or drying systems. The tilting mechanism of the off-set wedge 1811 allows for quick engagement and disengagement of the apparatus, which is particularly beneficial in high-throughput cleaning operations.

Another embodiment may include the use of the tumbler support apparatus 1800 for testing or inspection processes in quality control environments. For example, during the production of wine bottles or glasses, manufacturers may use the apparatus to hold items for visual inspection, strength testing, or weight balancing. By securely engaging the interior surface, the apparatus facilitates that the items remain stationary while testing equipment performs the necessary checks.

In certain configurations, the tumbler support apparatus 1800 may be part of a multi-support assembly, wherein several bottles 1814 or glasses 1815 are held simultaneously using multiple apparatuses arranged in parallel. This setup may be useful in mass production or bulk customization operations where efficiency and precision are paramount. Each apparatus may be independently controlled using its screw 1805 to engage or disengage with individual items, allowing for flexibility in processing multiple shapes and sizes.

The versatility of the tumbler support apparatus 1800 may also extend to artistic applications, such as creating decorative pieces where bottles or glasses are incorporated into larger structures. For example, an artist may use the apparatus to hold multiple wine glasses 1815 in a specific arrangement for crafting a chandelier or sculptural installation. The tilting capability of the off-set wedge 1811 allows for precise positioning of each item, contributing to the overall design and symmetry of the artwork.

In another example, the tumbler support apparatus 1800 may be used in photography or videography settings to hold bottles 1814 or glasses 1815 at specific angles for product photography. The ability to tilt and securely hold items using the off-set wedge 1811 facilitates that the items remain in the desired orientation throughout the photoshoot, allowing photographers to capture high-quality images without disruptions caused by instability.

The tumbler support apparatus 1800 may also be integrated into educational environments, such as chemistry or physics laboratories, where bottles 1814 or glassware 1815 need to be held securely for experiments or demonstrations. For example, the apparatus 1800 can hold glass beakers or test tubes in an upright or tilted position while allowing for controlled manipulation during the experiment.

Figure 19A:
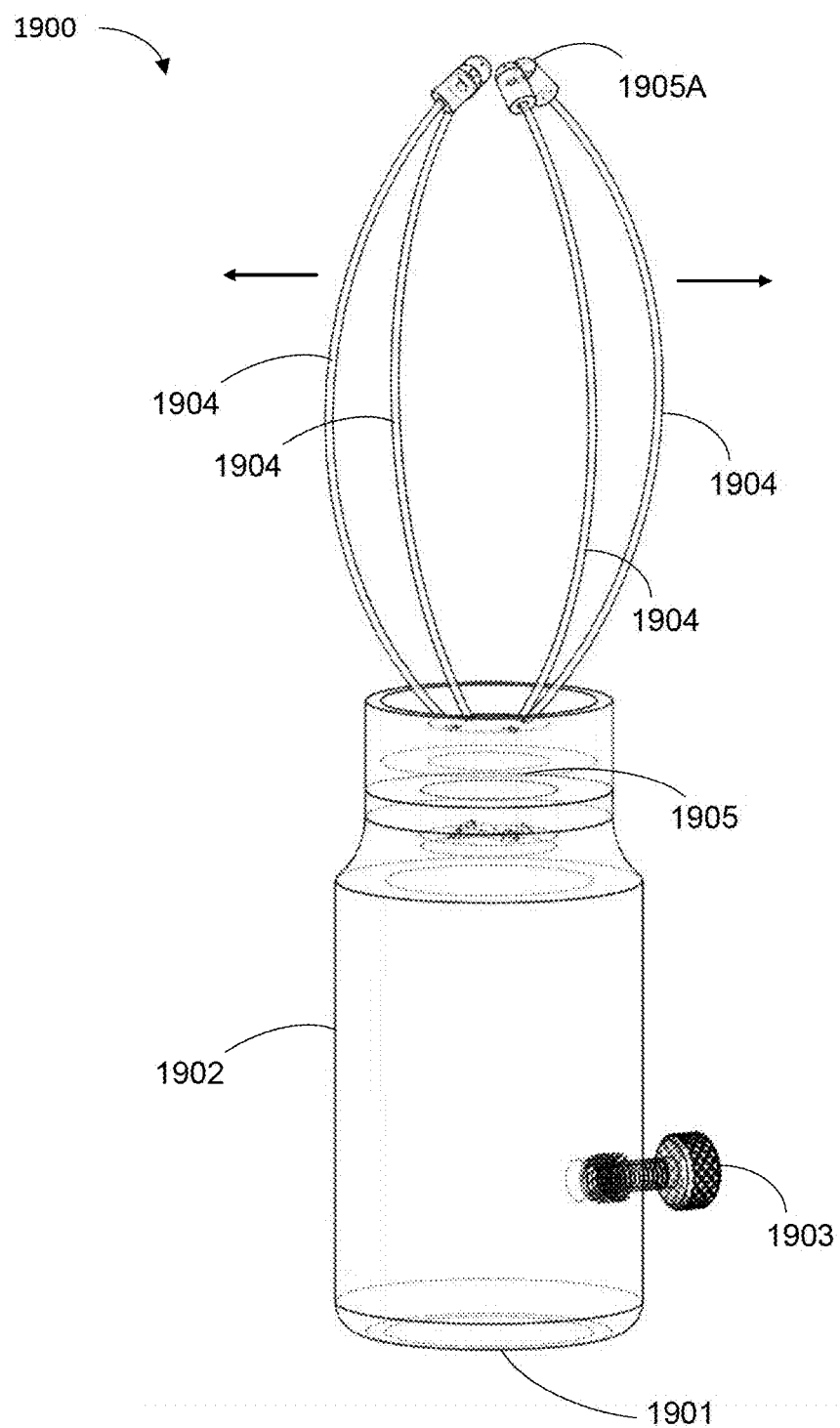
FIG. 19A illustrates an apparatus with a plurality of flexible arms actuated by a spring mechanism to expand and contact the internal surface of a tumbler or bottle for secure engagement, according to some embodiments of the present invention.

Referring now to FIG. 19A, the apparatus 1900 depicts an innovative support system designed to secure an interior surface of a tumbler, bottle, or similar item. The apparatus 1900 incorporates a handle 1902, a locking mechanism 1903, and a plurality of flexible arms 1904 actuated by a spring mechanism 1905. The apparatus 1900 operates by allowing the flexible arms 1904 to expand outward when actuated, thereby engaging the internal surface of a container such as a bottle or tumbler. The apparatus 1900 offers versatile engagement and provides a secure hold without damaging or scratching delicate surfaces, making it adaptable for various applications.

The flexible arms 1904 may be integral to the apparatus 1900 and may comprise multiple elongated members that extend radially outward from a central hub or attachment point. These arms 1904 can expand or contract in response to an actuating force, such as the compression or decompression of the spring mechanism 1905. When expanded, the arms 1904 firmly contact the internal surface of the item to be held, such as a glass bottle, tumbler, or other containers with cylindrical or tapered interior structures. Each arm 1904 may include a curvature or flexibility that enables it to adapt to the varying contours of the interior surfaces, providing a reliable hold.

The spring mechanism 1905 may be a central element of the apparatus 1900 and functions to actuate the flexible arms 1904. In one embodiment, the spring mechanism 1905 may be mechanically compressed or expanded by an external force, such as the rotation or pulling of a spindle arm inserted into the handle 1902. For example, if a spindle is inserted at the point of insertion 1901 into the apparatus 1900, rotating or pushing the spindle actuates the spring mechanism 1905, causing the arms 1904 to expand. As the spring decompresses, it drives the flexible arms 1904 outward to contact the internal surface of the item. When the external force is removed, the spring may contract, retracting the arms 1904 to their original position.

The handle 1902 provides a point of control for the apparatus 1900. Users may manually hold the handle 1902 to stabilize the apparatus during engagement or actuation. The handle 1902 may also accommodate additional elements, such as a rotational mechanism, to further assist with the operation of the spring mechanism 1905. For example, in automated systems, the handle 1902 may interface with robotic arms, motorized spindles, or other actuators to expand and contract the flexible arms 1904 for engaging and disengaging items.

The locking mechanism 1903 allows the apparatus 1900 to lock the flexible arms 1904 into an expanded position. This mechanism facilitates that once the arms 1904 are in contact with the interior surface of a bottle or tumbler, they remain securely fixed in that position until the locking mechanism 1903 is disengaged. The locking mechanism 1903 may include a threaded thumb screw, a friction lock, a pawl-and-ratchet system, or a spring-loaded latch. In some embodiments, the locking mechanism 1903 may be engaged automatically once the spring mechanism 1905 is actuated to expand the arms 1904.

To prevent damage to the interior surface of delicate items, the flexible arms 1904 may include soft tips 1905A (soft-tip extensions) at their contact ends. These soft tips 1905A can be made of materials such as silicone, rubber, or soft polymer coatings, which provide a cushioning effect while maintaining a strong grip. For example, when holding a glass bottle or tumbler, the soft tips 1905A distribute the applied force evenly across the contact surface, avoiding localized pressure points that may cause cracks or scratches. This makes the apparatus 1900 particularly useful for handling fragile glassware, crystal containers, or other delicate items.

In some embodiments, the apparatus 1900 may be used for customization processes, such as engraving, painting, or printing designs on tumblers, bottles, or glasses. For example, when a bottle or tumbler is inserted into the apparatus 1900, the flexible arms 1904 expand to hold the item securely, allowing precise rotation or stationary positioning during the customization process. The ability to lock the arms 1904 into position with the locking mechanism 1903 enables accurate alignment and prevents any unintentional movement of the item.

The apparatus 1900 may also be integrated into automated manufacturing or assembly systems. For example, in bottling plants or production lines, the apparatus may hold bottles in place during filling, capping, or labeling processes. The flexible arms 1904 provide a versatile gripping mechanism that can adapt to bottles of various shapes and sizes, reducing the need for multiple specialized holding fixtures. The spring mechanism 1905 allows for quick engagement and disengagement of the apparatus, improving efficiency in high-throughput environments.

In another embodiment, the apparatus 1900 may be utilized for cleaning or washing applications. For example, the flexible arms 1904 can hold bottles or tumblers in place while they are subjected to cleaning sprays or brushes. The soft tips 1905A prevent damage to the items during the cleaning process. This application may be particularly useful in commercial dishwashing systems, where glassware needs to be held securely for effective cleaning.

The apparatus 1900 can also serve as a decorative display holder in retail settings, restaurants, or event venues. For example, bottles or glasses may be mounted using the flexible arms 1904, creating elegant hanging displays or decorative arrangements. The apparatus may hold wine glasses or bottles at varying angles, contributing to aesthetic presentations such as chandelier-like structures or wall-mounted displays.

In laboratory environments, the apparatus 1900 may be used to securely hold beakers, flasks, or test tubes for experiments and demonstrations. The flexible arms 1904 provide stability during procedures such as mixing, heating, or testing, while the locking mechanism 1903 facilitates that the items remain stationary. The soft tips 1905A further protect fragile glassware from accidental damage.

The apparatus 1900 may also be employed for inspection or quality control purposes. For example, during the production of glass bottles or tumblers, the apparatus 1900 can hold the items in place for visual inspection or testing. The spring-actuated mechanism 1905 enables quick and secure engagement of the items, facilitating efficient quality control processes.

In another example, the apparatus 1900 may be used in artistic applications, such as creating decorative lighting fixtures or sculptural installations. For example, an artist may use the apparatus to hold bottles or glasses in specific positions while assembling a larger structure. The flexible nature of the arms 1904 allows for precise placement and adjustment of each item, enabling complex and intricate designs.

The versatility of the apparatus 1900 extends to photography and videography settings as well. For product photography, the apparatus can hold bottles or glasses at specific angles for capturing high-quality images. The locking mechanism 1903 facilitates that the items remain stable throughout the photoshoot, allowing photographers to achieve consistent and accurate results.

Figure 19B:
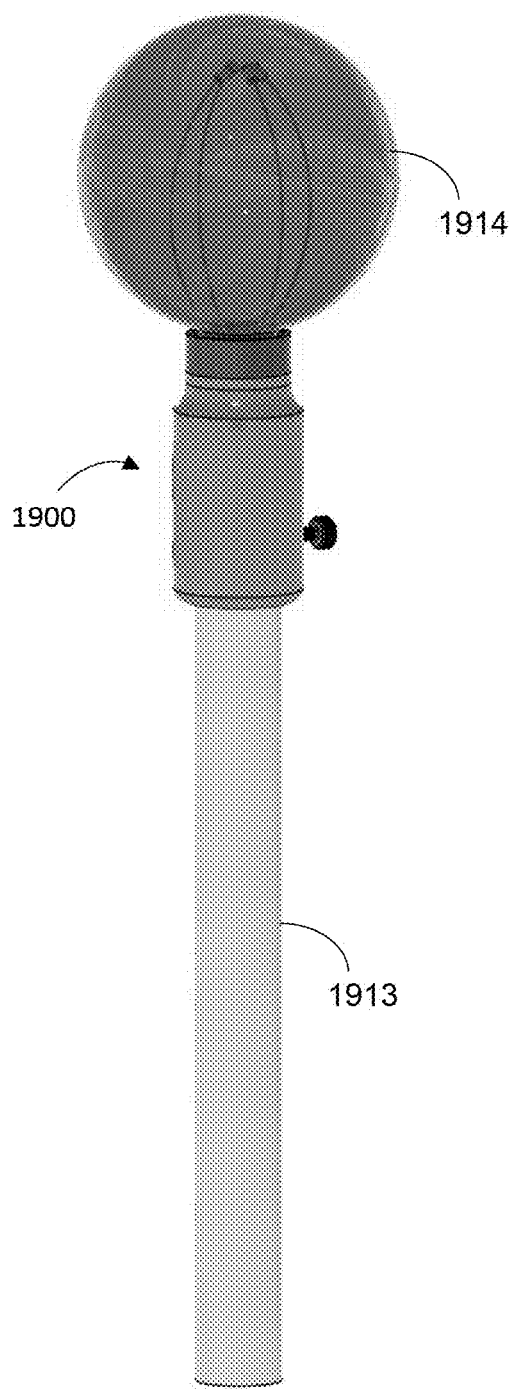
FIG. 19B illustrates an exemplary application of the apparatus for holding an ornamental item using flexible arms, the flexible arms expand to securely engage the internal surface of the item.

Referring now to FIG. 19B, the figure illustrates an exemplary application of the apparatus 1900 for holding an ornamental item 1914 using the plurality of flexible arms 1904. In this configuration, the flexible arms 1904 are actuated to expand outward and securely engage the internal surface of the ornamental item 1914, which may include spherical objects, decorative globes, light fixtures, or similar items requiring secure holding. The apparatus 1900 is shown in an upright orientation, where the ornamental item 1914 is positioned above the apparatus 1900, and a spindle arm or rod 1913 is inserted through the point of insertion (1901) at the handle (1902) of the apparatus 1900 to actuate the mechanism that expands the arms 1904.

The hollow spindle 1913 acts as a rotational or linear actuator, which, when turned or manipulated, engages an internal mechanism (e.g., 1905) to cause the flexible arms 1904 to expand. This actuation enables the arms 1904 to apply a force against the internal surface walls of the ornamental item 1914. The flexible nature of the arms 1904 facilitates that they adapt to the contours of the item's interior, providing a secure grip. This may particularly be advantageous for items with smooth, curved, or irregular internal surfaces, where maintaining consistent contact is important for stability.

The apparatus 1900 can accommodate various ornamental items, including decorative globes, glass lampshades, spherical ornaments, or lightweight structural components. The flexible arms 1904 may include soft tips (1905A, as previously discussed in FIG. 19A), which protect the delicate internal surface of the ornamental item 1914 from scratches, cracks, or other damage during engagement. For example, in applications involving glass or ceramic materials, the soft tips can cushion the contact points while still maintaining sufficient force to hold the item 1914 securely.

The upright configuration shown in FIG. 19B demonstrates a standard application where the ornamental item 1914 is held in a stable, vertical position. This orientation may be used for display purposes, such as in retail stores, event decorations, or art installations, where the item 1914 is intended to be viewed from multiple angles. The spindle or rod 1913, which extends downward from the apparatus 1900, may serve as a mounting structure for placement on display stands, walls, or other vertical surfaces. The apparatus can also interface with a base or holder, allowing the entire assembly to stand upright on flat surfaces.

When the apparatus 1900 is used in a downward configuration, where the ornamental item 1914 is suspended below the apparatus 1900, additional applications become feasible. For example, in hanging light fixtures, the apparatus 1900 can hold glass globes or lampshades securely in place while allowing electrical wiring or lighting components to pass through the hollow spindle 1913. The downward configuration is particularly advantageous in situations where gravity aids the secure positioning of the item 1914, as the flexible arms 1904 maintain their expanded grip while the weight of the item prevents any unintended movement.

The downward orientation may also be used for artistic installations or chandelier assemblies, where multiple ornamental items 1914 are arranged in a suspended formation. In such applications, the apparatus 1900 offers both functional and aesthetic benefits by securely holding each item 1914 while allowing for precise alignment and spacing. For example, a series of decorative glass spheres can be suspended at varying heights to create visually appealing lighting or decorative effects.

In terms of working, the hollow spindle 1913 can be manually or mechanically rotated to actuate the flexible arms 1904. For manual operation, a user may insert and rotate the hollow spindle 1913 to expand the arms 1904. In automated systems, the hollow spindle 1913 can be connected to a motorized drive mechanism, enabling rapid and consistent expansion of the arms 1904 for industrial or high-volume applications. For example, in manufacturing facilities where large numbers of ornamental items 1914 need to be held and processed (e.g., for coating, painting, or assembly), the automated actuation of the flexible arms 1904 enhances efficiency.

The apparatus 1900 can also include a locking mechanism (e.g., locking knob 1903 as seen in FIG. 19A), which can be engaged to fix the flexible arms 1904 in their expanded state. Once the arms 1904 have securely engaged the internal surface of the item 1914, the locking mechanism prevents any unintentional retraction, maintaining a stable hold. This locking feature is particularly useful when the apparatus 1900 is mounted in dynamic environments, such as moving display stands, rotating structures, or vibrational systems.

The material selection for the apparatus 1900 is another aspect to consider. The flexible arms 1904 may be constructed from strong yet flexible materials such as metal alloys, reinforced plastics, or composite polymers. For applications requiring electrical insulation or corrosion resistance, materials such as silicone-coated metals or non-reactive polymers may be used. The hollow spindle 1913 can be made of durable materials such as aluminum, stainless steel, or PVC, depending on the desired strength-to-weight ratio and application environment.

For example, in outdoor applications, where the apparatus 1900 is exposed to environmental elements, materials such as anodized aluminum or corrosion-resistant polymers may be used to provide durability. The flexible arms 1904 can also be coated with weather-resistant layers to enhance longevity. In indoor environments, such as art galleries, showrooms, or homes, aesthetic considerations may influence material choices, with polished finishes or decorative coatings enhancing the visual appeal of the apparatus.

To accommodate various ornamental items 1914, the size and flexibility of the arms 1904 can be adjusted. In some embodiments, the apparatus 1900 may include interchangeable sets of flexible arms 1904 to handle items of different sizes and shapes. For example, larger arms may be used for holding wide glass globes, while smaller arms may be suited for delicate ornaments or narrow containers. The hollow spindle 1913 can also be designed with adjustable lengths to accommodate items of varying depths or heights.

Figures 20A, 20B:
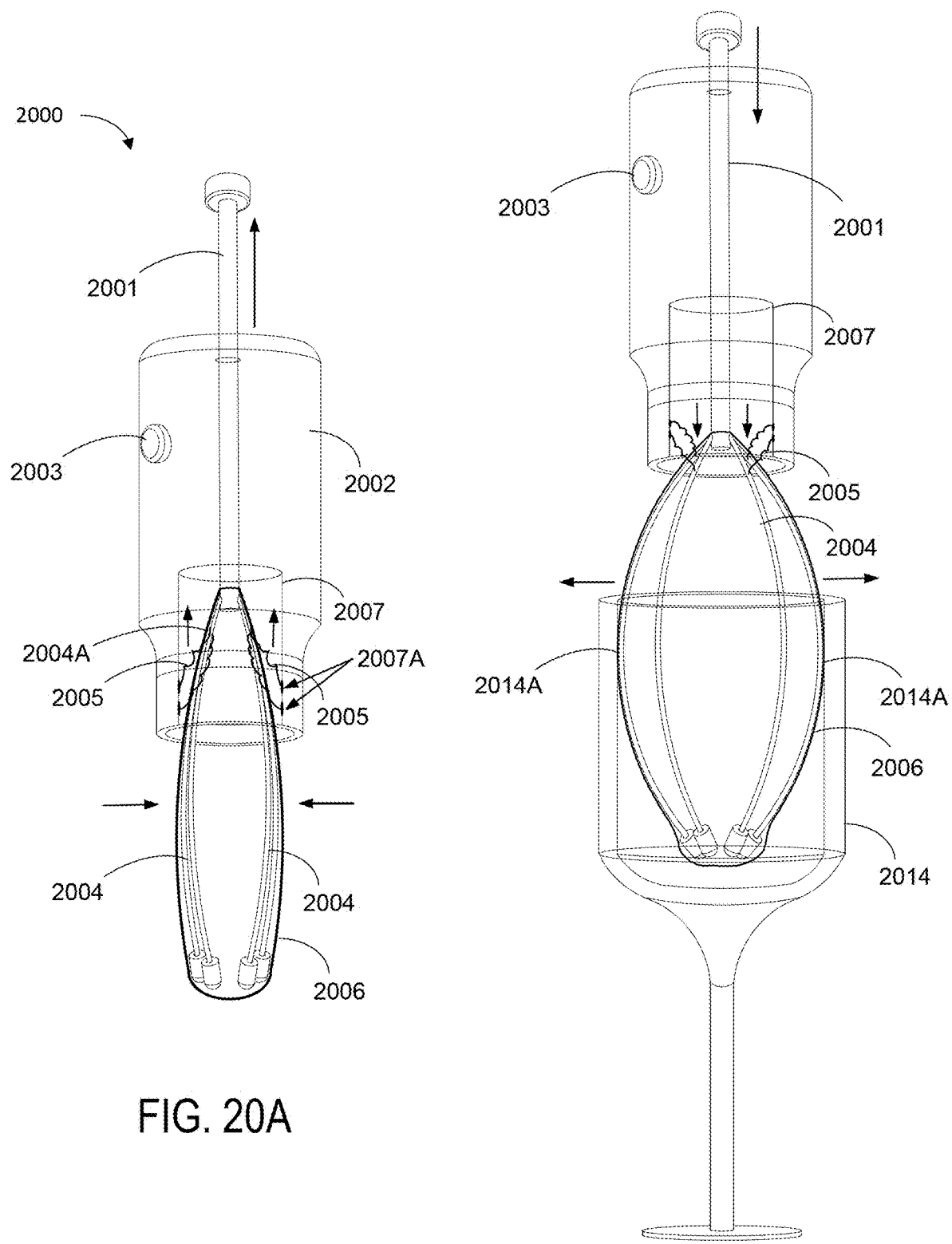
FIGS. 20A-20B illustrate an exemplary apparatus with flexible arms enclosed within a bladder to provide a soft contact surface for securely holding an item without damaging its internal surface, according to some embodiments of the present invention.

Referring now to FIGS. 20A-20B, these figures illustrate an exemplary apparatus 2000 with a set of flexible arms 2004 enclosed within a bladder 2006, designed to provide a soft contact against the interior surface 2014A of an item 2014 such as a tumbler, wine glass, bottle, or similar vessel, according to some embodiments of the present invention. The apparatus 2000 operates in a controlled manner to securely hold such items without causing any damage to their internal surfaces. This invention provides a significant advancement in supporting delicate or decorative objects that may otherwise be prone to scratches or deformation when gripped directly by rigid components.

The apparatus 2000 comprises a spindle 2001, a handle 2002, a locking mechanism 2003, a chamber 2007, and flexible arms 2004 that are enveloped by the bladder 2006. The spindle 2001 acts as an actuating rod, which, when moved upward or downward, causes controlled expansion and contraction of the flexible arms 2004. The chamber 2007, housed within the handle 2002, incorporates an actuation mechanism for controlling the movement of the flexible arms 2004. The actuation mechanism comprises a plurality of flexible strings 2005, which may be individual springs or cables, with each string connected to both the flexible arms 2004 and the chamber's internal side points 2007A of the chamber 2007.

In particular, each of the flexible strings 2005 has two fixed connection points-one at the respective flexible arms 2004 through connection points 2004A, and the other at the internal anchor points 2007A of the chamber 2007. The design allows the flexible strings 2005 to act as tension components, transmitting the movement of the spindle 2001 to the flexible arms 2004. When the spindle 2001 is moved in an upward direction, the connection points 2004A on the flexible arms 2004 are pulled upward. This upward force causes the flexible arms 2004 to contract inwardly toward the center axis of the apparatus 2000, collapsing the arms 2004 into a more compact shape. In this state, as shown in FIG. 20A, the flexible arms 2004 are positioned closely together, which facilitates their easy insertion into the opening of a tumbler 2014 or other vessel.

Once the apparatus 2000 is positioned within the item 2014, such as a tumbler, bottle, or glass, the spindle 2001 is then actuated or moved downward, as depicted in FIG. 20B. Moving the spindle 2001 downward releases the tension in the flexible strings 2005 and then moves the flexible strings 2005 downward with the connection points 2004A, allowing the flexible arms 2004 to expand outwardly. The expansion of the flexible arms 2004 occurs in conjunction with the bladder 2006, which is designed to provide a cushioning interface between the arms 2004 and the interior surface 2014A of the item 2014. The bladder 2006, which surrounds the outer surfaces of the flexible arms 2004, facilitates that the expansion process is smooth and that no direct rigid contact occurs with the delicate internal walls of the item 2014.

The bladder 2006 may be made from a variety of soft, pliable materials such as silicone, rubber, polyurethane, or other elastomeric substances that provide flexibility, durability, and a non-abrasive surface. This construction enables the bladder 2006 to adapt to the shape of the interior surface 2014A, creating a uniform contact that distributes force evenly across the gripping area. For example, when holding glass tumblers or thin-walled bottles, the use of the bladder 2006 eliminates concentrated pressure points that may otherwise lead to cracks, scratches, or structural damage.

The spindle 2001 may be manually or mechanically operated, depending on the implementation. In manual configurations, the spindle 2001 may include a textured grip or rotational knob at its upper end to facilitate hand-operated movement. For automated systems, the spindle 2001 can be integrated with a motorized drive system or pneumatic actuator, enabling precise control over the upward and downward motion. For example, in high-throughput manufacturing environments where large numbers of tumblers 2014 need to be gripped, decorated, or painted, a motorized spindle 2001 can rapidly actuate the apparatus 2000, increasing efficiency and reducing manual labor.

The actuation mechanism within the chamber 2007 further provides additional versatility to the apparatus 2000. The flexible strings 2005 may be tensioned or relaxed to varying degrees, allowing the expansion and contraction of the flexible arms 2004 to be finely controlled. For example, in scenarios where the internal diameter of the item 2014 varies, the apparatus 2000 can be adjusted to accommodate such variations. The flexible strings 2005 may also be replaced with different types of springs (e.g., 1905) or tension cables, depending on the required holding force and desired flexibility.

The apparatus 2000 may particularly be well-suited for applications where the secure holding of delicate items is required. For example, in painting operations, the apparatus 2000 can hold glass tumblers, bottles, or wine glasses while their external surfaces are coated with paint, lacquer, or other decorative finishes. The bladder 2006 facilitates that no paint or coating adheres to the internal surfaces of the item 2014 while maintaining a stable grip throughout the process. Similarly, in laser engraving or etching applications, the apparatus 2000 holds the item 2014 securely in place, allowing precise application of patterns, text, or logos without the risk of slipping or misalignment.

Another notable application is in retail and display environments, where the apparatus 2000 can be used to hold decorative glassware, bottles, or other ornamental items for aesthetic presentation. The ability to securely grip items without visible external clamps or supports makes the apparatus 2000 ideal for creating clean and visually appealing displays. For example, wine glasses or decorative bottles can be showcased in suspended or upright configurations, adding to their overall presentation value.

The construction of the handle 2002 and the chamber 2007 may involve materials such as aluminum, stainless steel, or reinforced polymers, depending on the desired strength, weight, and durability of the apparatus 2000. For applications requiring lightweight and portable configurations, the use of high-strength polymers provides an optimal balance of durability and case of use. For heavy-duty industrial applications, metals such as stainless steel or anodized aluminum may be preferred for their strength and corrosion resistance.

In certain embodiments, the apparatus 2000 may be adapted with additional locking mechanisms to maintain the expanded position of the flexible arms 2004. For example, a locking pin or friction lock may be integrated into the spindle 2001 to hold it in place once the flexible arms 2004 have expanded. This feature provides stability during prolonged use, such as during long-duration painting, curing, or decorative processes.

Furthermore, the bladder 2006 may be designed with modular or replaceable components, allowing users to swap out worn or damaged bladders with new ones. This modular design enhances the longevity and adaptability of the apparatus 2000, making it suitable for use with a variety of item sizes and shapes. For example, larger bladders 2006 may be used for wide-neck bottles, while smaller bladders can be employed for narrow or intricately shaped glassware.

Figures 21A, 21B:
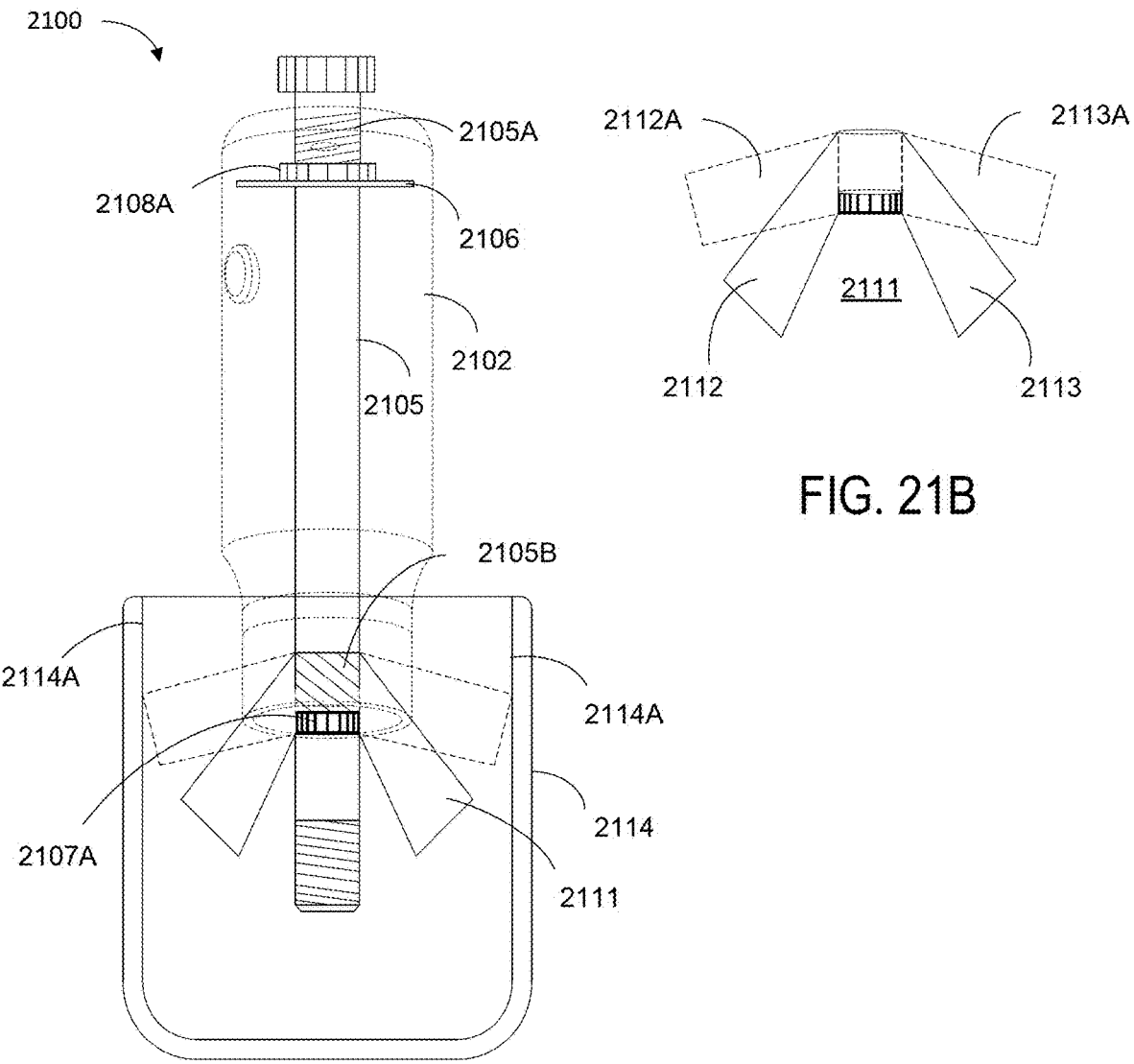
FIGS. 21A-21B illustrate an exemplary apparatus comprising a butterfly-type mechanism with expandable and compressible wing portions configured to engage and secure the interior surface of a tumbler.

Referring now to FIGS. 21A-21B, these figures illustrate an alternative embodiment of a tumbler support apparatus 2100 that utilizes a butterfly-type mechanism 2111 with expandable and compressible wing portions 2112-2113 to engage and secure the interior surface 2114A of a tumbler 2114. The apparatus 2100 incorporates a handle 2102, a plate 2106, a screw 2105, and threaded portions 2105A-2105B that interact with fixedly attached nuts 2108A and 2107A respectively. This design enables the butterfly-type mechanism 2111 to expand its wing portions 2112-2113 when the screw 2105 is rotated and tightened, creating an outward force that causes the expanded wings 2112A-2113A, as shown in FIG. 21B, to firmly contact the interior surface 2114A of the tumbler 2114. This engagement provides a stable and secure holding mechanism suitable for various applications.

The butterfly-type mechanism 2111 may be advantageous for applications requiring adaptive contact with varying internal diameters of tumblers, bottles, or other vessels. The mechanism's wing portions 2112-2113 are designed with a central pivot point, enabling them to expand outward symmetrically when acted upon by the downward motion of the screw 2105. As shown in FIG. 21A, the screw 2105 passes through the plate 2106 and threads into the fixed nut 2107A, which is anchored at the base of the butterfly-type mechanism 2111. The rotation of the screw 2105 causes a downward force at the center of the butterfly mechanism 2111, effectively pushing the central pivot downward and causing the wing portions 2112-2113 to tilt outward, as illustrated by the expanded wings 2112A-2113A in FIG. 21B.

The expansion of the wing portions 2112-2113 occurs due to the combination of forces generated by the screw 2105 and the inherent design of the butterfly mechanism 2111. The wings 2112-2113 may include a hinge or flexible joint at their connection points to the central pivot, allowing them to move outward under pressure. The wings 2112-2113 are shaped in such a way that their outward edges align with the curvature of the tumbler's interior surface 2114A. This alignment provides consistent and even contact across the surface, providing stability without causing localized stress or damage to the tumbler 2114.

For example, in applications involving delicate glassware, such as wine glasses or crystal tumblers, the butterfly-type mechanism 2111 with its expandable wings 2112-2113 proves advantageous. The wing portions 2112-2113 may be coated or lined with a soft material such as silicone, rubber, or felt to provide a cushioning effect when engaging the interior surface 2114A. This soft contact facilitates that no scratches, cracks, or imperfections occur on the delicate glass surface while still maintaining a firm grip. Such an implementation may particularly be useful in laser etching, engraving, or decorative painting processes where stability of the glassware during operation is paramount.

In some embodiments, the wing portions 2112-2113 may have a textured surface or patterned grip to further enhance their contact with the interior surface 2114A. The textured surfaces may include ridges, grooves, or anti-slip coatings that improve friction and prevent the tumbler 2114 from slipping or rotating unintentionally. This feature may be valuable in rotational applications, where the tumbler 2114 is rotated about its axis for painting, engraving, or polishing operations. For example, during a painting process, the tumbler 2114 must remain firmly secured while being rotated to apply an even coat of paint across its surface. The butterfly-type mechanism 2111, with its expanded wings 2112A-2113A, provides the necessary grip and stability to facilitate such operations.

The screw 2105 is the control mechanism of the apparatus 2100, enabling precise control over the expansion and contraction of the wing portions 2112-2113. The screw 2105 comprises threaded portions 2105A at the upper end and 2105B near the base, which interact with the fixed nuts 2108A and 2107A, respectively. The upper nut 2108A may be positioned within or above the plate 2106 to provide initial guidance and alignment for the screw 2105. As the screw 2105 is rotated, the downward motion generated at the base of the butterfly mechanism 2111 causes the wing portions 2112-2113 to expand outward. Conversely, when the screw 2105 is rotated in the opposite direction, the upward motion causes the wing portions 2112-2113 to retract, facilitating easy removal of the apparatus 2100 from the tumbler 2114.

The plate 2106 serves as a support structure for the screw 2105 and provides stability during the tightening and loosening operations. The plate 2106 may be constructed from durable materials such as stainless steel, aluminum, or reinforced polymer to withstand repeated use and high levels of force without deformation. In some embodiments, the plate 2106 may include alignment marks or indicators to assist users in positioning the apparatus 2100 within the tumbler 2114. For example, alignment marks may help users center the butterfly-type mechanism 2111 along the axis of the tumbler 2114, providing uniform expansion of the wing portions 2112-2113.

The handle 2102 provides a convenient grip for the user to hold and manipulate the apparatus 2100 during operation. The handle 2102 may include ergonomic features such as a contoured shape, textured surface, or anti-slip coating to enhance user comfort and control. Additionally, the handle 2102 may house a locking mechanism to secure the screw 2105 in place once the desired expansion of the wing portions 2112-2113 is achieved. For example, a locking pin or friction-based lock may prevent unintentional rotation of the screw 2105 during use, maintaining a stable and secure grip on the tumbler 2114.

The butterfly-type mechanism 2111 can be adapted for various applications beyond holding tumblers 2114. For example, the apparatus 2100 may be used to secure bottles, vases, or other cylindrical objects with internal cavities. In the context of manufacturing processes, the apparatus 2100 can hold containers during labeling, filling, or quality inspection operations. For decorative purposes, the apparatus 2100 may hold ornamental items such as glass globes, decorative vases, or sculptural pieces for painting, etching, or polishing.

In another embodiment, the wing portions 2112-2113 may be designed with modular or interchangeable components to accommodate objects of different sizes and shapes. For example, larger wings may be used for wide-diameter tumblers, while smaller wings may be employed for narrow bottles or test tubes. The modular design enhances the versatility of the apparatus 2100, allowing it to be adapted for a wide range of applications with minimal adjustments.

Furthermore, the butterfly-type mechanism 2111 may include additional features such as sensors or feedback mechanisms to monitor the expansion force applied to the interior surface 2114A. For example, pressure sensors embedded within the wing portions 2112-2113 may provide real-time feedback to the user, indicating whether the apparatus 2100 is securely engaged with the tumbler 2114. This feature is particularly useful in automated systems, where precise control over gripping force is required to prevent damage to delicate glassware.

Figures 22A, 22B:
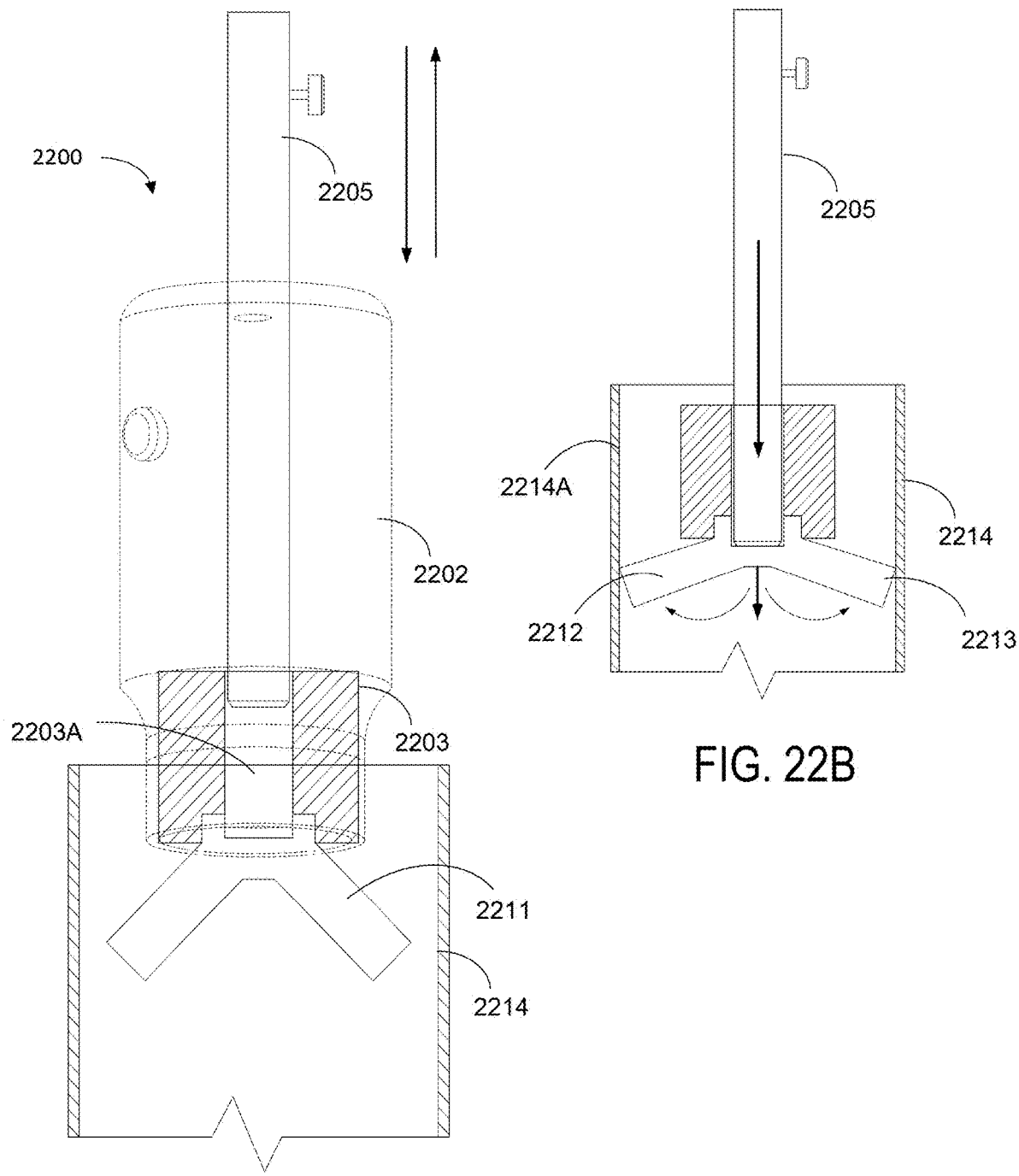
FIGS. 22A-22B illustrate an exemplary apparatus comprising a butterfly-type mechanism with wing portions actuated through a spindle arm, providing an alternative to screw-based expansion for engaging the interior surface of a tumbler.

Referring now to FIGS. 22A-22B, an exemplary apparatus 2200 is illustrated, comprising a butterfly-type mechanism 2211 configured to provide secure engagement with the interior surface 2214A of a tumbler 2214 or similar items. The apparatus 2200 includes a handle 2202, a spindle arm 2205, and expandable wing portions 2212 and 2213 integrated into the butterfly-type mechanism 2211. The apparatus 2200 offers an alternative actuation method compared to screw-based expansion, utilizing the vertical movement of the spindle arm 2205 to actuate the expansion and compression of the wing portions 2212 and 2213, as further described herein.

The handle 2202 comprises a lower portion 2203, which includes a vertical hollow 2203A configured to receive the spindle arm 2205. The spindle arm 2205 is designed to slide within the vertical hollow 2203A in an upward or downward direction as shown by the arrows in FIG. 22A. This vertical motion facilitates the actuation of the butterfly-type mechanism 2211, which, in turn, engages or disengages the wing portions 2212 and 2213 with the interior surface 2214A of the tumbler 2214. The lower portion 2203 of the handle 2202 acts as a guide for the spindle arm 2205, providing smooth movement and stability during operation.

The butterfly-type mechanism 2211, as illustrated in FIGS. 22A-22B, comprises two wing portions 2212 and 2213, which are symmetrically positioned about a central flexible joint or point of contact within the mechanism 2211. This flexible point is located at the center of the butterfly-type mechanism 2211, allowing the wing portions 2212 and 2213 to pivot or expand outward in response to a downward force exerted by the spindle arm 2205. When the spindle arm 2205 is pressed downward, the force at the central flexible point causes the wing portions 2212 and 2213 to pivot along their respective axes, moving outward toward the interior surface 2214A of the tumbler 2214.

As the wing portions 2212 and 2213 expand outward, their respective outer edges make contact with the interior surface 2214A of the tumbler 2214. This contact provides a frictional or mechanical engagement that holds the apparatus 2200 securely in place within the tumbler 2214. The expansion force exerted by the wing portions 2212 and 2213 is sufficient to prevent slippage or disengagement of the apparatus 2200, even during rotational or vibrational forces applied to the handle 2202 or the spindle arm 2205. For example, the apparatus 2200 may be used to secure a tumbler 2214 during customization processes, such as engraving, printing, or painting, where stability and alignment are necessary for precision.

In addition to its primary functionality, the butterfly-type mechanism 2211 may include flexible or padded surfaces on the wing portions 2212 and 2213 to prevent damage to the interior surface 2214A of the tumbler 2214. For example, the wing portions 2212 and 2213 may include rubberized, silicone, or other soft material coatings on their contact edges, thereby facilitating that the apparatus 2200 is suitable for use with glass, ceramic, or other delicate materials. This feature is particularly advantageous when securing fragile tumblers, bottles, or ornamental items that are prone to scratching or breakage.

In some embodiments, the spindle arm 2205 may include a threaded portion or a locking mechanism to maintain the downward force applied to the butterfly-type mechanism 2211. For example, the spindle arm 2205 may be rotated to engage a threaded nut or locking collar positioned within the vertical hollow 2203A of the handle 2202. Once the spindle arm 2205 is locked in position, the wing portions 2212 and 2213 remain expanded, maintaining secure engagement with the interior surface 2214A of the tumbler 2214. This locking mechanism facilitates that the apparatus 2200 remains stable and reliable during extended periods of use.

The upward motion of the spindle arm 2205, as shown in FIG. 22A, causes the wing portions 2212 and 2213 to collapse inward, disengaging from the interior surface 2214A of the tumbler 2214. This collapsing motion allows the apparatus 2200 to be easily inserted into or removed from the tumbler 2214 without requiring significant force or manual adjustment. The flexibility of the butterfly-type mechanism 2211, combined with the vertical motion of the spindle arm 2205, provides a user-friendly and efficient solution for securing and releasing the apparatus 2200 within various types of tumblers or bottles.

In some embodiments, the butterfly-type mechanism 2211 may be fabricated from a combination of rigid and flexible materials to optimize its performance. For example, the central flexible joint of the mechanism may be constructed from a spring steel or elastomeric material that provides sufficient flexibility for the wing portions 2212 and 2213 to pivot, while the wing portions themselves may be constructed from rigid materials such as aluminum, plastic, or composite materials to provide structural integrity. This combination of materials facilitates that the apparatus 2200 is both durable and adaptable to different use cases.

The apparatus 2200 may be used in various applications beyond securing tumblers for customization. For example, the apparatus 2200 may be used to hold bottles, vases, or other cylindrical items during manufacturing, assembly, or display processes. In a decorative application, the apparatus 2200 may be used to hold ornamental items such as glass globes, light fixtures, or decorative containers in an upright or inverted position for display purposes. The versatility of the butterfly-type mechanism 2211, combined with the actuation provided by the spindle arm 2205, makes the apparatus 2200 suitable for a wide range of industrial, commercial, and consumer applications.

Referring now to FIGS. 23A-23B, an exemplary tumbler support apparatus 2300 is illustrated, wherein secure engagement with the interior surface of a supported item such as a tumbler 2314 is achieved through a spring-actuated lever mechanism. The apparatus 2300 comprises several components that work in conjunction to facilitate controlled tilting and secure engagement of the off-set wedge 2311. These components include a handle 2302, a grip 2304, a plate 2306, an upper stem portion 2310, a lower stem portion or off-set wedge 2311, a first spring mechanism 2307, and a lever mechanism 2305 connected to a lever knob 2301 (i.e., a user-actuated knob). Additionally, a second spring mechanism 2308 located on a rod 2309 (pivoting joint) provides a default tilted configuration of the off-set wedge 2311.

The handle 2302 provides the primary support structure for the apparatus 2300 and houses the spring-actuated lever mechanism that controls the position and movement of the off-set wedge 2311. Positioned at the top of the handle 2302 is a lever knob 2301, which allows a user to actuate the lever mechanism 2305. The lever mechanism 2305 is connected within the handle 2302 and extends downward toward the off-set wedge 2311. The lever 2305 interacts with the first spring mechanism 2307, which is seated within the handle 2302 and above the plate 2306. The first spring mechanism 2307 is configured to provide a controlled force that biases the lever 2305 upward or downward, depending on the direction of actuation.

The plate 2306 is positioned within the handle 2302 and provides a structural intermediary between the handle 2302 and the upper stem portion 2310. The upper stem portion 2310 extends downward from the plate 2306 and connects to the off-set wedge 2311 via the pivoting joint 2309. The off-set wedge 2311 is configured to engage with the interior surface of the tumbler 2314 once it is tilted into position. The off-set wedge 2311 includes edges 2311A that facilitate contact with the interior surface of the tumbler 2314. This engagement is dependent upon the controlled tilting motion of the off-set wedge 2311, which is achieved through the interaction of the lever mechanism 2305, the rod 2309, the first spring mechanism 2307, and the second spring mechanism 2308.

The default tilted position of the off-set wedge 2311 may be advantageous for applications requiring precise engagement with the interior surface of a tumbler 2314 or similar item. For example, during customization processes such as engraving or printing, it is often necessary to insert the support apparatus into the tumbler in a controlled manner. The tilted position allows a user to align the apparatus 2300 with the tumbler opening while preventing premature contact between the off-set wedge 2311 and the interior surface 2314A of the tumbler 2314.

In operation, the user can actuate the lever knob 2301 to control the movement of the lever mechanism 2305 and, consequently, the position of the off-set wedge 2311. By pressing the lever knob 2301 downward, the lever mechanism 2305 compresses the first spring mechanism 2307, transferring force through the lever tip 2305A to counteract the biasing force of the second spring mechanism 2308. This action causes the off-set wedge 2311 to transition from its default tilted position to an aligned or neutral position, as shown in FIG. 23B. In this aligned position, the edges 2311A of the off-set wedge 2311 retract inward, allowing the apparatus 2300 to be inserted into the tumbler 2314.

Once the apparatus 2300 is inserted into the tumbler 2314, the user may release the lever knob 2301, allowing the first spring mechanism 2307 to return to its neutral state. As the first spring mechanism 2307 relaxes, the second spring mechanism 2308 biases the off-set wedge 2311 back into its tilted position. In this tilted configuration, the tapered edges 2311A of the off-set wedge 2311 make secure contact with the interior surface 2314A of the tumbler 2314. This contact provides sufficient frictional force to hold the apparatus 2300 securely in place, even under rotational or vibrational forces.

The spring-actuated lever mechanism described herein offers significant advantages over traditional screw-based systems for tilting the off-set wedge 2311. For example, the spring-actuated mechanism allows for faster and more efficient operation, reducing the time and effort required to insert or remove the apparatus 2300 from a tumbler 2314. Additionally, the use of spring mechanisms 2307 and 2308 provides controlled and repeatable movement of the off-set wedge 2311, providing consistent performance across multiple uses.

The materials used for the various components of the apparatus 2300 may be selected based on the intended application and operating conditions. For example, the handle 2302 and plate 2306 may be constructed from durable materials such as aluminum, stainless steel, or high-strength polymers to provide structural integrity and resistance to wear. The off-set wedge 2311 and upper stem portion 2310 may be constructed from softer materials such as silicone, rubber, or composite materials to provide a secure yet non-damaging contact with the interior surface 2314A of the tumbler 2314. The rod 2309 and lever mechanism 2305 may be constructed from metal alloys or hardened plastics to withstand the forces applied during operation.

In some embodiments, the lever knob 2301 may include ergonomic features such as a textured or contoured surface to facilitate comfortable and efficient operation by the user. Additionally, the lever mechanism 2305 may incorporate a locking feature that allows the user to maintain the off-set wedge 2311 in a fixed position during extended periods of use. This locking feature may be particularly useful for applications requiring prolonged engagement with the tumbler 2314, such as during automated engraving or painting processes.

The apparatus 2300 provides a detailed mechanism for inserting and securing the off-set wedge 2311 into the tumbler 2314 while maintaining controlled movement and holding functionality. To enable the insertion of the off-set wedge 2311 into the tumbler 2314, the user may actuate the first spring mechanism 2307 by applying a downward force on the lever knob 2301. By pressing the lever knob 2301, the force is transferred to the lever 2305, which pivots and causes the lever tip 2305A to assert a downward force onto the off-set wedge 2311. This downward pressure counteracts the biasing force of the second spring mechanism 2308, forcing the off-set wedge 2311 from its default tilted position to a substantially straight position.

In the straight position, the off-set wedge 2311 becomes aligned with the upper stem portion 2310, enabling smooth insertion of the apparatus 2300 into the interior cavity of the tumbler 2314. The interaction between the lever tip 2305A and the off-set wedge 2311 provides precise control during this transitional state, so that the wedge 2311 remains stable and aligned as it enters the tumbler opening. The second spring mechanism 2308, which is connected to the rod 2309, serves as an anchor point that facilitates the tilting motion of the off-set wedge 2311 when transitioning between positions.

To hold the off-set wedge 2311 in its straight position, the user may utilize the locking mechanism 2303, which is integrated into the handle 2302. The locking mechanism 2303 may be configured as a manually operated latch, a set screw, a toggle lock, or a similar securing device. Once engaged, the locking mechanism 2303 temporarily restricts the movement of the lever 2305 and holds the off-set wedge 2311 in the straightened configuration. This feature enables the user to focus on inserting the apparatus 2300 into the tumbler 2314 without needing to maintain continuous pressure on the lever knob 2301.

Once the off-set wedge 2311 has been fully inserted into the tumbler 2314, the user can disengage the locking mechanism 2303 to release the lever mechanism 2305. Gradually releasing the lever knob 2301 allows the first spring mechanism 2307 to expand, retracting the lever tip 2305A away from the off-set wedge 2311. As the downward force is removed, the biasing force of the second spring mechanism 2308 causes the off-set wedge 2311 to transition back to its default tilted position. In this tilted position, the tapered edges 2311A of the off-set wedge 2311 engage with the interior surface of the tumbler 2314, securing it firmly in place.

The described operation provides a controlled and reliable method for securing the off-set wedge 2311 inside the tumbler 2314. This dual-spring design, comprising the first spring mechanism 2307 and the second spring mechanism 2308, enables smooth transitions between the straight and tilted positions, thereby preventing sudden or uncontrolled movements that may damage the interior surface 2314A of the tumbler 2314.

In some embodiments, the user may choose to utilize the locking mechanism 2303 at any point during the operation to hold the off-set wedge 2311 in its current position. For example, if the user feels that the off-set wedge 2311 has already made sufficient contact with the tumbler's interior surface 2314A, the locking mechanism 2303 may be engaged to secure the apparatus 2300. This flexibility allows the user to prevent excessive tilting of the off-set wedge 2311, which may otherwise lead to stress on fragile glass tumblers or similar delicate items. The ability to lock the off-set wedge 2311 at intermediate positions also provides enhanced control and adaptability for different applications, such as holding tumblers of varying sizes or thicknesses.

Additionally, the described operation reduces the likelihood of accidental breakage or damage to the tumbler 2314, particularly when dealing with fragile materials such as glass or ceramics. The second spring mechanism 2308, acting as the anchor for the off-set wedge 2311, provides a gradual and controlled tilting motion, minimizing the risk of sudden force being applied to the interior surface 2314A. The user-friendly operation of the lever knob 2301 and locking mechanism 2303 further enhances the safety and reliability of the apparatus 2300 during use.

In some embodiments, the lever knob 2301 may be ergonomically designed to provide a comfortable grip for the user. For example, the lever knob 2301 may include textured surfaces, finger grooves, or a non-slip coating to facilitate precise and effortless actuation. Furthermore, the lever 2305 and lever tip 2305A may be constructed from durable materials such as stainless steel or hardened polymers to withstand repeated use without deformation or wear.

The materials used for the off-set wedge 2311 may include soft but resilient materials such as silicone, rubber, or composite plastics. These materials provide sufficient strength to hold the tumbler 2314 securely while also protecting the interior surface 2314A from scratches or damage. The combination of a soft yet durable material for the off-set wedge 2311 with the precise control offered by the lever mechanism 2305 makes the apparatus 2300 suitable for a wide range of applications.

In some embodiments, the apparatus 2300 may include additional features to enhance its functionality. For example, the handle 2302 may include an indicator or gauge to provide visual feedback on the position of the off-set wedge 2311. Such an indicator may be particularly useful for operators who require precise control over the insertion and engagement process. Additionally, the apparatus 2300 may be configured with a release mechanism that allows the user to quickly reset the off-set wedge 2311 to its default tilted position without manual adjustment.

In some embodiments of the present invention, the default configuration of the off-set wedge 2311 may not be tilted but rather in a straight position, thereby simplifying the process of inserting the off-set wedge 2311 into the tumbler 2314. In this configuration, the off-set wedge 2311 remains aligned with the upper stem portion 2310, allowing the apparatus 2300 to be inserted directly into the interior cavity of the tumbler 2314 without obstruction. Once the apparatus is positioned inside the tumbler 2314, the user can actuate tilting of the off-set wedge 2311 through the use of the lever 2305 and the first spring mechanism 2307.

In this embodiment, when the lever tip 2305A presses against the off-set wedge 2311, a force is transmitted to tilt the wedge 2311 such that the edges 2311A contact the interior surface of the tumbler 2314. The movement of the lever 2305 causes the second spring mechanism 2308 to stretch or compress, depending on the directional force applied. Specifically, when the off-set wedge 2311 tilts under the influence of the lever 2305, the second spring mechanism 2308 undergoes tensioning. This tension holds the off-set wedge 2311 firmly in the tilted position and facilitates secure engagement with the tumbler's interior surface 2314A.

The actuation process begins with the lever knob 2301, which may be manually operated by the user. When the user presses the lever knob 2301 downward, the first spring mechanism 2307 compresses and generates a downward force. This force causes the lever tip 2305A to pivot against the off-set wedge 2311, inducing the tilting motion. The resulting tilt brings the edges 2311A into physical contact with the interior surface 2314A of the tumbler 2314, enabling the apparatus 2300 to securely hold the tumbler. The interaction between the lever 2305, lever tip 2305A, and the off-set wedge 2311 is designed to provide a controlled, gradual tilting motion, reducing the risk of sudden or excessive force being applied to the tumbler.

In contrast, in the first configuration, where the off-set wedge 2311 is in its default tilted position, the second spring mechanism 2308 is pre-tensioned. In this configuration, the wedge 2311 is already biased toward a tilted position by default. To insert the apparatus 2300 into the tumbler 2314, the user must actuate the lever 2305 to counteract the biasing force of the second spring mechanism 2308. Specifically, pressing the lever knob 2301 causes the lever tip 2305A to press against the off-set wedge 2311, straightening it to align with the upper stem portion 2310. This temporarily overcomes the tension of the second spring mechanism 2308, allowing the off-set wedge 2311 to remain in a straight position for insertion into the tumbler 2314.

Once the off-set wedge 2311 is inserted into the tumbler 2314, the user can gradually release the lever knob 2301, allowing the first spring mechanism 2307 to expand. As the first spring mechanism 2307 expands, the downward force on the lever tip 2305A is reduced. This reduction in force allows the pre-tensioned second spring mechanism 2308 to return to its default state, tilting the off-set wedge 2311 back to its original position. The tensioned state of the second spring mechanism 2308 generates a consistent and controlled tilting motion, enabling the tapered edges 2311A to engage the interior surface 2314A of the tumbler 2314 securely.

The two distinct configurations described above—one where the off-set wedge 2311 begins in a straight position and another where it starts in a default tilted position—offer flexibility in the operation of the apparatus 2300. For example, in applications requiring repeated insertion and removal of the apparatus 2300, starting with the off-set wedge 2311 in the straight position may streamline the insertion process, minimizing the time and effort required. On the other hand, the default tilted configuration may be advantageous in scenarios where the apparatus 2300 is primarily used for holding tumblers 2314 securely for extended periods.

In both configurations, the combination of the first spring mechanism 2307 and the second spring mechanism 2308 provides enhanced control and stability during the tilting process. The first spring mechanism 2307 enables the user to apply a controlled force to actuate the lever 2305, while the second spring mechanism 2308 serves as an anchor that facilitates the return of the off-set wedge 2311 to its default position. This dual-spring design reduces the likelihood of accidental slippage or misalignment, providing consistent engagement with the tumbler 2314.

Furthermore, the use of the lever knob 2301 and the locking mechanism 2303 provides the user with additional control over the operation of the apparatus 2300. For example, the user can engage the locking mechanism 2303 to hold the off-set wedge 2311 in the straight position, making it easier to insert or remove the apparatus 2300 from the tumbler 2314. Once the apparatus is in place, the locking mechanism 2303 can be disengaged, allowing the off-set wedge 2311 to tilt and engage the interior surface 2314A securely.

In some embodiments, the apparatus 2300 may include features such as indicators or gauges to provide feedback on the position of the off-set wedge 2311. For example, a visual indicator may display whether the wedge is in the straight or tilted position, enabling the user to monitor the operation of the apparatus 2300 more effectively. Similarly, audible or tactile feedback mechanisms may be incorporated into the lever knob 2301 to indicate when the off-set wedge 2311 has transitioned between positions.

Figure 24A:
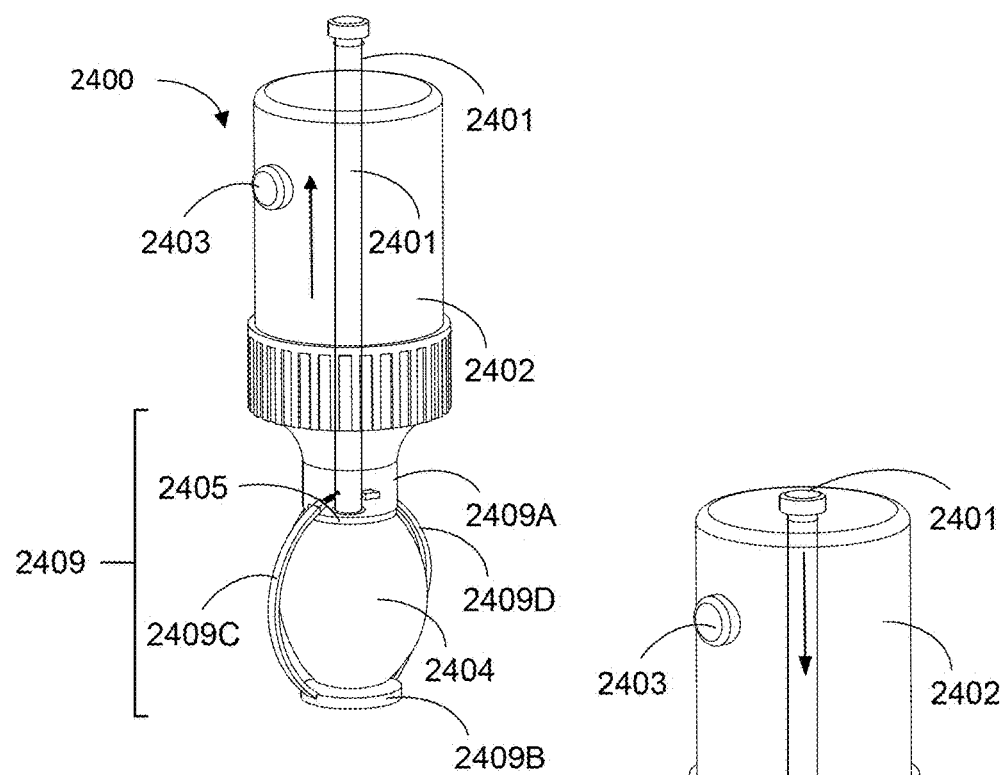
FIGS. 24A-24B illustrate an exemplary tumbler support apparatus comprising a bladder within the stem portion, wherein the bladder is compressed using a lever-actuated piston mechanism to expand and engage the interior surface of a tumbler for secure support.
Figure 24B:
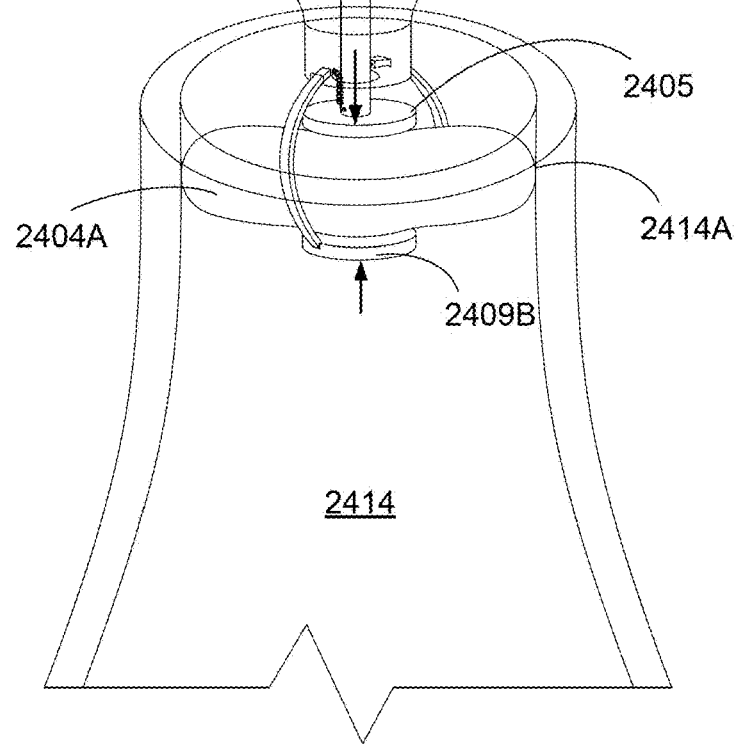

Referring now to FIGS. 24A-24B, an exemplary embodiment of a tumbler support apparatus 2400 is illustrated, wherein a bladder 2404 within a stem portion 2409 is expanded to securely engage the interior surface 2414A of a tumbler 2414 through a lever-actuated piston mechanism. The apparatus 2400 comprises a handle 2402 that enables manual operation and a spindle arm 2401 extending through the handle 2402 to control the compression of the bladder 2404. The stem portion 2409, which facilitates the holding mechanism, includes a top portion 2409A and a base portion 2409B, both of which may feature flat surfaces to provide stability and efficient force distribution during operation. The two portions, namely 2409A and 2409B, may be connected by a pair (or more than two) of connection pieces 2409C and 2409D, which serve as structural components while leaving sufficient spacing to allow for controlled expansion of the bladder 2404.

The bladder 2404 may be positioned between the top portion 2409A and the base portion 2409B. In operation, the spindle arm 2401 inserted through the handle 2402 is moved downward to apply a compressive force onto the bladder 2404. This downward movement compresses the bladder 2404 against the base portion 2409B, forcing the bladder to expand outwardly through the spacing defined by the connection pieces 2409C and 2409D. This controlled expansion, indicated as 2404A in FIG. 24B, causes the bladder 2404 to exert an outward force against the interior surface 2414A of the tumbler 2414. The outward force provides a secure engagement, holding the tumbler 2414 firmly in place.

In one embodiment, the spindle arm 2401 may be operated manually by the user through upward and downward motion within the handle 2402. The spindle arm 2401 may include threads or grooves along its length to facilitate smooth movement, allowing the user to precisely control the level of compression applied to the bladder 2404. For example, when the spindle arm 2401 is pushed downward, the bladder 2404 begins to expand incrementally until it contacts and engages the interior surface 2414A of the tumbler 2414. This mechanism facilitates the expansion occurs in a gradual and controlled manner, preventing any sudden or excessive pressure that might damage delicate glassware or similar fragile items.

The locking mechanism 2403 may be provided to maintain the position of the spindle arm 2401 once the bladder 2404 has been expanded and the tumbler 2414 is securely held. The locking mechanism 2403 may be a thumb screw, a friction-based lock, or any other suitable mechanical mechanism that restricts further movement of the spindle arm 2401. For example, after achieving the desired level of bladder expansion, the user may engage the locking mechanism 2403 to hold the spindle arm 2401 in a fixed position, preventing inadvertent release or movement of the apparatus 2400.

The stem portion 2409 may be designed to offer both structural integrity and functional flexibility. The connection pieces 2409C and 2409D, which link the top portion 2409A to the base portion 2409B, are spaced apart strategically to allow controlled expansion of the bladder 2404. The spacing between the connection pieces 2409C and 2409D may vary based on the dimensions of the bladder 2404 and the diameter of the tumbler 2414. For example, in embodiments where the tumbler 2414 has a larger diameter, the spacing may be increased to accommodate a wider bladder expansion, whereas for smaller tumblers, the spacing can be reduced accordingly.

The bladder 2404 itself may be constructed from a flexible yet durable material, such as silicone, rubber, or an elastomeric polymer, capable of withstanding repeated compression and expansion cycles without deformation or failure. In some embodiments, the outer surface of the bladder 2404 may be textured or coated with a non-slip material to enhance its gripping capability on the interior surface 2414A of the tumbler 2414. For example, a textured silicone bladder 2404 may offer improved friction against smooth glass surfaces, providing reliable engagement even when the tumbler 2414 is subjected to movement or external forces.

The apparatus 2400 is particularly suitable for holding a wide range of items, including tumblers, bottles, vases, or other cylindrical objects with varying interior diameters. For example, in a decorative application, the apparatus 2400 may be used to securely hold ornamental glassware, such as the tumbler 2414 shown in FIG. 24B, for display purposes. By expanding the bladder 2404 inside the glassware, the apparatus provides stable support without causing any damage to the delicate glass surface. This makes it ideal for use in settings such as restaurants, exhibitions, or retail displays where secure, unobtrusive support is required.

The operation of the bladder-based holding mechanism also lends itself to other practical applications. For example, the apparatus 2400 may be used in painting or coating processes where the tumbler 2414 or similar items need to be held securely while being rotated or manipulated. In such embodiments, the spindle arm 2401 may be connected to a motorized assembly, allowing the apparatus 2400 to rotate the tumbler 2414 while maintaining secure engagement through the expanded bladder 2404. The ability to securely hold the tumbler while rotating it enables uniform application of paint, coatings, or other finishes, enhancing the quality and precision of the process.

Figure 26A:
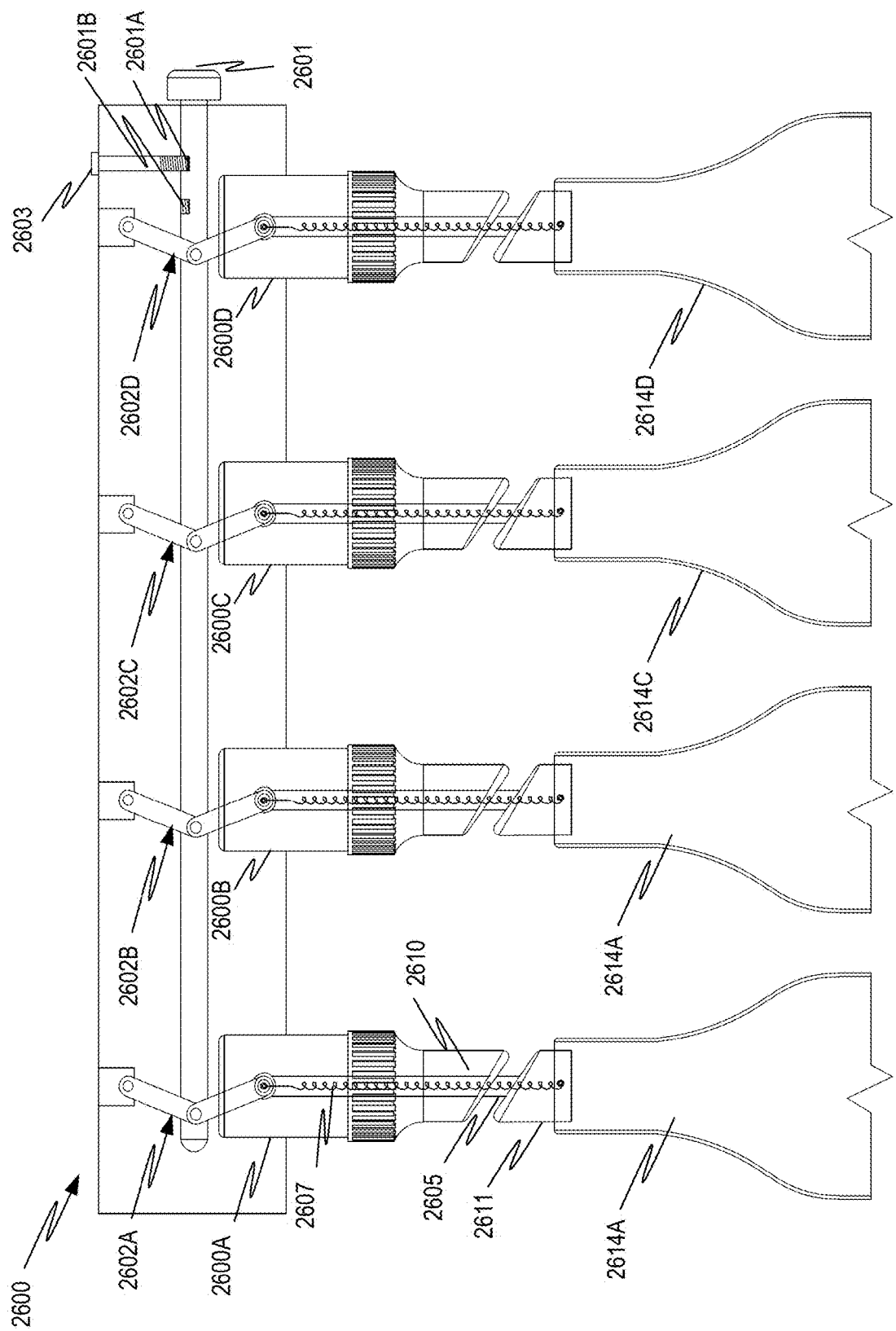
FIGS. 26A-26B illustrate an exemplary apparatus comprising multiple tumbler support assemblies for supporting a plurality of tumblers or bottles, each assembly including an off-set wedge actuated by a spring mechanism via a lever.
Figure 26B:
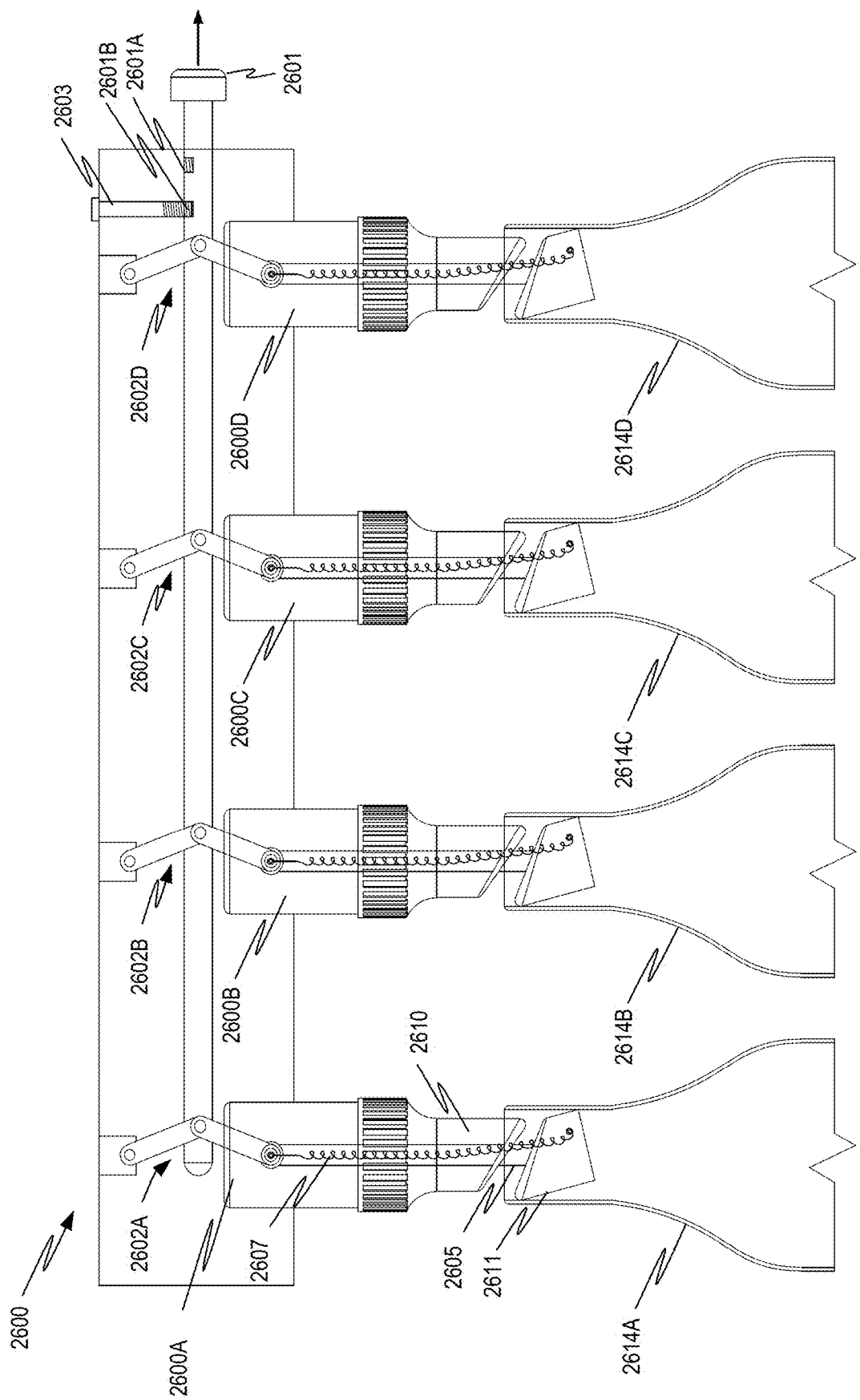

In another embodiment, the apparatus 2400 may be adapted for use in automated systems where multiple tumblers or bottles are handled simultaneously (for example, as in FIGS. 26A-26B). For example, in a manufacturing or bottling environment, a series of apparatuses similar to 2400 may be mounted on a conveyor system, with each apparatus featuring a bladder 2404 capable of expanding to hold individual tumblers 2414. The spindle arms 2401 in each apparatus may be actuated mechanically or pneumatically, allowing for synchronized expansion and compression of the bladders 2404 across the assembly line.

The design of the bladder-based holding mechanism also incorporates safety features to prevent over-expansion of the bladder 2404. For example, mechanical stops or pressure sensors may be integrated into the apparatus 2400 to limit the amount of force applied to the bladder during compression. This prevents damage to both the bladder 2404 and the tumbler 2414, providing consistent and reliable operation over time. Additionally, the use of soft, pliable materials for the bladder 2404 minimizes the risk of scratching or marring the interior surface 2414A of the tumbler 2414, making the apparatus suitable for use with high-quality glassware or other delicate items.

In some embodiments, the apparatus 2400 may include a release mechanism that allows the user to quickly disengage the bladder 2404 from the tumbler 2414. For example, the spindle arm 2401 may include a quick-release lever or button that, when actuated, relieves the compressive force on the bladder 2404, causing it to retract and release its grip on the interior surface 2414A. This feature simplifies the process of removing the apparatus from the tumbler, enhancing user convenience and efficiency.

The versatility and adaptability of the apparatus 2400 make it suitable for a wide range of applications across various industries. Whether used for holding glassware in decorative displays, supporting items during manufacturing processes, or facilitating uniform coating applications, the bladder-based expansion mechanism provides a reliable and effective solution for securely engaging the interior surfaces of tumblers, bottles, and similar objects. By combining innovative design features such as the lever-actuated piston mechanism, the locking mechanism 2403, and the flexible bladder 2404, the apparatus 2400 offers a robust and user-friendly solution for secure and damage-free holding of delicate items.

Figure 25A:
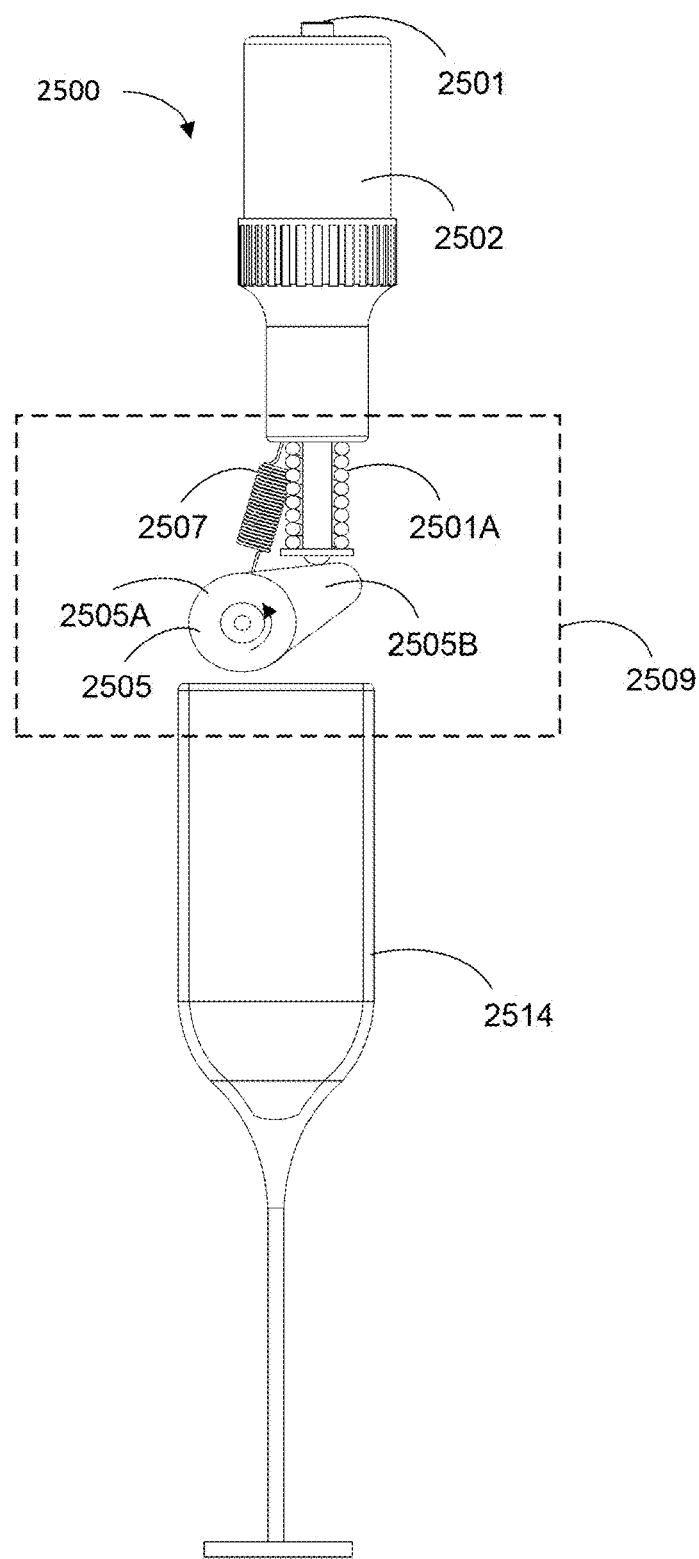
FIGS. 25A-25B illustrate an exemplary tumbler support apparatus incorporating a cam lever mechanism to facilitate secure engagement and positioning of a tumbler or similar items.
Figure 25B:
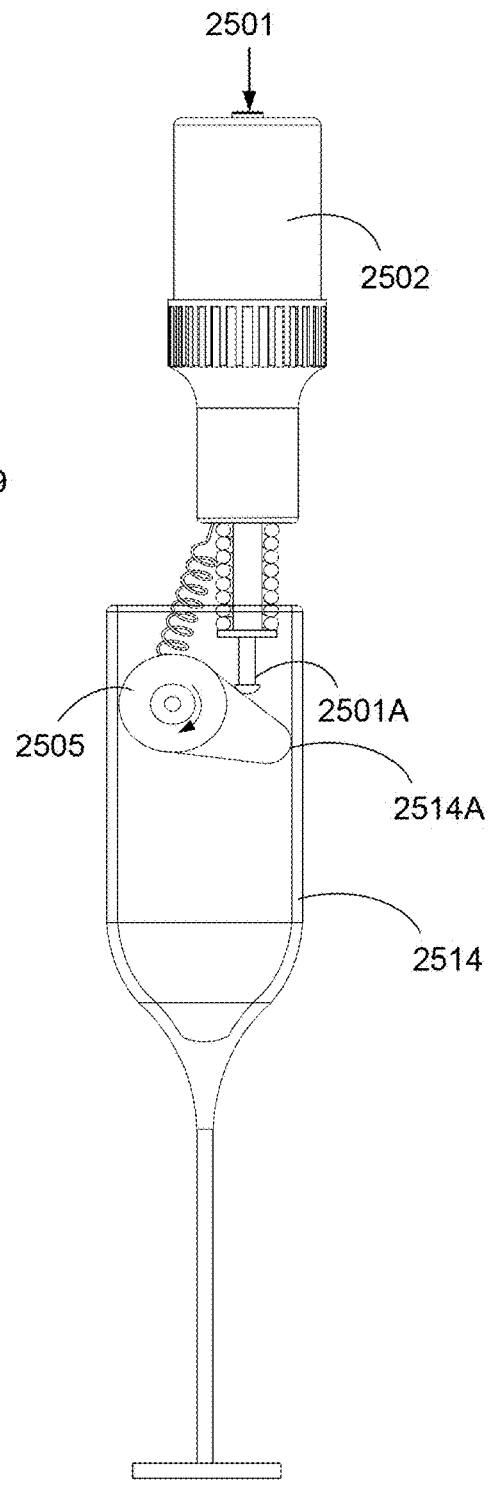

Referring now to FIGS. 25A-25B, an exemplary tumbler support apparatus 2500 is depicted, incorporating a cam lever mechanism 2509 designed to provide secure engagement and positioning of a tumbler 2514 or similar items. The apparatus 2500 includes a handle 2502, a piston 2501, a spring-loaded lever 2501A, a torsion or tension spring 2507, and a cam mechanism 2505. The cam mechanism 2505 comprises a cam rotation portion 2505A and a cam edge 2505B. These components operate in conjunction to facilitate movement, tilting, and secure engagement within the interior surface 2514A of the tumbler 2514. FIG. 25A represents an initial state where the apparatus 2500 is positioned above the tumbler 2514, while FIG. 25B illustrates the apparatus 2500 in a state of secure engagement after actuation of the cam lever mechanism 2509.

The cam lever mechanism 2509 works through interaction between the spring-loaded lever 2501A, the torsion spring 2507, and the cam rotation portion 2505A. The piston 2501, located at the top of the handle 2502, is pressed by the user to actuate the mechanism. Upon pressing the piston 2501, the downward movement transmits force to the spring-loaded lever 2501A, which extends downward and engages the cam edge 2505B to rotate the cam rotation portion 2505A. As the cam rotation portion 2505A rotates under the force exerted by the lever 2501A, it causes the cam edge 2505B to tilt. The tilting action of the cam edge 2505B is particularly relevant as it creates an angular displacement that allows the cam mechanism 2505 to contact and press against the interior surface 2514A of the tumbler 2514. The interaction between these elements results in a secure gripping force that holds the tumbler 2514 firmly in place.

In FIG. 25A, the apparatus 2500 is shown in a disengaged state where the cam edge 2505B has not yet been tilted. In this state, the cam mechanism 2505 is in a neutral position, allowing the apparatus 2500 to be easily inserted into the tumbler 2514. The spring-loaded lever 2501A remains in a relaxed position, while the torsion spring 2507 retains its default tension. This initial configuration facilitates that the apparatus 2500 can be inserted without exerting unnecessary pressure or resistance against the tumbler walls. The handle 2502 facilitates easy manipulation of the apparatus 2500 during this insertion phase, allowing the user to hold and maneuver it comfortably.

The cam rotation portion 2505A plays a significant role in translating the vertical force from the piston 2501 into rotational motion. This rotational motion facilitates the tilting action of the cam edge 2505B. The cam edge 2505B is specifically shaped to provide optimal contact with the interior surface 2514A of the tumbler 2514. Its curved design facilitates that the force is evenly distributed across the surface, reducing the risk of damage to the tumbler while providing a secure grip. Additionally, the cam edge 2505B may be constructed from a material with a soft, friction-enhancing coating, such as rubber or silicone, to further protect the tumbler surface while improving the gripping capability.

In some embodiments, the cam mechanism 2505 may include multiple cam edges 2505B, arranged symmetrically around the cam rotation portion 2505A. This configuration allows for uniform contact with the interior surface 2514A of the tumbler 2514, providing a balanced and stable grip. The multiple cam edges 2505B may operate in unison, with each edge tilting outward simultaneously as the piston 2501 is pressed. This arrangement is particularly useful for holding larger or irregularly shaped tumblers, where a single point of contact may not be sufficient to achieve secure engagement.

The torsion spring 2507 is a helpful component of the cam lever mechanism 2509, as it provides the necessary tension to return the cam mechanism 2505 to its original position when the piston 2501 is released. In this configuration, the torsion spring 2507 acts as a reset mechanism, so that the apparatus 2500 can be reused multiple times without requiring manual adjustment. When the user releases the piston 2501, the tension in the torsion spring 2507 causes the spring-loaded lever 2501A to retract, which in turn rotates the cam rotation portion 2505A back to its neutral position. This retraction disengages the cam edge 2505B from the interior surface 2514A, allowing the apparatus 2500 to be removed from the tumbler 2514 easily.

In some embodiments, the piston 2501 may include a locking mechanism to maintain the cam edge 2505B in a tilted position without continuous pressure from the user. The locking mechanism can be activated after the piston 2501 has been pressed, securing the spring-loaded lever 2501A in its extended position. This feature may be useful when the apparatus 2500 is used in applications where prolonged engagement with the tumbler 2514 is required, such as in painting, coating, or decorative processes. The locking mechanism facilitates that the apparatus 2500 remains securely attached to the tumbler 2514 without requiring constant user intervention.

In some embodiments, the apparatus 2500 may include additional features such as a rotational base or a swivel joint to facilitate easier positioning of the tumbler 2514. These features allow the user to rotate or tilt the apparatus 2500 without disengaging it from the tumbler 2514, providing greater flexibility during use. For example, in applications where the tumbler 2514 needs to be painted or coated, the rotational base allows the user to adjust the angle of the tumbler without removing the apparatus 2500, thereby improving efficiency and precision.

The apparatus 2500 can be used in various applications beyond securing tumblers 2514. For example, it may be employed to hold bottles, glassware, or other cylindrical objects during manufacturing, decorating, or assembly processes. The versatility of the cam lever mechanism 2509 makes it suitable for a wide range of industries, including beverage production, automotive manufacturing, and home décor. In each of these applications, the apparatus 2500 provides a reliable and efficient means of securely holding items without causing damage to their surfaces.

Referring now to FIGS. 26A-26B, exemplary embodiments of a multi-tumbler support apparatus 2600 are depicted, comprising multiple tumbler support assemblies 2600A-2600D that are configured to support and securely engage a plurality of tumblers or bottles 2614A-2614D. The apparatus 2600 incorporates a structured framework comprising a plurality of pivoting arms 2602A-2602D, each of which is connected to a corresponding tumbler support assembly 2600A-2600D (tumbler support apparatus). This framework facilitates synchronized operation of all tumbler support assemblies to enable simultaneous securing or release of multiple tumblers or bottles.

The apparatus 2600 includes a horizontal support bar (e.g., 2601), which serves as a primary axis to which the pivoting arms 2602A-2602D are mounted. Each of the pivoting arms 2602A-2602D is designed to pivot about its respective connection points, allowing controlled vertical movement. These pivoting arms 2602A-2602D are actuated by a central lever 2601 that governs the synchronized motion of all arms. The lever 2601 is equipped with a first locking position 2601A and a second locking position 2601B, providing precise control over the engagement and release of the tumblers 2614A-2614D.

Each tumbler support assembly 2600A-2600D comprises a handle, an upper stem portion 2610, and a lower stem portion configured as an off-set wedge 2611. The off-set wedge 2611 is connected to the pivoting arm 2602A-2602D through a connecting arm 2605 and a spring mechanism 2607. The spring mechanism 2607 operates to facilitate the tilting motion of the off-set wedge 2611 when the pivoting arm 2602A-2602D is actuated. This tilting action enables the off-set wedge 2611 to securely engage the interior surface 2614A of the respective tumblers or bottles 2614A-2614D, as depicted in FIG. 26B.

In operation, the tumblers 2614A-2614D are initially placed into position beneath each of the tumbler support assemblies 2600A-2600D. At this stage, the locking element 2603 is set in the first locking position 2601A, maintaining the off-set wedge 2611 in a straight or aligned position relative to the upper stem portion 2610. This aligned configuration allows the off-set wedge 2611 to be easily inserted into the open neck or mouth of the tumblers 2614A-2614D (or bottles) without obstruction. The alignment of the off-set wedge 2611 is sustained by the tension provided by the spring mechanism 2607, which acts as an anchor during insertion.

Once the off-set wedge 2611 has been successfully inserted into the respective tumblers 2614A-2614D, the user may actuate the central lever 2601 by pulling it outward, as indicated by the directional arrows in FIG. 26B. This actuation causes the locking element 2603 to shift from the first locking position 2601A to the second locking position 2601B. As a result, the pivoting arms 2602A-2602D are rotated or reversed about their connection points, thereby exerting a downward force on the connecting arms 2605 and pulling the spring mechanism 2607.

The tension or pulling of the spring mechanism 2607 causes the off-set wedge 2611 to tilt, as depicted in FIG. 26B. This tilting motion is achieved through the interaction of the wedge's tapered surfaces and the spring-loaded mechanism. The tilted position of the off-set wedge 2611 causes its edges to firmly contact the interior surfaces 2614A-2614D of the respective tumblers, thereby holding them securely in place. The degree of tilt achieved by the off-set wedge 2611 may be determined by the pre-tensioned state of the spring mechanism 2607, providing uniform force distribution across all tumblers.

To release the tumblers 2614A-2614D, the user may return the lever 2601 to its original position (2601A), causing the locking element 2603 to shift back to the first locking position 2601A. This action reverses the pivoting motion of the arms 2602A-2602D, releasing the tension on the spring mechanism 2607 and allowing the off-set wedge 2611 to return to its straight or aligned position. The tumblers 2614A-2614D can then be easily removed without resistance.

In some embodiments, the pivoting arms 2602A-2602D may be equipped with additional dampening mechanisms to control the speed of actuation, preventing sudden or abrupt motion. These dampening mechanisms may include hydraulic pistons, pneumatic actuators, or elastomeric materials integrated into the pivot points 2602B-2602D. Such enhancements provide smoother operation and reduce the risk of damage to the tumblers 2614A-2614D during insertion or removal.

The framework of the apparatus 2600 may be constructed from materials such as stainless steel, aluminum alloys, or reinforced polymers, providing durability and resistance to wear over prolonged usage. The off-set wedges 2611 and the connecting arms 2605 may be made of softer materials, such as rubberized composites or silicone-coated metals, to provide secure engagement with the interior surfaces of the tumblers without causing scratches or damage.

The apparatus 2600 may particularly be suitable for applications where multiple tumblers or bottles must be supported or displayed simultaneously. For example, in industrial settings, the apparatus can be used for automated cleaning, filling, or quality inspection of glassware. In commercial settings, such as restaurants, bars, or event venues, the apparatus may serve as a display mechanism for showcasing decorative bottles or glassware.

In another embodiment, the pivoting arms 2602A-2602D may be independently actuated using individual levers or electronic actuators. This configuration allows for selective engagement or release of specific tumblers 2614A-2614D, providing greater flexibility in operations where some tumblers need to remain secured while others are removed or replaced.

The apparatus 2600 may also be adapted for use with non-cylindrical containers or irregularly shaped glassware. The off-set wedge 2611 can be modified to include adjustable or modular contact surfaces that conform to the shape of the container being held. Additionally, sensors may be integrated into the off-set wedge 2611 or the pivoting arms 2602A-2602D to detect the position and engagement force applied to each tumbler 2614A-2614D, providing feedback for automated systems.

In yet another embodiment, the lever 2601 may be replaced with an electronic actuator or motorized mechanism controlled via a remote interface. This automation allows for precise and synchronized operation of the tumbler support assemblies 2600A-2600D without manual intervention. Such systems are particularly advantageous in high-throughput environments where efficiency and repeatability are paramount.

FIGS. 27A-27B illustrate an exemplary flowchart 2700 depicting method steps 2701-2715 that describe processes for implementing a tumbler support apparatus with multiple configurations and mechanisms. The steps provided herein outline various approaches to designing, controlling, and operating the apparatus, which may include components such as an upper stem portion, a lower off-set wedge, flexible arms, expandable bladders, butterfly-type mechanisms, and spring-actuated systems. These steps may be performed individually or in combination, depending on the application requirements, and do not necessarily need to be executed in a sequential order. Each step focuses on specific design and operational characteristics to achieve secure engagement of tumblers, bottles, glasses, or similar items while maintaining adaptability for different usage scenarios.

At step 2701, the method begins with configuring a support apparatus that includes a stem portion subdivided into an upper stem portion and a lower off-set wedge. The upper stem portion provides structural alignment and stability for the apparatus, often acting as the primary support structure for holding the lower components in position. The off-set wedge, located at the lower portion of the stem, introduces a tilting functionality, which enables the apparatus to engage the interior surface of a tumbler or similar items securely. The off-set wedge may have a tapered top surface that interfaces with the corresponding tapered bottom of the upper stem portion. This tapered interface facilitates the controlled tilting motion when an upward or downward force is applied.

In one embodiment, the off-set wedge is designed to pivot or slide upward relative to the upper stem portion when actuated by various mechanisms described later in subsequent steps. This tilting movement causes one edge of the off-set wedge to contact the interior surface of a tumbler or similar structure, thereby providing secure holding. Such a configuration is particularly beneficial for scenarios where the apparatus needs to hold fragile glassware or thin-walled containers without applying excessive force. For example, in a wine-tasting event or a manufacturing line, multiple apparatuses configured with such stems may hold wine glasses securely for washing, decoration, or filling processes. The modularity of the design allows the apparatus to be used with tumblers, bottles, or other items of varying sizes and shapes.

At step 2702, the method describes utilizing a threaded screw passing through fixed nuts to control the upward movement of the off-set wedge. This upward movement causes the tapered surfaces of the off-set wedge and the upper stem portion to interact, thereby facilitating the tilting action. The threaded screw may extend vertically through the stem portion and engage with a nut fixedly attached to the base of the off-set wedge. By rotating the threaded screw, either manually or through an external actuation mechanism, the off-set wedge can be moved incrementally upward. This incremental motion allows precise control over the tilting action and facilitates reliable engagement with the internal surface of the tumbler.

In one example, the threaded screw includes multiple thread sections, with thread pitches specifically designed to accommodate fine adjustments for delicate containers. The screw may be rotated using a handle, lever, or even a spindle attachment for ease of operation. In embodiments where automated control is desired, the screw can be actuated using a small motor or pneumatic system to achieve precise and repeatable motion. For example, in automated assembly lines for beverage packaging, the threaded screw system provides a reliable method for inserting and holding glass containers securely in place during the filling process. Furthermore, by incorporating locking mechanisms within the stem, the screw can hold the off-set wedge in a fixed position once the desired engagement is achieved, thus preventing unintentional slippage.

At step 2703, the method introduces integrating a plurality of flexible arms within the stem portion, which can expand or collapse to contact the interior walls of the tumbler for secure support. The flexible arms are housed within the lower stem portion and are arranged symmetrically to distribute force evenly across the internal surface of the tumbler. The arms may be connected to actuation mechanisms such as springs, pistons, or lever systems that enable their controlled expansion and contraction.

In one embodiment, the flexible arms are made of strong yet flexible materials such as reinforced silicone, polymer composites, or thin metallic alloys. This choice of material facilitates that the arms retain their structural integrity while accommodating slight variations in the size and shape of tumblers. When in a collapsed state, the flexible arms retract toward the centerline of the stem, allowing easy insertion of the apparatus into the tumbler. Upon actuation, the arms expand outward, contacting the tumbler's interior surface. This method is particularly suitable for fragile glassware, as the distributed contact minimizes the risk of localized stress or damage. For example, in applications involving decorative glass tumblers or delicate stemware, the flexible arms provide a gentle yet secure grip, making them ideal for tasks such as painting, etching, or cleaning.

At step 2704, the method describes adding a bladder surrounding the flexible arms to provide a soft and secure interface, thereby preventing damage to the interior surface of fragile tumblers during engagement. The bladder is typically constructed from elastic or semi-elastic materials, such as rubber or thermoplastic elastomers, which allow it to expand and conform to the shape of the tumbler's interior surface. The bladder is positioned concentrically around the flexible arms and remains in a compressed state until actuation occurs.

In operation, the bladder expands outward when the flexible arms are actuated, effectively creating a cushion between the arms and the tumbler's surface. This cushion reduces the risk of scratches, cracks, or other forms of damage, particularly in thin-walled glassware or ornate containers. For example, in a glass manufacturing process where freshly molded tumblers are still susceptible to stress fractures, the bladder-based support system offers a gentle holding mechanism that avoids direct pressure points. Additionally, the bladder's expansion may be controlled through a piston mechanism or air injection system, enabling precise adjustments to accommodate various tumbler sizes. Such a design is also advantageous in high-end hospitality environments where wine glasses or decorative vessels must be handled delicately to maintain their pristine condition.

At step 2705, the method involves providing a spring-actuated mechanism within a chamber to enable upward and downward actuation of strings attached to the flexible arms, thereby controlling their expansion and compression. This spring-actuated mechanism is integrated into the handle or upper stem portion and serves as a force-transmission system for manipulating the flexible arms. The strings, which are attached to connection points on the flexible arms, pass through guide channels within the stem and connect to the spring-actuated system.

In one embodiment, the spring mechanism includes a tension spring housed within a cylindrical chamber in the handle. When the spring is compressed by a user pressing a lever, knob, or spindle, the attached strings pull upward, causing the flexible arms to retract inward. Releasing the spring allows it to expand, pushing the strings downward and causing the flexible arms to expand outward. This controlled movement enables smooth and repeatable operation of the flexible arms without requiring manual adjustment of individual components. For example, in a production line for beverage packaging, the spring-actuated mechanism allows quick insertion and removal of tumblers while maintaining consistent holding force. The design also facilitates single-handed operation, making it particularly suitable for applications where speed and efficiency are paramount.

At step 2706, the method introduces a butterfly-type mechanism in the stem portion, wherein expandable wing portions engage the internal surface of the tumbler when actuated. The butterfly-type mechanism includes two or more wing portions symmetrically attached to a central pivot point. These wing portions remain in a collapsed position when not in use and expand outward when a force is applied to the central pivot.

The butterfly-type mechanism is actuated by a spindle arm, lever, or screw system that applies force to the central pivot point. In one embodiment, the wings are spring-loaded, such that they automatically retract when the applied force is released. The wings are designed to create broad surface contact with the tumbler's interior walls, distributing the holding force evenly and reducing the risk of damage. For example, in industrial cleaning processes for laboratory glassware, the butterfly-type mechanism provides a secure grip on irregularly shaped flasks and containers, allowing them to be held firmly in place during automated washing cycles. The compact design of the butterfly mechanism also enables easy insertion into narrow-necked containers, making it suitable for handling bottles or vases.

At step 2707, the method describes employing a screw mechanism to apply force through fixed nuts, causing the wing portions of the butterfly-type mechanism to expand outward for secure contact. In this embodiment, a threaded screw passes vertically through the stem portion and engages with fixed nuts positioned at the base of the butterfly-type mechanism. As the screw is rotated, it exerts a downward force on the central pivot, pushing the wing portions outward.

The screw mechanism offers precise control over the expansion of the wing portions, allowing users to adjust the contact force as needed. For example, in applications involving fragile or thin-walled glassware, the screw mechanism can be rotated incrementally to achieve a secure grip without exerting excessive pressure. In automated systems, the screw may be actuated using a motorized drive or pneumatic actuator, enabling consistent and repeatable operation across multiple units. For example, in a beverage bottling plant, the screw-driven butterfly mechanism can securely hold bottles of varying diameters during filling or capping processes. Additionally, the screw mechanism can be locked in place once the desired expansion is achieved, so that the wing portions remain stable during use.

At step 2708, the method describes replacing the screw-based control with a spindle arm mechanism that presses the butterfly center point, enabling controlled expansion and retraction of the wing portions. In this embodiment, the spindle arm mechanism replaces the threaded screw to provide a more direct and streamlined actuation system for the butterfly-type mechanism. The spindle arm is configured to apply force directly onto the butterfly mechanism's central pivot point, causing the wing portions to expand outward when actuated. This mechanism simplifies the operation process by reducing reliance on rotational screw motion and allows faster engagement and disengagement of the wing portions.

In one example, the spindle arm is a vertical rod integrated into the upper stem portion and extends through a guide channel. The spindle arm may be manually actuated using a lever or knob, or it may be automated using a motorized actuator for industrial applications. When the spindle arm is pushed downward, it applies a concentrated force onto the center pivot, causing the wings to spread evenly to contact the interior walls of the tumbler. Conversely, retracting the spindle arm allows the wings to collapse, making it easy to remove the apparatus. This method is particularly advantageous in high-speed environments, such as production lines for glassware assembly, where speed and precision are priorities. For example, the spindle-based mechanism may be implemented in robotic systems used for holding and inspecting glass bottles or tumblers, where rapid and reliable actuation is required.

At step 2709, the method involves configuring the stem portion to include a bladder that expands upon compression using a lever-actuated piston mechanism. This configuration facilitates soft and uniform contact with the tumbler's interior walls, making it particularly suitable for fragile or thin-walled containers. The bladder, constructed from flexible and elastic materials such as silicone or rubber, surrounds the lower stem portion and remains in a collapsed state until the piston mechanism is actuated.

The lever-actuated piston mechanism operates by applying a downward force on the bladder, compressing it and causing it to expand outward. This expansion allows the bladder to uniformly contact the tumbler's walls, distributing force evenly and reducing the risk of scratches, cracks, or deformations. In some embodiments, the piston mechanism may be actuated through a manual lever integrated into the handle or stem, while in other cases, pneumatic or hydraulic systems may be used for automated control. For example, in a laboratory setting where precision handling of thin glass flasks or beakers is important, the bladder-based configuration provides a gentle yet firm grip without damaging the items. The bladder may also include surface textures or coatings to improve its frictional grip, providing stability during applications such as washing, transporting, or inspecting delicate containers.

At step 2710, the method introduces incorporating a cam mechanism with a rotation portion and edge, controlled by a spring-loaded lever and torsion spring. This configuration enables automated tilting of the off-set wedge for tumbler engagement. The cam mechanism comprises a rotational cam body, which includes a cam rotation portion and a cam edge that interacts with the off-set wedge. When actuated, the rotational movement of the cam body causes the cam edge to apply a tilting force on the off-set wedge. This tilting motion securely engages the tumbler's interior surface while maintaining alignment with the upper stem portion.

The spring-loaded lever connected to the cam mechanism serves as the actuation point, allowing the user to rotate the cam body and tilt the off-set wedge. A torsion spring integrated within the cam assembly facilitates that the mechanism returns to its default position when the lever is released. For example, in automated production lines for wine glasses or tumblers, the cam mechanism provides a reliable and repeatable method for securing containers. By adjusting the force applied through the spring and lever, the tilting motion can be fine-tuned to accommodate tumblers of various shapes and sizes. This method is particularly useful in applications where the apparatus must repeatedly engage and release tumblers without requiring manual adjustments, such as in automated painting or etching processes for decorative glassware.

At step 2711, the method details actuating the cam mechanism using a spring-loaded piston that applies force on the cam edge, tilting the off-set wedge to hold the tumbler securely. In this embodiment, the spring-loaded piston serves as the primary actuator for controlling the cam mechanism. The piston is connected to a force-transmitting assembly, such as a lever or rod, which presses against the cam edge when actuated. The applied force causes the cam rotation portion to pivot, tilting the off-set wedge and engaging the tumbler's internal surface.

The spring-loaded piston mechanism provides smooth and consistent actuation, making it ideal for applications where repeatability and precision are required. For example, in an industrial setting where multiple glass containers must be held for filling or inspection, the spring-loaded piston facilitates uniform tilting of the off-set wedge across multiple apparatuses. The spring mechanism also acts as a fail-safe, automatically returning the off-set wedge to its default position when the piston is released. In another embodiment, the piston may be pneumatically or hydraulically actuated to provide greater force and speed for high-volume operations. For example, in bottling plants where thousands of containers are handled daily, the spring-loaded piston mechanism delivers reliable performance while minimizing manual effort.

At step 2712, the method involves providing a setup with multiple tumbler support assemblies arranged side-by-side to simultaneously support a plurality of tumblers or bottles. This setup is particularly useful in industrial and commercial applications where multiple containers must be held securely at the same time. Each tumbler support assembly includes an upper stem portion, a lower off-set wedge, and the various actuation mechanisms described in previous steps. These assemblies are mounted on a shared support frame, allowing them to operate in a synchronized manner.

The side-by-side arrangement allows the apparatus to accommodate multiple tumblers or bottles of uniform or varying sizes simultaneously. For example, in beverage production lines, the setup can hold multiple glass bottles in place for filling, capping, or labeling processes. In another embodiment, the support assemblies are adjustable along a horizontal rail, enabling operators to customize the spacing between the assemblies based on the size and shape of the tumblers being held. Additionally, this configuration is suitable for high-end retail or display settings, where multiple decorative glass items must be suspended for aesthetic presentation. The modular nature of the setup also allows additional support assemblies to be added or removed as needed, providing flexibility for different applications.

At step 2713, the method describes connecting pivoting arms to individual tumbler support assemblies, controlled through a central lever, enabling synchronized tilting of multiple off-set wedges for holding tumblers. In this embodiment, each tumbler support assembly is linked to a corresponding pivoting arm that controls the tilting motion of the off-set wedge. The pivoting arms are connected to a central lever mechanism, which serves as the control point for actuating all the support assemblies simultaneously.

When the central lever is pulled or pushed, the connected pivoting arms transmit the motion to the off-set wedges, causing them to tilt and engage the interior surfaces of the tumblers. This synchronized operation facilitates that all tumblers are held securely at the same time, minimizing the need for individual adjustments. For example, in automated cleaning systems for glassware, the central lever mechanism allows operators to quickly secure and release multiple containers without manual intervention. In another embodiment, the central lever may be motorized or pneumatically actuated for hands-free operation, making it suitable for large-scale production environments. The synchronized tilting mechanism also improves efficiency in tasks such as filling, labeling, or transporting multiple containers simultaneously.

At step 2714, the method involves using a locking mechanism to shift between aligned and tilted positions of the off-set wedges, enabling easy insertion, secure engagement, and removal of tumblers. The locking mechanism is integrated into the stem portion or handle and is designed to hold the off-set wedge in either a straight or tilted position. In the aligned position, the off-set wedge remains straight, allowing the apparatus to be easily inserted into the tumbler. Once inside, the locking mechanism can be disengaged to allow the off-set wedge to tilt and engage the tumbler's interior surface securely.

The locking mechanism may include a pin, latch, or detent system that can be manually or automatically actuated. For example, in a manual system, the user operates a lever or knob to engage or release the locking mechanism. In an automated system, sensors and actuators may be used to detect the position of the off-set wedge and control the locking mechanism accordingly. This step is particularly beneficial in applications where quick insertion and removal of tumblers are required, such as in automated assembly lines or washing stations. For example, in a glassware cleaning system, the locking mechanism allows operators to secure multiple tumblers quickly, reducing downtime and improving operational efficiency.

At step 2715, the method describes offering multiple control methods, including screw-based actuation, spring-loaded levers, spindle arms, cam mechanisms, and bladder expansion systems for precise engagement of tumblers. This step highlights the versatility of the apparatus, which can be configured with various control mechanisms to meet specific application requirements. Each control method provides unique advantages in terms of precision, speed, and ease of operation.

For example, screw-based actuation is ideal for applications requiring fine adjustments, such as securing fragile glassware. Spring-loaded levers offer quick and reliable operation, making them suitable for high-speed environments. Spindle arms provide direct and controlled actuation, simplifying the engagement process. Cam mechanisms enable automated tilting of the off-set wedge, offering consistent and repeatable performance. Bladder expansion systems provide a soft and uniform interface, making them ideal for delicate or irregularly shaped containers. By combining these control methods, the apparatus can be customized to handle a wide range of tumblers, bottles, and other items in various industrial, commercial, and consumer applications.

A number of embodiments of the present disclosure have been described. While this specification contains many specific implementation details, they should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood that the drawings and the detailed description thereto are not intended to limit the present disclosure to the form disclosed, but to the contrary, the present disclosure is to cover all modification, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring such operations be performed in the particular order shown or in a sequential order, or all illustrated operations be performed, to achieve desirable results.

Moreover, the separation of various system components in the embodiments described above should not be understood as requiring such separation in all embodiments, and it should be understood the described program components and systems can generally be integrated together in a single software product or packaged into multiple software products.

Thus, particular embodiments of the subject matter have been described. Other embodiments are within the scope of the disclosure. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the disclosure.

In certain implementations, multitasking and parallel processing may be advantageous. Nevertheless, it will be understood that various modifications may be made without departing from the spirit and scope of the disclosure.

What is claimed is:

1. An apparatus for supporting a tumbler, bottle, or similar items, the apparatus comprising:
   a. a handle portion having a point of insertion for receiving a threaded screw, the handle portion comprising a first nut attached to a plate fixedly positioned within the handle portion;
   b. a stem portion extending from the handle portion, the stem portion comprising an upper stem portion having a tapered bottom surface, and a lower stem portion including an off-set wedge configured to tilt for engaging an interior surface of the tumbler, the off-set wedge comprising a tapered top surface and a second nut positioned at a base of the off-set wedge; and
   c. a control mechanism configured to actuate and control a tilting of the off-set wedge, the control mechanism comprising the threaded screw extending through the point of insertion, the first nut attached to the plate, and the second nut positioned at the base of the off-set wedge, the threaded screw comprising a shank with predefined threaded portions positioned to interact with the first nut and the second nut, such that rotational movement of the threaded screw generates a linear displacement of the off-set wedge relative to the upper stem portion, wherein an interaction between the tapered bottom surface of the upper stem portion and the tapered top surface of the off-set wedge induces a tilting motion of the off-set wedge, thereby securely holding the tumbler at an interior surface of the tumbler.

2. The apparatus of claim 1, further comprising a locking mechanism associated with the handle portion, the locking mechanism configured to selectively hold the threaded screw in a fixed position to maintain the off-set wedge in a tilted configuration.

3. The apparatus of claim 1, wherein the control mechanism comprises a spring-actuated mechanism instead of the threaded screw, the spring-actuated mechanism comprising a spring-loaded piston or lever that applies a force to tilt the off-set wedge.

4. The apparatus of claim 3, further comprising a tension spring positioned between the upper stem portion and the off-set wedge to bias the off-set wedge into a default tilted position.

5. The apparatus of claim 4, wherein the spring-loaded piston or lever comprises a user-actuated knob configured to compress the tension spring, thereby causing the off-set wedge to move from its default tilted position to a straight position.

6. The apparatus of claim 1, wherein the control mechanism comprises a cam mechanism instead of the threaded screw, the cam mechanism including a cam rotation portion and a cam edge, the cam mechanism being configured to tilt the off-set wedge when actuated.

7. The apparatus of claim 1, wherein the stem portion comprises a butterfly-type mechanism instead of the upper stem portion and the lower stem portion, and wherein the control mechanism comprises a spindle arm mechanism configured to press a center point of the butterfly-type mechanism for controlled expansion and retraction of wing portions of the butterfly-type mechanism to securely hold the tumbler.

8. The apparatus of claim 1, wherein the stem portion comprises a plurality of flexible arms instead of the upper stem portion and the lower stem portion, the plurality of flexible arms being configured to expand outward or collapse inward to contact the interior surface of the tumbler.

9. The apparatus of claim 8, further comprises a bladder surrounding the plurality of flexible arms, the bladder expands upon actuation to provide soft contact with the interior surface of the tumbler.

10. The apparatus of claim 9, wherein the plurality of flexible arms are actuated by a spring mechanism positioned within the stem portion, the spring mechanism being configured to expand the plurality of flexible arms outward when actuated.

11. The apparatus of claim 10, wherein each of the plurality of flexible arms includes a soft-tip extension made of silicone or rubber to prevent damage to the interior surface of the tumbler during engagement.

12. The apparatus of claim 8, wherein each of the plurality of flexible arms is connected to a corresponding flexible string, the corresponding flexible string being anchored at one end to a chamber within the handle portion and at another end to a connection point on each flexible arm.

13. The apparatus of claim 12, wherein a spindle is configured to adjust a tension of the corresponding flexible string, thereby controlling expansion and contraction of the plurality of flexible arms.

14. The apparatus of claim 1, wherein the threaded screw comprises a knurled head to facilitate manual rotation of the threaded screw.

15. The apparatus of claim 1, wherein the handle portion further comprises a rubberized grip for improved ergonomics and user comfort.

16. The apparatus of claim 1, wherein the off-set wedge further comprises a soft padding material on its exterior surface to prevent damage to the tumbler.

17. The apparatus of claim 16, wherein the soft padding material comprises silicone, rubber, or a polymer coating.

18. The apparatus of claim 1, wherein the tapered bottom surface of the upper stem portion and the tapered top surface of the off-set wedge form an angle between 10 and 45 degrees.

19. The apparatus of claim 1, further comprising a spindle or rod configured to attach to the threaded screw for rotating the threaded screw.

20. The apparatus of claim 1, wherein the second nut is integrally formed with the off-set wedge.

* * * * *